(12) United States Patent
Currin et al.

(10) Patent No.: US 9,081,917 B2
(45) Date of Patent: Jul. 14, 2015

(54) SYSTEMS AND METHODS FOR ADVANCED SANITARY SEWER INFRASTRUCTURE MANAGEMENT

(71) Applicant: TRIFECTA GLOBAL INFRASTRUCTURE SOLUTIONS LTD., Santa Barbara, CA (US)

(72) Inventors: David Brett Currin, Auckland (NZ); Clark Easter, Los Osos, CA (US); Brendan Marsh, Aukland (NZ); Edmund Bennett Richards, II, Santa Barbara, CA (US); Rogello Fernando Castillo Aqueveque, Santigo (CL)

(73) Assignee: UNITED STATES INFRASTRUCTURE MANAGEMENT COMPANY, Santa Barbara, CA (US)

( * ) Notice: Subject to any disclaimer, the term of this patent is extended or adjusted under 35 U.S.C. 154(b) by 0 days.

(21) Appl. No.: 14/360,605

(22) PCT Filed: Mar. 14, 2013

(86) PCT No.: PCT/US2013/031724
§ 371 (c)(1),
(2) Date: May 23, 2014

(87) PCT Pub. No.: WO2014/142929
PCT Pub. Date: Sep. 18, 2014

(65) Prior Publication Data
US 2015/0112647 A1     Apr. 23, 2015

(51) Int. Cl.
*G06F 17/50*     (2006.01)
*G06Q 50/26*     (2012.01)
(Continued)

(52) U.S. Cl.
CPC ............ *G06F 17/5004* (2013.01); *G06Q 50/26* (2013.01); *H04L 67/10* (2013.01); *G06F 17/30241* (2013.01); *G06F 2217/34* (2013.01); *G06Q 50/06* (2013.01)

(58) Field of Classification Search
CPC .................................................. G06F 17/5004
See application file for complete search history.

(56) References Cited

U.S. PATENT DOCUMENTS 5,006,991 A * 4/1991 Ohcoshi et al. ............... 700/178
5,517,428 A * 5/1996 Williams .......................... 703/1
(Continued)

OTHER PUBLICATIONS

GIS-Based Sanitary Sewer Evaluation Survey by Halfawy, Mahmoud Rashad et al Proceedings of the 20th Annual ESRI International User Conference, San Diego, Calif. ESRI Press, Redlands, Calif. 2000; pp. 1-19.*

(Continued)

*Primary Examiner* — Akash Saxena
(74) *Attorney, Agent, or Firm* — Procopio Cory Hargreaves & Savitch LLP; Jonathan D. Cheng; Pattric J. Rawlins

(57) ABSTRACT

Systems and methods for managing a sanitary sewer infrastructure. In an embodiment, a plurality of representations of infrastructure assets are re-projected from a plane coordinate system into a geospatial coordinate system, such that each of the re-projected plurality of representations of infrastructure assets is associated with a geospatial coordinate. Each of the re-projected plurality of representations of infrastructure assets and its associated geospatial coordinate is stored in one or more databases. Subsequently, geospatial coordinates, collected in the field, may be received from one or more user devices, wherein each geospatial coordinate corresponds to a geospatial location of an infrastructure asset. A stored geospatial coordinate associated with one or more of the stored re-projected plurality of representations of infrastructure assets may then be adjusted based on the received geospatial coordinates.

18 Claims, 26 Drawing Sheets

(51) Int. Cl.
*H04L 29/08* (2006.01)
*G06Q 50/06* (2012.01)
*G06F 17/30* (2006.01)

(56) References Cited

U.S. PATENT DOCUMENTS

| | | | |
|---|---|---|---|
| 5,742,517 A * | 4/1998 | Van Den Bosch | 382/141 |
| 6,247,019 B1 | 6/2001 | Davies | |
| 6,904,361 B1 * | 6/2005 | Tallman et al. | 703/1 |
| 7,039,565 B1 * | 5/2006 | Jin et al. | 703/2 |
| 2003/0230523 A1 * | 12/2003 | Polizzotto et al. | 210/143 |
| 2006/0197763 A1 * | 9/2006 | Harrison et al. | 345/441 |
| 2007/0089087 A1 * | 4/2007 | Connor et al. | 717/105 |
| 2007/0168370 A1 | 7/2007 | Hardy | |
| 2007/0297752 A1 * | 12/2007 | Soltysik | 386/46 |
| 2008/0140271 A1 | 6/2008 | Garceau et al. | |
| 2009/0177678 A1 * | 7/2009 | Clark et al. | 707/101 |
| 2009/0254407 A1 | 10/2009 | Fagan et al. | |
| 2011/0087662 A1 | 4/2011 | Darby, Jr. et al. | |
| 2013/0211797 A1 * | 8/2013 | Scolnicov et al. | 703/2 |
| 2013/0221091 A1 * | 8/2013 | Koo | 235/375 |
| 2015/0112647 A1 * | 4/2015 | Currin et al. | 703/1 |

OTHER PUBLICATIONS

Enhancing Wastewater Utility Mapping and Flow Line Analysis with Geographic Information Systems (GIS) by Nicole Chiara (Lynch) Peterson (vol. 10, Papers in Resource Analysis. 8pp. Saint Mary's University of Minnesota University Central Services Press.).*
An Integrated Framework for GIS-Based Civil Infrastructure Management Systems Mahmoud R. Halfawy et al; Annual Conference of the Canadian Society for Civil Engineering Montréal, Québec, Canada Jun. 5-8, 2002 pp. 1-10.*
Internation Search report dated Dec. 16, 2013 issued for PCT application No. PCT/US2013/031724.

* cited by examiner

SYSTEMS AND METHODS FOR ADVANCED SANITARY SEWER INFRASTRUCTURE MANAGEMENT

BACKGROUND

1. Field of the Invention

The invention is generally directed to infrastructure management, and, more particularly, to advanced management of a sewer infrastructure.

2. Description of the Related Art

Good water infrastructure management is critical for communities all over the world—not only for quality-of-life reasons, but also for public health reasons. When discussing water infrastructure management, the topic is typically broken down into its three components—what engineers refer to as the "three waters"—drinking water, storm water, and sanitary sewer water (also known as waste water).

There are several key issues with sanitary sewer infrastructure management with which developed countries are currently grappling. Primary among them is aging of the infrastructure itself. Aging may crack pipes or the joints between the pipes, damage manhole structures along streets, or lead to a range of other problems. It is not unusual in major cities for a large percentage, or even a majority, of sewer pipes to be in excess of sixty years old. Before 1950, sewer line pipe and joint materials were not as effective as those used today. Many older pipes and joints are simply failing. In addition, up until the 1970s, many communities in the United States routinely linked their storm water systems and sewer systems together. This is an engineering practice that is now clearly discredited due to its direct relationship in creating now-prohibited Sanitary Sewer Overflows (SSOs) during rainstorms. FIG. 1, from a presentation by Mark Wade at the 2005 North American Society for Trenchless Technology (NASTT) Conference, details the range of problems in aging public sewage infrastructure that can lead to infiltration and inflow of rainwater during storms into what should be a closed sewage system.

Waste water treatment plants and the sewage pipes that feed into them are designed to take a pre-calculated volume of raw sewage from households and businesses for multiple levels of treatment prior to any effluent discharge in order to ensure effective elimination of pathogens, etc. However, during rainstorms breaks in sewer pipes, cracks in joints, and, especially, the linking of storm water and sewer systems, allow storm water to mix in with the raw sewage, leading, in some cases, to multiples of the normal underlying sewage volume. When there is a surge of flow during storm events due to the mingling of storm water with the sewage, the waste water treatment plant spends far more on electricity and chemicals to treat the increased flow. Money is wasted on treating storm water that simply should not be mixed in with the sewage. It is well documented that larger waste water treatment plants can actually spend millions of dollars per year on the chemicals needed to treat these storm-related surges of flow.

Once the increased flow of sewage effluent during storms surpasses the design capacity of the waste water treatment plant, either partially treated or totally untreated sewage is dumped into nearby river, bays, or oceans. These are called SSO events. In 2007—some thirty-five years after the passage of the Clean Water Act—it was estimated that some eight-hundred-fifty-billion gallons of raw sewage were still being dumped into U.S. waterways due to SSOs. It is also estimated that over thirty percent of American rivers and estuaries had one or more impairments to usage in 2007 due to the presence of raw sewage from SSOs. Some large river systems in the U.S. are impaired by raw sewage overflows over twenty-five percent of every year.

In addition to overwhelming the waste water treatment plants and causing SSOs, the increased sewage flow during storms may also overwhelm the local pipes themselves. This can result in sewage backups into nearby residents' or businesses' basements, as well as manholes that blow off and allow raw sewage to run across city streets and yards. This increase of flow into sewers during rain storms is known as the "Infiltration and Inflow" (I/I) problem because it is due to the infiltration of rainwater into what should be a closed sewer system, but which is not, due to either cracking, leaking joints, and/or bad design.

There are two additional related issues that can exacerbate these I/I problems. The first issue is tree roots. Tree roots are very opportunistic. In their search for water and nutrients, they can find and penetrate very small cracks in sewage pipes, and, over time, make these cracks much larger, allowing significant water infiltration. Tree roots may also begin to grow inside the sewer pipes themselves, and over time can significantly block the design flow of the pipes. This contributes heavily to backups during storm events. The second issue that exacerbates I/I problems is the buildup of fats, oil, and grease (known as "FOG") on the inside of sewer pipes. FOG can act in the same way as tree roots. Over time, fats, oil, and grease build up inside the sewer pipes, especially at turns, junctures, etc. During a storm event, these buildups block the design flow of the pipe. Both of these issues may lead directly to basement sewage backups and/or to raw sewage spilling out of manholes. Note a recent article detailing a raw sewage spill due to tree root growth:

> Sewage Spill Closes Santa Barbara Beach, Dec. 4, 2012
> A 6,600-gallon sewage spill has temporarily shut a popular Santa Barbara beach adjacent to the city's harbor. Leadbetter Beach will not reopen until tests indicate the water is safe, according to Manuel Romero, Santa Barbara's wastewater collection superintendent. The spill of untreated sewage was spotted Monday morning after a resident called the city to complain about a storm sewer access hole that had been overflowing since noon the previous day. Water from the spill flowed into a storm drain, down cliffs and into the ocean at the beach. City workers on Monday unclogged the sewer, which had been blocked by roots growing into a connecting line.

Prior to the passage of the Clean Water Act in the early 1970's, little attention was paid to I/I issues in collection systems in the U.S. However, since then, laws have systematically been passed that emphasize the elimination of sewer system overflows, and penalties for SSOs have steadily increased. Simultaneously, there has been less funding available to simply build bigger treatment plants or bigger holding tanks for temporary storm surge storage. Building a much larger, very costly, treatment plant or holding tanks designed to handle multiples of the normal volume of sewage flow for storms that only occur a few times a year simply does not make good economic sense.

This growing regulatory pressure to minimize SSOs has led to improved technical competence, inspection tools, and repair methodologies to support basic sewer system maintenance and retrofitting in order to minimize and/or eliminate I/I issues. At the heart of good sewer maintenance practice is the ability to accurately inspect and evaluate the condition of sewer mains, junctures between pipe sections, manholes, laterals feeding into sewer mains, etc., find out where rainwater may be leaking in, and find out where tree roots or FOG may be blocking flow. An accurate assessment of conditions allows for cost effective targeting of needed repairs, which may range from spot grouting to relining of pipes, laterals, and/or joints to actual replacement of entire pipe segments. A wide variety of inspection techniques exist now, as do a multitude of repair techniques. There has been steady growth in these techniques over the last twenty years.

What has been lacking in the field to date is an effective way of coordinating the whole process between city engineers, whoever is doing the inspections, and the parties doing the repairs. For example, the leading method of sewer pipe inspection today is to insert a video camera connected to a closed-circuit television (CCTV) system down a sewer manhole, while inspection personnel narrate the conditions in real time as they see them, noting cracks, leaks, roots, FOG, and other blockages. Under industry practice today, the resulting videos are typically burned to DVDs and handed to an engineer employed (or hired) by the sewer owner—most often a city or other municipal agency—for review. The engineer then plays each video back on a DVD player, making notes that correspond to the number of feet from the originating manhole that a fault or other observation is located. The engineer will then take his notes, find the relevant section of the city's plat maps, and, measuring on the map from the originating manhole, try to manually figure out and mark on the plat map where the sewer pipe fault is. The plat map will then typically get faxed to the people responsible for making (or bidding on) the repair—often a specialty contractor. The contractor will then try to get more information on that section of pipe from the city (e.g., material, size, age, etc.), go to that section of the city on the plat map, try to find the right manhole, run his own camera down the line, and try to find the fault noted on the plat map. Sometimes contractors will receive a copy of the original inspection DVD so that they can see what the fault looks like. The bottom line is that the contractor will attempt to find the same crack or leaking joint or blockage in the sewer and fix it. A post-repair video of that sewer pipe may then be taken, which the engineer will then review on DVD to try to find the same linear foot marker from the originating manhole to verify that the repair has been completed. At some point the city engineer will review paper forms and approve payment both to the contractor who made the inspection videos and to the contractor who repaired the fault. The city engineer will also typically try to make notes as to which sections of the sewer pipe have root growth, which sections need to be cleaned more frequently, and which sections need to be relined or replaced altogether, so that he can build reliable budgets for work in upcoming years. All of the processes outlined above are currently performed manually for the most part, and involve huge amounts of back and forth with paper, trying to find needed information, trying to locate the same fault, etc.

Accordingly, there is an advantage to automating or facilitating automation of this workflow to make it more effective and efficient. Doing so would free up dollars that are currently wasted on manual, paper-based or DVD-based workflows to be spent on repair activities that directly reduce I/I. Thus, embodiments of the systems and methods disclosed herein are intended to address these problems in conventional techniques that result, for example, from the requirements of multiple layers of communication and collaboration.

The first layer of the problem addressed by certain embodiments disclosed herein is that cities and communities have wide variance in their waste water system records—in the kind of information they track, the quality of that information, and the completeness of the information. There are also difficulties in knowing precisely the accurate location of a particular asset, because many cities still are using mapping systems that predate Global Positioning System (GPS) technology. Many smaller cities may only have "as-built" plans for their sewers, which typically reflect the original engineering design plan or blueprint for the sewer construction. Some may be in paper format only, although most are in what is known as Computer-Aided Design (CAD) format. CAD software is able to generate sophisticated engineering drawings, but traditionally such drawings do not have good database record structures. Thus, the as-built or CAD drawings cannot be updated with repairs, changes, etc., because they lack the database structure to do so.

Larger or more sophisticated cities may have transferred some or all of this as-built information from CAD drawings into what are known as asset management systems. Asset management systems are true software database programs with record structures useful for tracking and updating specific information about the components making up the sewer systems, as well as the repair history or changes to those components. However, for those cities with asset management programs for their sewer infrastructure, those working in the field find that every city tends to track different information about their sewer systems in these databases, using different table structures, indexes, and naming formats. The way one city tracks its waste water assets may not at all match how another city tracks those same types of assets. Additionally, the information tracked typically suffers from varying degrees of completeness, and frequently is not kept up-to-date in any standardized way. Finally, the information tends to be confusing and to degenerate towards inaccuracy at a very basic level. How does a contractor or engineer distinguish between one pipe segment at one particular location in a city from the ten thousand other segments that are just like it? How does one engineer communicate to another engineer or contractor precisely where a particular crack is in a particular segment of pipe so that the second engineer can instantly go to that same spot, see the same problem, and fix it? And how can the first engineer find the same spot again and verify that the original problem was solved? Conventional asset management software has not addressed these location issues effectively.

Geospatial software programs can be used to link geospatial location information to asset information. To date, these programs have tended to not be particularly strong on the asset detail record side and/or on the workflow coordination side. In addition, for many of these programs, the geospatial locations of the assets have been derived from the original CAD drawings, which is very problematic. In general, the accuracy of the geospatial coordinates for the involved assets cannot be relied on for damage prevention or advanced asset management practices. Currently, there is an unmet need to blend the strengths of an asset management program with a geospatial program in a manner that allows a platform to address all of these issues in order to create a uniform framework of assets and locations that can be quickly and accurately communicated to all parties and used efficiently as an online workflow platform.

As mentioned previously, many states and cities have relied for years on CAD mapping systems, which have traditionally used what are known as plane coordinate systems for mapping infrastructure locations. Plane coordinate systems predate GPS, having been developed in the 1920s. At the time, they were considered a big jump forward for taking points from the Earth's surface or from engineering design drawings and projecting them onto a flat map. However, they are inherently flawed in that they get increasingly inaccurate as one moves away from their foundational zero points. Plane coordinate systems use a Cartesian grid system of x and y values, and have constant lengths, angles, and areas across two dimensions. These two-dimensional systems are not a match for the curved surface and actual three-dimensional terrain of the Earth. The location of an asset, as identified by a CAD system, and the actual, physical location of the asset in reality can be very different, sometimes off by fifty meters, a hundred meters, or more. This is at the core of why there can be such a mismatch between CAD drawings used for sewage (or other) infrastructure and physical reality. The farther one gets from the control point that was used as the zero point in a plane coordinate system, the greater the cumulative inaccuracy. In addition, it is fairly typical for cities and utilities in a particular geographic area to use different plane coordinate systems in their CAD systems and as-built drawings. So not only do the as-built drawings not match physical reality, but they frequently do not agree with each other. On a practical level, for the engineers and workers in the field, this means that it can be extraordinarily difficult to see where other infrastructure (e.g., a gas distribution line or a fiber optic line) is in relationship to a sewer line or other sewer infrastructure, or to communicate precisely where a particular fault is located so that it can be evaluated and ultimately fixed.

Accordingly, what is needed is a system or method that makes sanitary sewer or waste water infrastructure management more efficient and cost effective, while simultaneously reducing unintended raw sewage overflows from sewers into public waterways.

SUMMARY

In order to solve these problems with conventional technology, systems and methods are disclosed for advanced sewer infrastructure management. Disclosed embodiments use an innovative approach, innovative software algorithms, and/or cloud computing in order to create and use four dimensions of underground infrastructure data with sufficient accuracy compared to actual ground truth, both geospatially and temporally, that the data can be used to bring together and automate online, in a very integrated and efficient fashion, all of the previously isolated and disparate data silos that city engineers manually use today to manage their sanitary sewer infrastructure. Those isolated and disparate data silos can be, in most cities, as basic as paper notes, marked up plat maps/ CAD drawings, spreadsheets, and videos or DVDs of sewer inspections. Some cities may also have some form of legacy asset management database in place with information about pipe sizes, pipe materials, repair histories, etc. Some cities may have some or all of that data in geospatial shape files. In all cases, engineers and contractors typically spend substantial amounts of time trying to manually bring together all of the disparate and isolated information in order to get their jobs done.

Disclosed embodiments act as a "Rosetta Stone," taking full advantage of the emerging geospatial paradigm for the first time in order to bring all the disparate and isolated information together in a synchronous whole with the purpose of efficiently automating workflows associated with advanced sanitary sewer infrastructure management. Embodiments may also use the highly visual nature of the geospatial paradigm to manage all the parts and lifecycles of sanitary sewer infrastructure management, realizing multiple synergistic benefits that are not available under current management practices. As a result, engineers and contractors can not only save significant time in accessing the full information necessary to do their jobs, and but also do their jobs to a degree of efficacy not otherwise possible.

Accordingly, in an embodiment, a method for managing a sanitary sewer infrastructure is disclosed. The method comprises, by at least one hardware processor: re-projecting a plurality of representations of infrastructure assets from a plane coordinate system into a geospatial coordinate system, such that each of the re-projected plurality of representations of infrastructure assets is associated with a geospatial coordinate; storing each of the re-projected plurality of representations of infrastructure assets and its associated geospatial coordinate in one or more databases; receiving geospatial coordinates, collected in the field, from one or more user devices, wherein each geospatial coordinate corresponds to a geospatial location of an infrastructure asset; and adjusting a stored geospatial coordinate associated with one or more of the stored re-projected plurality of representations of infrastructure assets based on the received geospatial coordinates.

In an additional embodiment, a system for managing a sanitary sewer infrastructure is disclosed. The system comprises: at least one hardware processor; and at least one executable software module that, when executed by the at least one hardware processor, re-projects a plurality of representations of infrastructure assets from a plane coordinate system into a geospatial coordinate system, such that each of the re-projected plurality of representations of infrastructure assets is associated with a geospatial coordinate, stores each of the re-projected plurality of representations of infrastructure assets and its associated geospatial coordinate in one or more databases, receives geospatial coordinates, collected in the field, from one or more user devices, wherein each geospatial coordinate corresponds to a geospatial location of an infrastructure asset, and adjusts a stored geospatial coordinate associated with one or more of the stored re-projected plurality of representations of infrastructure assets based on the received geospatial coordinates.

In an embodiment, environmental attributes may also be re-projected and stored in a similar manner as the plurality of representations of infrastructure assets. In addition, the re-projected plurality of representations of infrastructure assets and environmental attributes may be stored in geospatial layers. With each additional geospatial coordinate collected in the field, not only can the matching infrastructure assets or environmental attributes be adjusted, but related infrastructure assets and related environmental attributes can also be adjusted to match the totality of collected points and the resulting, inferred ground-truth placement of both assets and attributes. Thus, in an embodiment, each original loaded layer can be associated with a second layer that is increasingly adjusted and verified to match ground truth. These adjusted ground-truth layers can then serve as the basis for advanced infrastructure asset management.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems and methods are disclosed for advanced sewer infrastructure management.

System Overview

Figure 1:
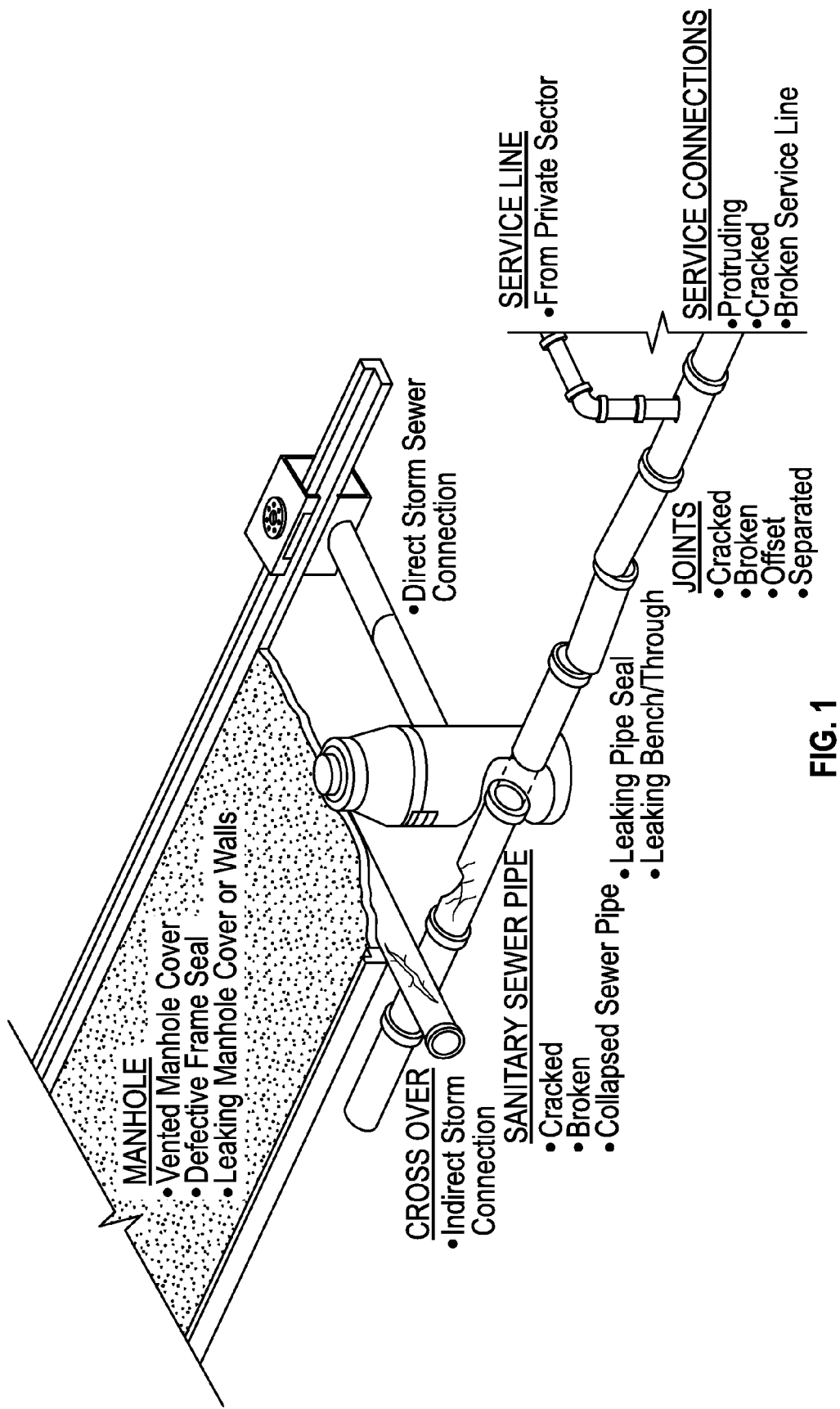
FIG. 1 illustrates various problems in aging public sewage infrastructure that can lead to infiltration and inflow, according to an embodiment.
Figure 2:
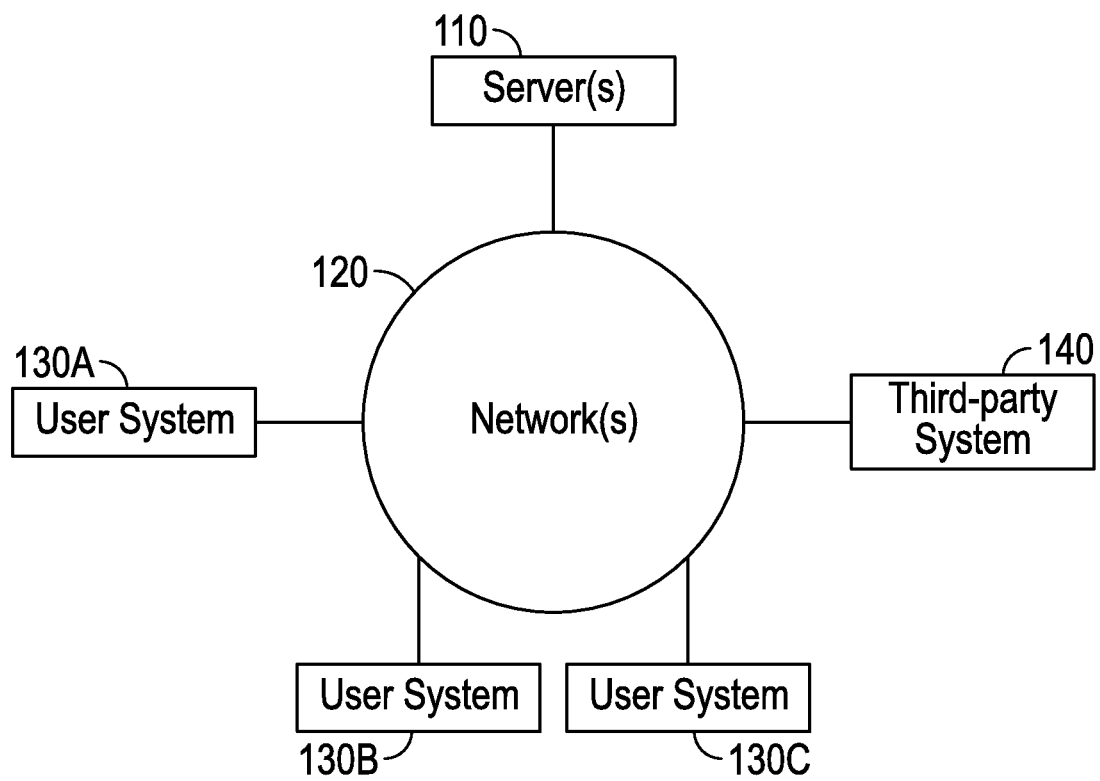
FIG. 2 illustrates high-level components of a system for infrastructure management, according to an embodiment.

FIG. 2 illustrates a system for advanced sewer infrastructure management, according to an embodiment. The system may comprise a set of one or more servers 110 which host and/or execute one or more of the various functions, processes, and/or software modules described herein, collectively referred to as the "application." In addition, server(s) 110 are communicatively connected to one or more user systems 130 and/or third-party systems 140 via one or more network(s) 120. Network(s) 120 may comprise the Internet, and server(s) 110 may communicate with user system(s) 130 through the Internet using standard transmission protocols, such as HyperText Transfer Protocol (HTTP), Secure HTTP (HTTPS), File Transfer Protocol (FTP), FTP Secure (FTPS), SSH File Transfer Protocol (SFTP), and the like, as well as proprietary protocols. In an embodiment, server(s) 110 may not be dedicated servers, and may instead be cloud instances, which utilize shared resources of one or more servers. Furthermore, while server(s) 110 are illustrated as being connected to various systems through a single set of network(s) 120, it should be understood that server(s) 110 may be connected to the various systems via different sets of one or more networks. For example, server(s) 110 may be connected to a subset of user systems 130 or third-party system 140 via the Internet, but may be connected to one or more other user systems 130 or third-party system 140 via an intranet. It should also be understood that user system(s) 130 and third-party system(s) 140 may comprise any type or types of computing devices capable of wired and/or wireless network communication, including without limitation, desktop computers, laptop computers, tablet computers, smart phones or other mobile phones, servers, game consoles, televisions, set-top boxes, electronic kiosks, Automated Teller Machines, CCTV inspection software or equipment (e.g., installed in a contractor's inspection vehicle), and the like. In addition, while several user systems 130, one third-party system 140, and one set of server(s) 110 are illustrated, it should be understood that the network may comprise any number of user systems, third-party systems, and sets of server(s).

Server(s) 110 may comprise web servers which host one or more websites or web services. In embodiments in which a website is provided, the website may comprise one or more user interfaces, including, for example, web pages generated in HyperText Markup Language (HTML) or other language. The server(s) 110 transmit or serve these user interfaces in response to requests from user system(s) 130. In some embodiments, these user interfaces may be served in the form of a wizard, in which case two or more user interfaces may be served in a sequential manner, and one or more of the sequential user interfaces may depend on an interaction of the user or user system with one or more preceding user interfaces. The requests to server(s) 110 and the responses from server(s) 110, including the user interfaces, may both be communicated through network(s) 120, which may include the Internet, using standard communication protocols (e.g., HTTP, HTTPS, FTP, FTPS, SFTP). These user interfaces or web pages may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (not shown) that are locally and/or remotely accessible to server(s) 110. Server(s) 110 may also respond to other requests from user system(s) 130.

Server(s) 110 may further comprise, be communicatively coupled with, or otherwise have access to one or more database(s). For example, server(s) 110 may comprise one or more database servers which manage one or more databases. A user system 130, third-party system 140, or application executing on server(s) 110 may submit data (e.g., user data, form data, etc.) to be stored in the database(s), and/or request access to data stored in such database(s). Any suitable database may be utilized, including without limitation MySQL, Oracle, IBM, Microsoft SQL, Sybase, Access, and the like, including cloud-based database instances. Data may be sent to the server(s) 110, for instance, using the well-known POST request supported by HTTP, via FTP, etc. This data, as well as other requests, may be handled, for example, by server-side web technology, such as a servlet or other software module, executed by the server(s) 110.

In embodiments in which a web service is provided, server(s) 110 may receive requests from user system(s) 130 and/or third-party system(s) 140, and provide responses in eXtensible Markup Language (XML) and/or any other suitable or desired format. In such embodiments, server(s) 110 may provide an application programming interface (API) which defines the manner in which user system(s) 130 and/or third-party system(s) 140 may interact with the web service. Thus, user system(s) 130 and/or third-party system(s) 140, which may themselves be servers, can define their own user interfaces, and rely on the web service to implement the backend processes, functionality, storage, etc., described herein. For example, in such an embodiment, a client application executing on one or more user system(s) 130 may interact with a server application executing on server(s) 110 to execute one or more or a portion of one or more of the various functions, processes, and/or software modules described herein. The client application may be "thin," in which case processing is primarily carried out server-side by server(s) 110. A simple example of a thin client application is a browser application, which simply requests, receives, and renders web pages at user system(s) 130, while server(s) 110 are responsible for generating the web pages and managing database functions. Alternatively, the client application may be "thick," in which case processing is primarily carried out client-side by user system(s) 130. It should be understood that the client application may perform an amount of processing, relative to server(s) 110, at any point along this spectrum between "thin" and "thick," depending on the design goals of the particular implementation. In any case, the application, which may wholly reside on either the server(s) or user system(s) or be distributed between the server(s) or user system(s), can comprise one or more executable software modules that implement one or more of the processes or functions of the application described herein.

In an embodiment, the application executing on server(s) 110 may generate a mash-up from multiple sources. A "mash-up" in this context refers to a user interface that uses and/or combines data, presentations, and/or functionality from two or more sources to create a new amalgamation of data, presentations, and/or functionality. For example, the application may comprise a web application that generates web pages based on data from multiple sources.

Figure 3:
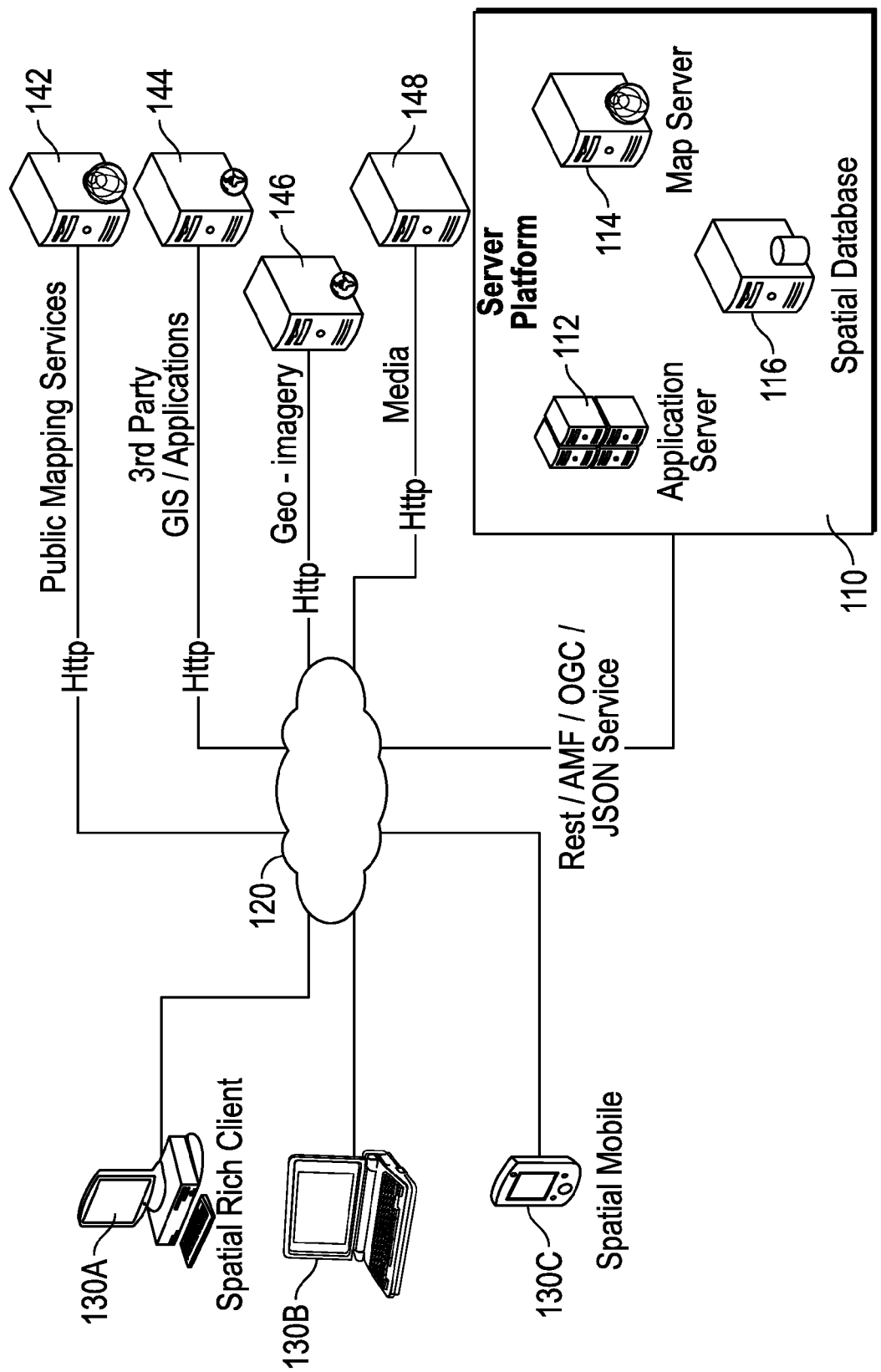
FIG. 3 illustrates high-level components of a system for infrastructure management, according to an embodiment.

FIG. 3 illustrates a system for generating mash-ups, according to an embodiment. As illustrated, server(s) 110 comprise a server platform, which comprises application server(s) 112, map server(s) 114, and spatial database(s) 116. In this example, the application comprises a server application executed on application server(s) 112 and one or more client application(s) on user system(s) 130. For example, user systems 130A and 130B execute a rich client application which interacts with the server application on server(s) 112, whereas user system 130C executes a mobile application which interacts with the server application on server(s) 112. In this case, the mobile application may be thinner than the rich client application in order to accommodate the resource restrictions that are inherent in mobile devices (e.g., limited battery life, less powerful CPUs, smaller display size, etc.). For example, a mobile application may be an optimized version of a desktop application, running on the same base framework, but offering more specific segregation of functions across screens to allow for the reduced form factor and "fat fingers." In some embodiments, the rich client application and/or mobile application may be required for some aspects of the disclosed application (e.g., uploading inspection data), but not for other aspects, such as viewing user interfaces for displaying data, which may be accessed as web pages via a standard web browser.

In addition, server platform 110 may be communicatively connected with one or more third-party sources, for example, via one or more APIs. In this example, the illustrated sources comprise public mapping service(s) 142, geographic information system(s) (GIS) or third-party application(s) 144, geo-imagery source 146, and media source 148. It should be understood that more or fewer sources and different sources may be utilized. In this case, server platform 110 receives the data from the plurality of sources (e.g., 142, 144, 146, and/or 148), processes the received data to generate associations between infrastructure assets and geospatial and attribute data for the infrastructure assets. These associations are stored in spatial database 116. In addition, server platform 110 receives geo-imagery data from source(s) 146, which may comprise one or more Internet mapping providers (e.g., Google Maps™, Microsoft Bing™, Yahoo Maps™, MapQuest™, etc.). This geographic image data, or data derived from this data, may be stored in map server 114 to facilitate the generation and/or retrieval of virtual map images (e.g., image tiles). Alternatively or additionally, the geographic image data may be requested from geo-imagery source(s) 146 at the time of consumption and not stored. Application server 112 may utilize map server 114 to generate a virtual map and utilize spatial database 116 to generate one or more overlays of infrastructure asset data that can be overlaid upon the virtual map in a user interface (e.g., web page) that may be served by application server 112, or a separate web server (not shown), to user system(s) 130.

It should be understood that server platform 110 illustrated in FIGS. 2 and 3 may comprise more or fewer architectural features, such as firewalls, load balancers, and the like. For instance, server platform 110 may also comprise a report server (not shown) which utilizes spatial database 116 and/or map server 114 to generate one or more reports regarding infrastructure assets, maintenance, budgets, contracts, bids, billing, invoices, or other features disclosed herein. It should also be understood that the disclosed application may comprise just one of a plurality of different application modules available on server platform 110, all of which utilize spatial database 116 and/or map server 114.

Process Overview

In an embodiment, seamless and efficient collaboration is achieved by directly supporting the process of efficiently transforming all of a municipality's sewer infrastructure maps and other relevant infrastructure data into a single geospatially-aligned framework, and storing the transformed infrastructure data. In an embodiment, the single geospatially aligned framework that is used across all clients or municipalities comprises the single standard reference geographic coordinate system, known as the World Geodetic System or "WGS 84." This is the framework which is used by GPS. WGS 84 supplies a latitude, longitude, and elevation on the Earth's surface for any identified point in the agreed datum that most closely matches the shape of the Earth. GPS relies on a global network of satellites to provide precise positioning. In 2000, military restrictions on the use of GPS were relaxed, and civilian-use accuracy was allowed to go from one hundred meters to twenty meters. In addition, over the last dozen years, technology has incredibly accelerated the possible accuracy of GPS. Now farmers riding on a tractor can get continuous accuracy within a few centimeters to guide their planting and fertilizing.

Notably, WGS 84 is periodically updated to reflect tectonic plate movement from earthquakes and continental drift, keeping the positioning accurate in conformance with International Terrestrial Reference Frame (ITRF) updates. The current version is WGS 84 (G1674). In reading this disclosure, it should be understood that references to WGS 84 refer to the last-implemented frame update. However, the embodiments disclosed herein are not so limited, and may be used with any past or future versions as well. All geospatial data and coordinates stored in the database may be automatically adjusted to match the frame update currently in effect. GPS readings from the field can also be received in the frame update currently in effect.

The widespread use of the emerging standard WGS 84 geographic coordinate system would allow, if the coordinates of the WGS 84 layers representing infrastructure asset placement matched ground truth, all of a municipality's sewer infrastructure information—as well as secondary information such as utilities, roads, sidewalks, property boundaries, easements, environmental attributes, and other infrastructure data—to be brought into geospatial alignment (e.g., in a cloud-based platform) and presented seamlessly (e.g., via a web browser) to an engineer's, contractor's, or other user's system (e.g., laptop, tablet, desktop, mobile phone, etc.). What the engineer would observe at a certain measured GPS location would match what the engineer's device (e.g., laptop, tablet, etc.) would present as being at that same location. This geospatial alignment allows for huge efficiency gains, but is not easily possible with conventional technology because cities, utilities, and contractors utilize multiple different coordinate systems and projections for infrastructure.

The resulting maps do not visually or spatially align, even for the exact same area. Across just the U.S., cities, utilities, and contractors use more than one-hundred-twenty different state plane coordinate systems, some local county plane coordinate systems, and even a few national plane coordinate systems to track their sewage and other infrastructure. Single coordinate systems may have further variation across time. In an embodiment, the disclosed server platform 110 implements a cloud-based, fully-digital model in usable geospatial alignment, based on all infrastructure locations being adjusted continuously and systematically towards more precise placement in the WGS 84 reference frame through a process of leveraging actual ground-truth measurements.

One reason that this is important is that very few municipal sewage infrastructure systems exist in isolation anymore. Increasingly, there are multiple parties who work across geo-political jurisdictional lines and need the ability to access information in a standardized format. For example, many gas companies are constructing new natural gas pipelines to replace aging infrastructure, relocating existing gas infrastructure, or installing new gas infrastructure to support new development. Frequently, this pipeline construction requires that new gas mains and services be installed in areas that already have substantial residential and commercial development, complete with existing landscaping, driveways, and pavement. Installing new gas mains and services in previously landscaped and/or paved surroundings can be a significant challenge. To avoid excessive restoration and the associated costs and disruption to the involved neighborhoods, gas pipeline contractors often install the gas main or service by "drilling" or "boring" the pipe directly through the ground horizontally, rather than digging up a new trench to go down the street. However, underground pipeline construction using horizontal drilling or boring can leave other utilities susceptible to damage.

According to many gas companies, based on historical experience, sewer systems remain the most susceptible to damage. From their viewpoint, owners and operators of sewer systems typically have poor records, which make it difficult to locate sewer facilities in the field. Not knowing the accurate location of sewer laterals can lead to pipeline contractors drilling or boring thru sewer mains and laterals by mistake. The operator of a drilling or boring machine cannot always identify whether the installation has caused a gas main or service to penetrate a sewer lateral. Therefore, it is possible that what is known as a "cross bore" goes unnoticed initially and un-repaired. An un-repaired sewer lateral with a gas main or service obstruction can cause sewage backup to homes or businesses. Typically, a plumber gets called in. The plumber, not realizing that a gas main has been bored through the sewer lateral, may snake a rotating blade ("cutter") through the sewer lateral to clear the suspected debris. If the cutter were to come into contact with a plastic gas main or service, it would likely cut right through the line and introduce gas into the sewer. The gas could migrate into a home or business, resulting in a potentially catastrophic explosion. As a result, many gas companies engaged in these kinds of construction projects would like to get much more accurate information about sewer infrastructure, both pre- and post-construction.

As another example, many cities band together to share a waste water treatment plant. For example, the Milwaukee Metropolitan Sewage District is made up of twenty-eight different municipalities. These municipalities, although all under the same governing body, have different data and formats for their sewer infrastructure data. In addition, each municipality may or may not use the same inspection firms, cleaning firms, and/or repair firms. Under these circumstances, when the District is under mandate to dramatically cut down on the infiltration and inflow which caused raw sewage to recently flood the basements of hundreds of houses, the challenges of coordinating and collaborating in a cost-effective manner are extreme. The costs of trying to do the coordinating and the collaboration manually are also very high.

Thus, in an embodiment, as a first step, the disclosed process is focused on efficiently and cost effectively bringing all of the disparate data silos which suffer from different coordinate systems and different data formats into an initial, single geospatially-aligned view within a server platform 110, which may be a cloud-based platform. This singular view enables all involved parties to view and work with the data easily and cost effectively, using nothing other than a web browser. It should be noted that after this first step, the aggregated and standardized data supporting the initial view may still be relatively imprecise.

In an embodiment, the process receives CAD, shape files, or other source data representing sewer, other infrastructure, and/or environmental attribute data for one or more municipalities. This source data may be received from a state, city, community, utility, contractor, etc., and may comprise, without limitation, the assumed location of sewer manholes, pipes, property boundaries, road boundaries, utility lines, soil type, and the like. The process may also automatically examine metadata associated with the source data. Based on the data, metadata, and/or other data, one or more software modules (e.g., executed by server platform 110) may determine the plane coordinate system or projection system in which the sewer and/or other data of the source data is currently mapped.

Once the coordinate system or projection system has been determined, the CAD or shape file data is converted or recast into WGS 84 format. In an embodiment, the data is recast in a newly created layer that will become the ground-truth layer for that particular data set. There may be multiple layers created, with one such layer for each set of initial data. This recasting may be performed using one or more of several well-known or proprietary techniques, saving significant amounts of time that would otherwise be spent manually analyzing the data. It may not be possible to accomplish this level of automation for every source's data, but it may be performed for at least a large percentage of the source data. Advantageously, this step brings infrastructure location data, previously in multiple disparate projection formats, into an initial, relatively still imprecise, single, geospatially-aligned view. The automation also cuts the costs to municipalities for bringing their disparate data silos into a first stage of rudimentary geospatial alignment. Some infrastructure or other environmental attribute layers that are already in geospatial format (e.g., of unknown frame, epoch, and/or accuracy) may also be loaded as layers, each with a corresponding new ground-truth layer created. At this point, infrastructure assets, property lines, aerial imagery, other environmental attributes, etc. should all be in rough alignment with actual physical reality.

Figure 4:
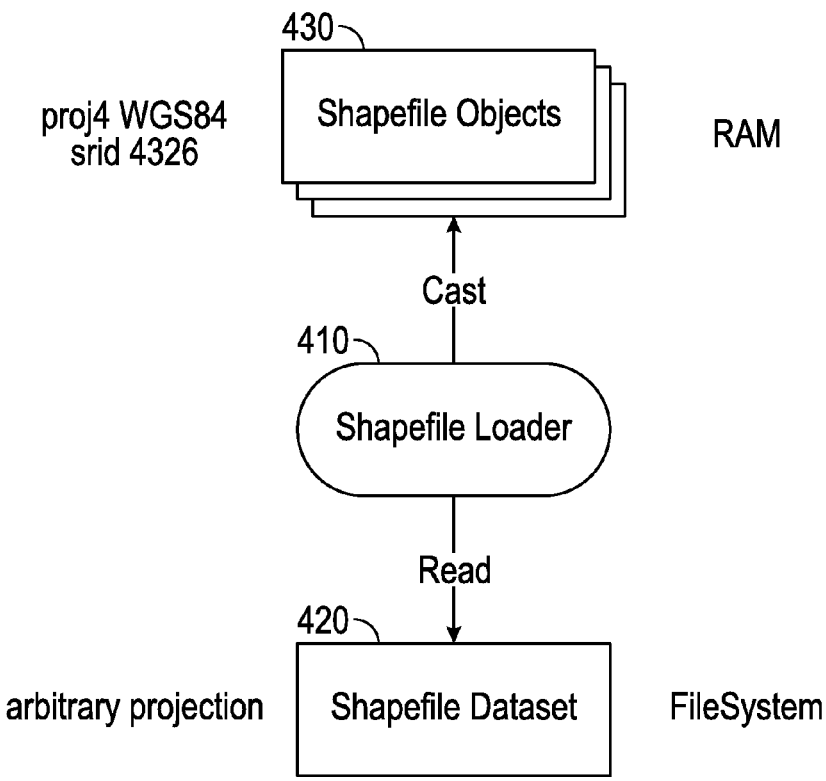
FIG. 4 illustrates a loader module for transforming a shape file dataset into shape file objects, according to an embodiment.

FIG. 4 illustrates a system and process for recasting infrastructure data, according to an embodiment. A shape file loader module 410 is provided. Shape file loader module 410 may be provided on server platform 110 (e.g., on application server 112) or may be provided as a client application or part of a client application (e.g., on user system(s) 130). Shape file loader module 410 receives and reads shape file data from memory. For example, shape file loader module 410 may be configured to receive a user selection of a shape file, comprising a shape file dataset 420, from a file system. Alternatively or additionally, shape file loader module 410 may be configured to automatically select shape files from the file system (e.g., by polling or listening to a specified directory or directories of the file system). In either case, shape file loader module 410 determines, to the extent possible, the coordinate or projection system associated with the received shape file(s). Shape file loader module 410 then recasts the geometry of the shape file dataset 420 of the shape file(s) into WGS 84 format, resulting in one or more shape file objects 430. Shape file objects 430 comprise infrastructure data, including infrastructure asset locations in WGS 84 format. Shape file objects 430 may be stored in volatile memory (e.g., Random Access Memory) and/or non-volatile memory (e.g., Hard Disk Drive).

The initial process of re-projection of shape files from a plane coordinate system or other projection system into a geospatial format (e.g., WGS 84) is typically only the first step. While the initial geospatial information may help sewer workers initially locate the sewer pipe segments, lateral, manholes, and/or other infrastructure assets, it may still be rough in terms of accuracy. For example, this initial information may result in geospatial accuracy of only within meters. However, for the accuracy and effectiveness required for certain advanced infrastructure management applications, it is foundational to achieve geospatial placement of assets, aerial imagery, and environmental attributes in very close alignment with actual physical ground truth, that is accurate on the order of several inches or centimeters. That level of accuracy may be referred to herein as "highly accurate GPS."

Geospatial inaccuracy is a problem that the whole industry currently suffers from. There are three possible sources for this geospatial inaccuracy. First, the sewer system that was actually built or that has been modified over time may simply not match the as-built drawings that the municipality thought represented the actual placement or the components of the sewer system. Second, depending on the quality of the original CAD as-built drawings, re-projection may not be able to sufficiently correct for the jump between the Cartesian x-y coordinate system of the CAD drawings and the WGS 84 geospatial spherical x-y-z coordinate system. In these cases, re-projection may expose gaps between the edges of the re-projected tiles (e.g., the sewer pipe ends at one point in space and starts at another point in space), overlaps between adjoining tiles (e.g., a section of sewer pipe is covered up by the adjoining tile), and/or distortions in tiles (e.g., one quadrant of the tile is satisfactory, but sewer pipes in another quadrant of the tile, where there is a valley, are twenty meters off). A third possible source of error is that the aerial imagery or the base maps themselves may be off in terms of their alignment between their images and the corresponding embedded GPS points. For the most part, current industry practice is that engineers and contractors simply live with these geospatial errors, including all of the limitations and extra work imposed by these errors. Some municipalities and/or contractors will try to fix these errors, over time, by a process of periodically making manual adjustments to the geospatial placement of the infrastructure assets or to the aerial tiles to try and make them more representative of actual physical reality. However, such efforts tend to be hit or miss and not systematic.

The biggest source of error for most municipalities is likely to be in the re-projected CAD tiles themselves. As mentioned above, this is due to the inherent differences between Cartesian coordinate systems and a spherical coordinate system and the limitations of transforming from one reference frame to another. In an embodiment, an application comprising a measurement module can be provided to contractors or other workers in the field. This measurement module may be installed and executed on or communicatively coupled to a handheld device with an integral or connected high-accuracy GPS receiver (e.g., capable of consistent accuracy within the ten to twenty centimeter range or better). As these workers visit individual sewer assets (e.g., a manhole) to do sewer inspections or repairs, they can use a measurement module (e.g., of a handheld application installed on a handheld device) to measure the actual physical or ground-truth position of the assets (e.g., center of the manhole) at that point in time. In a "measure" mode of the handheld application comprising the measurement module, touching an icon (e.g., on a virtual map) representing the manhole or other asset will link the as-measured latitude, longitude, and elevation from an integral or connected high-accuracy GPS receiver device to the asset (e.g., via an asset identifier), along with the time at which the measurement was collected. This association of an asset identifier and as-measured coordinates may be transmitted over at least one network to a server application of server platform 110. For instance, the measurement module may be installed and executed on user system 130C, and the association of an asset identifier and as-measured coordinates collected by the measurement module may be transmitted over network(s) 120 to server platform 110 either automatically or in response to a user interaction. The server application which receives the associations of assets with coordinates may use the collected data to adjust the location of the manhole on the base tile, as derived from the original CAD or shape file import, to a far more accurate WGS 84 ground-truth location. In an embodiment, technicians may be able to see the adjustment take place instantly on the screen of their handheld or other mobile device (e.g., on a virtual map interface of the handheld application). In the case of some assets, such as manholes, the service repositions more than just the identified asset. For example, as a manhole location get repositioned to match reality, the pipe segments extending from the manhole may also be automatically adjusted by one or more algorithms to fit the new, more accurate, manhole location.

There is a current industry practice, known as rubber-sheeting, in which a few control points (e.g., a curb, fire hydrant, tree, etc.) with known latitude and longitude coordinates are manually dragged to the correct location on an aerial image or map. Such changes cannot be undone with any accuracy. In an embodiment, one or more modules executing on server platform 110 or on a user system 130 automatically perform a similar process on the fly. However, these modules use artificial intelligence to automatically readjust the infrastructure points and lines of the sewer system in a more accurate, and possibly non-uniform, fashion to determine positions for them that match physical reality, as measured by GPS. This results in automatic, continual improvements of stored infrastructure asset positions. The accurate positioning of as few as two manholes on a base tile may be used to adjust all of the other infrastructure assets on that tile to more closely match their real-world positions. As more and more of a municipality's manholes get measured across time in the normal process of inspection and maintenance, the whole virtual sewer network for that municipality will become increasingly accurately positioned. What is notable here is that the collection of a small percentage of highly accurate locations of specific infrastructure points associated with what were previously inaccurate historical CAD tiles or as-built drawings of shape files will be sufficient, under this method, to automatically adjust all remaining points on that tile or utility print to a high level of accuracy. Each additional point collected will be used, along with all prior collected and anchored ground-truth points, in the next iteration of the adjustment process, to simply keep refining the locations of all remaining previously-unlocated infrastructure points on a particular tile or shape file. Cities, regions, or utilities will be quickly able to create highly accurate four-dimensional matrices of all their sewer infrastructure assets, other assets, and any desired environmental attributes. Such matrices, comprising x, y, and z coordinates plus time, are a foundation for more efficient and effective advanced asset management practices and techniques. What is shown on virtual maps (e.g., provided by map server 114 of server platform 110) may eventually match reality to within a few centimeters for any given manhole, sewer main, or other asset. This process of realignment may be considered "non-uniform," because, for example, a loaded CAD tile may need to be adjusted in certain areas (e.g., stretched to reflect a valley), but not in other areas (e.g., in which the terrain is flat). Because of the associated time dimension, tile-wide adjustments that are based on any collected point later found to be invalid can be rolled back. There may be a whole history of adjustments available, not only in table form, but also available via visual representation on the application's virtual map.

A second source of possible error in geospatial accuracy is that the base maps and aerial imagery (e.g., which may be from Google Maps™, Microsoft Bing™, or other source) used by server platform 110 may themselves contain geospatial inaccuracies. Digital imagery used in geospatial application software is a computer-compatible version of an aerial photograph, satellite photograph, or other map image. Photography is taken from a high-altitude aircraft that flies over a particular geographic region. These photographs are then scanned into or transferred to a computer as digital photographs (raster images), making them available for use in a GIS. However, in order to be useful in a GIS application, digital imagery must be further processed to correct for scale distortions that occur when imaging the earth from the air, and to associate GPS points with every pixel in the imagery. This correction is called orthogonal rectification or ortho-rectification. These are terms used to describe aerial photography in digital format that has been digitally processed and transformed from image coordinates to real-world coordinates. Orthogonal rectification makes corrections within a photograph so that the scale is uniform throughout the resulting image and so that touching the photograph at any point returns what should be the real-world GPS points (in latitude and longitude) associated with that point. In this way, the digital ortho-photographs combine the image characteristics of a photograph with the geometric qualities of a map. Distances and locations should be able to be accurately measured from these images.

However, sometimes the orthogonal rectification process is of poor quality, due to problems with airplane flight alignment or camera inaccuracies in the collection of the images. In such a case, a user may see a sewer manhole, for example, in an aerial image, but, when he or she touches the manhole in the aerial image, it returns coordinates that do not in fact match the physical reality as recorded by someone in the field who is using GPS equipment to get a set of coordinates that is accurate to within a few inches. Thus, in an embodiment, workers in the field, after they have measured where a particular sewer manhole (or other infrastructure asset) is in the real world with highly accurate GPS equipment, and made the adjustment of the icon representing the asset itself, as discussed above, may then note a discrepancy between the as-measured latitude, longitude, and elevation of the infrastructure asset, and the latitude, longitude, and elevation associated with that asset in the aerial imagery tiles (e.g., as-measured coordinates of the manhole do not in fact match the coordinates of the manhole image in the aerial image itself). Using functionality embodied in the measurement module, the technician may, using a field device (e.g., handheld device) to, upon noticing the discrepancy in alignment between the real world reality and the image, simply touch the corresponding image point, representing an infrastructure asset, in the aerial imagery within the application. That point of the aerial image will be adjusted accordingly to the accurate GPS coordinates at server platform 110. This process of non-uniform adjustment can take place, under user control, whenever more than one point in any aerial imagery tile has been readjusted to real world-coordinates.

Thus, in an embodiment, the disclosed systems and methods deal with the lack of geospatial accuracy and alignment that is systemic in the infrastructure management mapping space today via a systematic process of automatic, continual improvement. Specifically, they enable continuous, systematic improvement of geospatial alignment and accuracy via a process of non-uniform geospatial corrective adjustments of either infrastructure data sets, aerial imagery data sets, and/or environmental attributes. In an embodiment, these adjustments are managed and implemented by cloud-based software (e.g., residing on server platform 110) based on the movement of one or more known control points to new locations which match collected, highly accurate geospatial coordinates. Correcting several control points per aerial image tile can much more closely align all points of the aerial image tile with more accurate real-world GPS points. As noted earlier, a manual process, known as rubber-sheeting, has been used previously in geospatial applications to manually adjust control points one by one in one map layer to match the corresponding points in another map layer. A unique aspect in embodiments of the disclosed systems and methods are their ability, using artificial intelligence, to, in the very process of the field work inspection and repair itself, when workers are connected to server platform 110 (e.g., which may comprise cloud-based services), carry out a process of continuous improvement in real time which adjusts asset, aerial, and base map layers to create an unprecedented level of geospatial alignment and accuracy between all mapping levels and the actual physical world. Each new collected ground-truth point can then be used, in combination with all previously collected ground-truth points, to adjust all other related infrastructure or other environmental attribute points on that particular layer and tile that have not yet been anchored by collected ground-truth points.

The database structure managed by server platform 110 may be designed to facilitate and leverage this process of continually improving geospatial alignment between infrastructure assets, aerial imagery, and physical reality. In an embodiment, this design comprises at least four primary dimensions for tracking infrastructure assets, as well as dimensions for all associated asset attributes such as valuation, asset condition (deterioration), work orders, predictive modeling, money spent on upkeep, etc. The four primary dimensions are the x, y, and z dimensions for all physically collected measurements, and a time dimension for when each measurement was taken. Every measurement of an asset point position is thus an "as measured, as of" attribute of the associated asset. Thus, it becomes possible to have queries that ask "where was this sewer line at this point in time?" that would reflect that the sewer line was repositioned or rebuilt as of a certain date, with a resulting new valuation, expected lifespan, etc. This design also allows the query of asset condition belonging to a specific asset at any point in time, and the juxtaposition of that asset condition against the asset condition of that same asset in another selected point in time. Engineers can instantly see how the most recent video inspection for a particular pipe segment compares to the one from a year earlier, or the one from five years earlier. To facilitate the value of this embodiment, there may be time sliders both on the map and within the query screen that allows any query to be filtered by time constraints.

One reason that the disclosed processes that systematically refine the geospatial locations of infrastructure data and aerial imagery into highly accurate geospatial alignment are so important is that the resulting, very accurate geospatial alignment for all the different infrastructure layers (e.g., sewer manholes, sewer mains, sewer laterals, gas lines, property lines, or other utilities) that a municipality might want loaded in this (e.g., cloud-based) server platform 110 acts like a "Rosetta Stone" for far more efficient infrastructure management. It allows for all sorts of synergistic, mathematical interactions and queries with the involved assets that were previously unavailable as long as they were in disparate and inaccurate coordinate systems that did not match each other and did not match reality. Combining very accurate geospatial locations of infrastructure assets with the temporal dimension allows what may be called "temporal geo-polymorphism" to take place. With this temporal geo-polymorphism functionality, very advanced four-dimensional queries can look across all infrastructure, environmental attribute, aerial, and other mapping layers in a selected geospatial area for a selected slice of time.

For example, in one embodiment, it is possible to: (a) on a virtual map, see generated symbols of where all the sewer main repairs in a certain time frame or by a certain contractor have taken place; and (b) accurately jump to any of those repairs and to have lined up, within several inches of accuracy, the matching segments of pre-repair sewer pipe video and post-repair video in order to perform quality control to ensure that the repairs were done and done correctly. In another example, a query can match up rainfall distribution maps against involved sewer basins and then proportionately compare the increase in flow in various sewer mains during rainfall events in their sewer basins in order to identify the priority pipes that are afflicted with disproportionately high inflow and infiltration. Another relevant example is that, once this geospatial alignment has taken place for two asset classes, such as sewer pipes and gas lines, mathematical algorithms can instantly show on the map all points where any sewer pipe is within "x" meters of a gas line. This kind of analytical power is only available when assets are brought into the highly accurate geospatial alignment provided by the disclosed server platform 110. It cannot be done in CAD tile systems.

In an embodiment, one or more modules (e.g., executing on server platform 110) utilize the collected, highly accurate geospatial locations of manholes at the ends of each sewer segment to automatically assign highly accurate geospatial coordinates to every point of the length of the connecting pipe segment, as well as to assign geospatial coordinates to any form of continuous pipeline inspection data (e.g., CCTV or some form of electrical or ultrasonic inspection). For example, geospatial coordinates may be assigned to one or more video frames (including all frames, or a plurality of frames at predetermined intervals) of an inspection video. Traditionally sewer pipe videos have been marked in linear feet from a zero point (e.g., a particular fault is "x" feet from the manhole where the sewer video started filming). The modules can automatically assign geospatial coordinates to the frames of a sewer pipe inspection video or to some other continuous condition inspection data stream. One aspect of embodiments of the disclosed modules is the ability to seamlessly translate back and forth between linear measurements and geospatial coordinates. As a result, all faults identified within any inspection video or other inspection data stream can have geospatial coordinates associated with them. Using these highly accurate geospatial coordinates, faults and other items of interest can be provided in a mapping layer of a server application, which cannot be done at all when the measurements are simply in linear feet from a manhole. Nor can they be accurately done if the geospatial coordinates of the manholes have not first been established with high accuracy. For example, a pipe segment can be shown on a virtual map to have five critical faults within a short section of right-of-way that also suffers from some form of environmental contamination. Such knowledge may instantly inform the best option for needed repair. Under current industry practice, fault information from sewer pipe inspections is buried in linear information and cannot be instantly visualized in relationship to other critical factors.

In an embodiment, the disclosed application leverages geospatial fault locations and the time dimension against other attribute data to support more effective and more efficient sewer pipe management. This allows faults to be filtered by geospatial location as well as by time of observation, time of repair, current status of repair, or any other collected attribute that has a time component. Query results can then be shown as symbols linked to the underlying data on the mapping layers of the application. Faults of varying severity can have different symbols or colors. Junctures where lateral pipes from properties come into the sewer main can have unique symbols as well. Stretches of the pipe where there has been root growth in prior inspections, or FOG buildup, or some other blockage can all be stored and shown symbolically upon query of the application. This allows for very powerful querying. For example, a city engineer can query and be shown all actual stretches of sewer mains over the last five years in which, based on video inspection in those years, there were physical overlaps of stretches that suffered from root growth or FOG obstruction. This kind of easy access to key information is exactly what is needed to identify sections of sewer pipe in need of more frequent inspection and cleaning. Contractors can also use this functionality to instantly see the faults of a particular type that still need to be fixed and where they are located for more efficient job scheduling.

In an embodiment, one or more modules (e.g., residing on server platform 110)—concurrently with loading the CAD and/or shape files from one or more municipalities or clients and transforming those files into a new layer with initial first stage rudimentary WGS 84 geospatial alignment—quickly loads the associated attribute data for those CAD and/or shape files into a universal attribute system that allows data comparison across unlimited sewer systems. Currently, every municipality tends to track different information about their sewer systems, using different table structures, indexes, and naming formats. For instance, the way one city tracks its waste water assets may not at all match how another city tracks those same types of assets. In an embodiment, the disclosed modules solve this problem of variance in collection of sewer system attribute data by having a setup interface which allows an administrator to quickly sort out and map where each type of attribute data will go on an ongoing basis within an universal attribute system. This allows the disclosed application, even though it has the data of hundreds of cities available to it, to present all the data with a consistent presentation within the application. For example, touching or clicking on a sewer pipe will show the same attribute information on the screen (if the relevant data was supplied) in the same format and presentation. In addition, it allows the data of one sewer system to be compared against the data of another sewer system, even if the original data formats were quite different. This is very useful for contractors and engineers who have dozen of clients with whom they are under contract and who want to compare costs or repair histories or maintenance methodologies across multiple clients.

Figure 5:
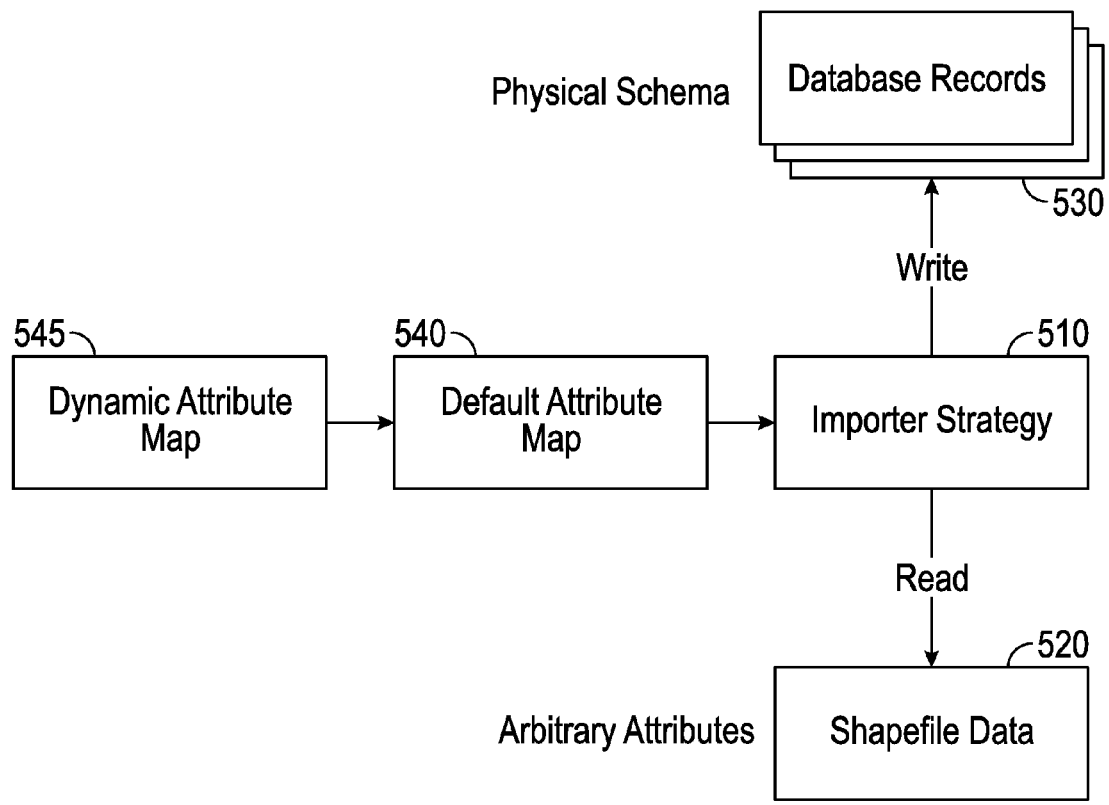
FIG. 5 illustrates an importer strategy module for transforming shape file data into database records, according to an embodiment.

FIG. 5 illustrates how shape file data with arbitrary attribute data may be imported into a common schema, according to an embodiment. Shape file data 520, comprising attribute data, is read (e.g., from a file system) by importer strategy module 510, which may be executed by server platform 110 (e.g., on application server 112) or by a client application or as part of a client application (e.g., on a user system 130). Importer strategy module 510 selects an import strategy which suits the target database table. Default attribute map 540 determines how shape file attributes in shape file data 520 correlate to the selected target database schema. When required, all or part of default attribute map 540 may be overridden by dynamic attribute map 545 to account for arbitrary shape file attributes. Importer strategy module 510 builds objects with suitable attributes, populates those objects, and then writes the objects to appropriate database records 530 in the database (e.g., spatial database(s) 116).

As mentioned, one of the key methods of sewer inspection for many municipalities is inserting video cameras down a manhole and running the cameras along the inside of the sewer main in order to capture video of the walls of the sewer main. This approach is effective at spotting cracks in the walls, bad joints, root growth, FOG, or other faults. The video camera can also be run off of a sewer main to capture the inside of a lateral that connects the main to a residence or business. Traditionally, these videos have been burned to DVD and then handed to the client or municipality by the inspection contractor. The disclosed application offers many enhancements to this process. For instance, the disclosed application may be cloud-hosted, solving the technical challenges associated with hosting sewer videos in the cloud.

In an embodiment, burning sewer videos to DVDs and manually distributing them to parties who need to view them is no longer required. There are several different video filming formats used by contractors for their work, dependent on the software they use with a particular camera brand. The disclosed application may be configured to work with these differing formats. In an embodiment, contractors can directly load the videos from their work site to a video loading area (e.g., via FTP or HTTP). Once the videos are loaded, algorithms (e.g., of server platform 110) may be executed to take that raw video and automatically prepare it for hosting (e.g., within the cloud) for viewing at normal speed, as well as at various accelerated speeds. As part of the process, each video segment, which may be associated with a video segment identifier, is linked geospatially to its corresponding sewer main or sewer lateral segment. If an engineer wants to review inspections for a particular pipe segment, he or she may simply click on the icon overlaid on a sewer line on the associated virtual map and be shown what videos historically exist for that particular pipe segment. Clicking again on one of the available videos may load it into the viewer. It may be played at varying speeds, and the original observation notes may be available (e.g., off to the side of the video) as it plays. Each video segment may be encoded with security partitions that allow only users with the right roles and permissions to view that particular video. A high availability content distribution network may be utilized for each municipality's videos. In an additional embodiment, older inspection videos may be moved or archived to lower-cost, cloud-based, low-availability storage for historical storage.

Figure 6:
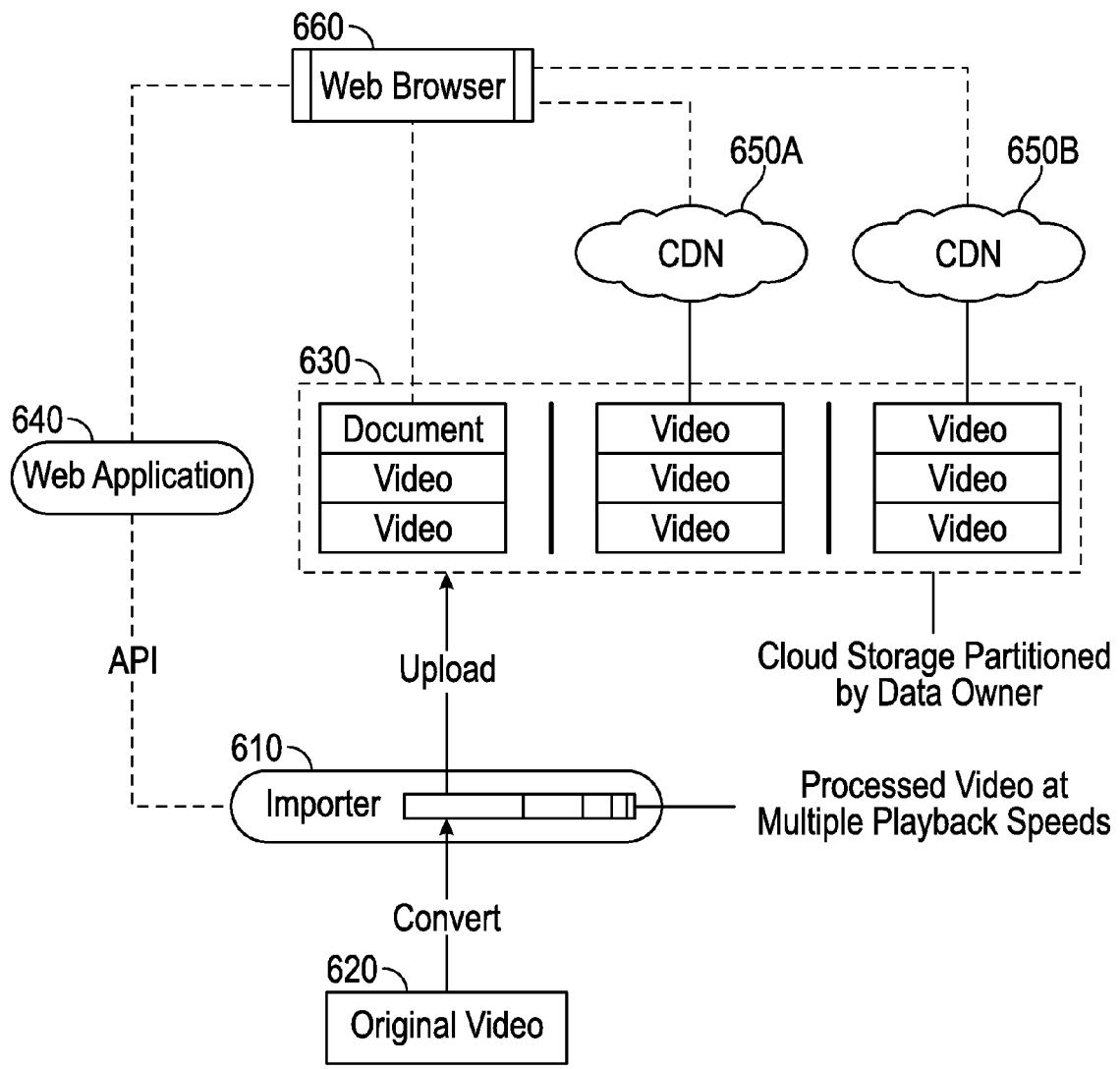
FIG. 6 illustrates a system for preparing inspection videos for distribution over a network, according to an embodiment.

FIG. 6 illustrates an example system for importation and distribution of inspection videos by a data owner, according to an embodiment. In this embodiment, the service may comprise importer module 610 and web application 640. The service may also comprise or be communicatively interfaced with cloud-based storage 630 and/or one or more content distribution networks 650.

An original video 620 may be received by importer module 610. Importer module 610 processes video 620 to prepare it for storage and access. For instance, importer module 610 may convert video 620 to a standard format that is suitable for streaming to a web browser and associate frames or segments of the video with geospatial coordinates, observations, notes, documents, and/or other data. Importer module 610 may also process video 620 to be played at multiple playback speeds. For example, importer module 610 may generate one or more down-sampled videos from original video 620 (e.g., videos with fewer frames and/or lower resolutions). Importer module 610 may also interface with web application 640, e.g., via one or more APIs. Web application 640 provides user interfaces to web browser 660, and supports user and machine interactions with the user interfaces.

The processed videos may be uploaded to storage 630, which may be cloud storage. Storage 630 may stored videos, documents, and other data, and be partitioned according to keys provided by web application 640, which are determined by the legal owner of the stored data. In an embodiment, a streaming distribution may be created for each data partition. This streaming distribution may include one or more content distribution networks 650. While accessing web application 640 via web browser 660, content (e.g., videos, documents, or other media embedded in the user interfaces provided by web application 640) stored in storage 630 is streamed either directly from storage 630 or through the respective data owner's content delivery network 650. In an embodiment, text content is served by web application 640, non-streaming non-text content (e.g., documents and images) is served directly by cloud storage 630, and streaming content (e.g., video) is served by content delivery network 650.

Each video segment may be associated with attributes that control security (e.g., roles and permissions, such as those provided in the content distribution network). Each video segment may also be associated with high-level information concerning when it was captured, an overall five star rating (e.g., a Pipeline Assessment and Certification Program (PACP) rating) of the pipe segment shown in or otherwise corresponding to the video segment, an identification of the contractor who captured the video segment, etc. In addition to this information appearing when a particular video segment is selected, this information may also be viewed for all stored videos in a list view, which can then be filtered by user-defined queries. The resulting filtered list view of videos that meet a certain criteria will then redraw what video icons appear in a layer on a virtual map. Any item on the list, when queried, points to the corresponding video on the virtual map. Drawing a geospatial lasso on the virtual map returns a list of inspections that meets the filter criteria with the addition of the geospatial criteria represented by the geospatial lasso.

The current extant reality for city engineers who need to handle physical DVDs has been previously discussed. The disclosed application radically simplifies and bypasses those existing manual processes. Using the disclosed application, a user (e.g., contractor to a municipality or staff member of a municipality) may carry out the video inspections of one or more sewer pipe segments. Each day the contractor may upload completed sewer video segments from that day's filming to the video upload area. In embodiments, one or more modules of server platform 110 automatically prepare the uploaded video for hosting in the cloud, adding speed control, security control enhancements, and/or other processing to generate hosted, high-availability videos. The videos are automatically linked to the relevant, corresponding pipe segments and the originating manholes in the corresponding shape files that have been previously loaded and geospatially aligned by server platform 110. Attributes about a sewage infrastructure system that have been supplied by municipalities and others may also be automatically linked to the appropriate shape file. A city engineer logging into the system can query all videos uploaded using sophisticated filters, geospatial lassos, dates, etc. Clicking on a presented video icon, which may be overlaid on a virtual map at the location corresponding to the location of the asset that is the subject of the video represented by the icon, allows the city engineer to review that video (e.g., foot by foot). The video may be presented along with any observations made concerning the video. Additional attribute details can be added to any existing note about a fault or an observation. Geospatial links can be created for any note that links to the exact spot in the video footage and/or on the virtual map. Such links may then show a coded fault as a searchable or clickable symbol on the virtual map. New faults and observations can be noted and automatically linked to geospatial coordinates. Extended faults, such as root growth over a twenty foot section of pipe, can be geospatially linked to the virtual map in their full extent.

In an embodiment, using the geospatial coordinates that have been embedded in or otherwise associated with every pipe segment and every video segment, the application allows city engineers to attach work orders online to any geospatial location associated with a specific sewer infrastructure asset and even to specific faults as revealed by video or other inspection methodology within a pipe segment. In addition, work orders can be linked and authorized online against existing approved city purchase orders for such work. When work orders have been attached either to assets or to faults, the authorized contractor can instantly see a queue of work orders appear in the contractor's work queue. Each work order may have a clickable link that takes the contractor to the exact point on the application map where there is a specific pipe fault to be repaired, or to the overall pipe segment to be repaired. Alternatively or additionally, a clickable link can allow the authorized contractor to jump instantly to the relevant pre-repair video inspection segment for each fault to be repaired and to see the visual details of the fault for themselves. Relevant information on the pipe age, material, size, etc. may be available to the contractor by clicking on the virtual map icon for the pipe segment. The status of the work order (e.g., open, complete, in process, etc.) may be made available to all appropriate parties (e.g., those with appropriate security settings), and can be a filterable query. When the work is complete, the contractor can upload a post-work inspection video. The city engineer will be able to compare the pre-repair and post-repair video side by side for quality control and invoice approval purposes. All historical videos can be stored indefinitely for purposes of judging pipe deterioration over time, FOG tendencies, etc.

The disclosed application may also provide for collaboration. For instance, one engineer can, if wanting collaboration from another engineer on reviewing a particular video, click on a button and instantly send an email to that engineer with a deep link to a video or a particular frame of one of the sewer inspection videos in order to get his opinion on a particular fault depicted on the video, or to point out something in a particular video frame to the other engineer. The same can be done when an engineer wants to have a contractor look at a particular fault on a sewer line video. This kind of instant collaboration has not been possible before. Rather, conventionally, one engineer would have to get a physical copy of an inspection video DVD into the hands of another engineer, and then that engineer would have to fast forward to the correct footage.

In a further embodiment, real-time collaboration may be provided. For example, two users may be able to view a video together (e.g., by viewing a video being played in one browser that is synched with a video being played in another browser), video conference and/or instant message while viewing a video, etc. In certain embodiments, a user may also be able to view images or video that a contractor is capturing during an inspection, in real time while it is being captured. Thus, a contractor could consult with one or more engineers or other users during an inspection.

In an additional collaborative embodiment, if one user wants to share a customized search and its results with another user (e.g., engineer or contractor), the user may click on a button and instantly send an email or other message to the other party with a deep link to that query and its results. The link may show a query results window with simultaneous display on a virtual map of all involved asset or fault locations. The application allows queries to be very detailed. For example, a query may comprise all 36-inch sewer pipe sections in a particular geospatial extent made out of reinforced concrete that have three star ratings or worse in the last two inspection cycles. This functionality is excellent for promoting collaboration due to its time saving nature.

In an embodiment, the application allows users (e.g., city engineers) to attach project plans to any infrastructure asset, such as a pipeline segment, or to any identified fault itself. Such project plans can be debited against maintenance budgets for current or upcoming years. Such budgets can also be set up in the application. Each project, task, or subtask can be linked to a separate, unique geospatial location on the map. For example, a project plan can be created which is linked to a particular geospatial extent encompassing a particular sewer basin. Each task of that project plan may be linked to a particular pipe segment or other asset of that basin in need of repair. Each subtask may be linked to a particular fault in that particular asset (e.g., a fault in a pipe segment that needs to be grouted). All projects, tasks, and subtasks can be shown as icons on a virtual map in their correct geospatial location. All display of projects, tasks, and subtasks on the virtual map can additionally be filtered by time sliders on the map. For example, a user can query the service to only show those projects that will be underway in a particular three-month period. Full projects plans can be developed with timelines, resources, dependencies, and budgets. Awarded contracts for work under the budgets can be set up, with hourly rates, work roles, etc. Work orders to outside contractors that fall under those awarded contracts can be issued, and invoices can be generated online that debit those contract awards. Those invoices can be approved for payment online by city engineers or other users. A full range of management reports can be run against yearly budgets, e.g., showing spending rates, percentage of work remaining, etc. Settable online alerts may also be provided.

In an embodiment, the application provides a module which allows future project plans for sewer infrastructure to be shared with other city departments and with outside utilities. In this manner, future, potentially overlapping work can be coordinated, costs shared, and neighborhood disruption minimized. For example, if the city roads department can visually see that a certain sewer segment is going to be dug up and replaced in eighteen months, the road department can put off the currently planned repaving project they have budgeted for the involved road segment until after the sewer work is complete. Under this coordinated scenario, costs can be shared, saving both the roads department and the sewer department significant money that they had budgeted individually for these independent projects. In a further enhancement to this embodiment, in addition to seeing future projects on the map in a selected slice of time, the application may automatically take the forward work plans developed by the sewer department, as well as those created by other city departments or outside utilities, and create time and space placeholders for all projects, tasks, and subtasks. An enhancement of the temporal geo-polymorphism functionality detailed earlier can automatically search through the stored time and space dimensions to automatically detect all overlaps of projects in time and space, and email the involved parties of such potential conflicts. For example, if the application detects a linked or loaded future road project that overlaps with a planned sewer project, the engineers in both departments can be automatically sent emails notifying them of the potential conflict and opportunity for coordination.

In an embodiment, city engineers can use the disclosed application to manage the awarding of inspection and/or maintenance contracts for the sewer infrastructure system. Time-constrained logins can be set up allowing bidders to see the extent of the sewer network to be inspected and to see any inspection videos detailing faults to be repaired. Bid documents and any other necessary documents concerning the infrastructure can be made available online to potential bidders. A very sophisticated user login security system can be customized to allow access to only certain geopolitical boundaries, to certain information, even to customized geospatial selections of infrastructure or to only certain selected layers of infrastructure (e.g., sewer infrastructure, but not gas distribution infrastructure).

In an embodiment, the application can feed selected attribute data, condition data, and/or budget data of the sewer infrastructure system into a predictive modeling engine on server platform 110. The predictive modeling engine may use algorithms to determine where maintenance dollars can be best spent in order to optimize ongoing performance of the sewer system. The resulting outputs can then be visually overlaid on a virtual map of the involved city's sewer mains in order to more clearly show where dollars should be spent, in what time frame, and what the outcomes for such spending will be in terms of condition ratings at a certain point in the future. These visual outputs may controlled by time sliders or other time inputs. "What if" scenarios can be run under this model. For example, "if the budget is reduced $200,000 this year, what is the impact on sewer main condition 4 years from now?" Color-coded results for each sewer line segment may be displayed on a virtual map, as well as output in results windows. This is extraordinarily powerful technology that can allow city engineers or contractors to quickly assess the strengths and weaknesses of various maintenance strategies, and to match them against various budget scenarios.

In an embodiment, the application can identify and prioritize which sewer basins of a particular municipality need infiltration and inflow repair first. Historical flow data can be loaded for each sewer main and linked against the historical rainfall data for a particular sewer basin. Flow data can be loaded as time series data into the platform and linked to the collection point on the sewer main for such data. If no historical data is available, flow sensors, linked to a particular location in the sewer main, may be hooked into server platform 110 going forward, such that flow sensor data may be collected and stored by server platform 110 (e.g., in spatial database 116). This data can be used to identify either the quantity increase or the percentage increase in flow during storm events, matched against that sewer basin's rainfall for the events. The application can then visually represent each sewer main's percentage increase by colors overlaid on the sewer mains within the application's virtual map. This data can then be used to identify the priority sewer basins whose mains and private laterals need inspection and testing. The application may allow the drawing of geospatial polygons on the map to permanently identify the boundaries of each sewer basin.

In an embodiment, the application takes the data collected, which helps to identify priority sewer basins with severe infiltration and inflow problems, and creates master projects for inspection and repair of each identified priority sewer basin. Specifically, the application has unique functionality which allows master projects to be created. This can dramatically ease the workflow issues associated with running a major sewer basin repair project and ending water infiltration and inflow during storm events. One of the biggest issues for these types of projects is identifying the involved private property owners whose laterals need inspection, requesting permission and a time from those owners to come on their property to inspect, and then coordinating the inspections themselves. Inspection results have to then be assessed, action plans determined and carried out, and post-repair inspections performed and contractor bills approved for payment. Current practice is that all of those steps are carried out manually. As a first step, the sewer basin geospatial boundaries, created previously, can be used to automatically match against geospatial cadastral property boundaries, resulting in the automatic identification of all property owners connected to the involved sewer lines. The application can then generate a whole mailing campaign to all involved property owners, notifying them of the project, of the reasons for the project (e.g., stopping basement backups and SSOs), and asking them for permission to enter their parcels to test the sewer laterals underneath for leaks. As property owners agree to inspection, the colors of parcel boundaries on the map can change, alerting the inspection contractor that he or she can proceed with inspection on a particular parcel. Each project owner's approval of an inspection may increment the inspection budget. Inspection data that can be loaded into server platform 110 and attached to either a main or lateral is not only video footage, but also other testing method results such at those from dyes, smoke tests, ultrasonic, or electro-scan testing. The sewer district or municipality can then, based on the inspection results, budget within server platform 110 appropriate repair actions for each fault, and generate the involved work orders. The whole workflow can be then be managed geospatially online, all the way to post-repair inspection and signoff on contractor invoices.

Using the application, best practice infrastructure management can easily be implemented across a whole sewer network in an incredibly efficient manner, cutting significant labor and time out of every step of sewer infrastructure management. Each sewer basin (or sewer main and/or lateral) can be set up in the project section of the application for periodic inspection (e.g., video inspection). Based on inspections, any main, junction, lateral, and/or manhole can be set up with location-based work orders for cleaning or fault repairs as necessary. A complete historical record of videos, segment and individual fault condition ratings, segments cleaned, faults repaired, sections with root growth, sections with FOG, etc. are all online and searchable geospatially and by multiple other query conditions. Extensive performance reports can be run, such as how many miles of inspections this year versus last year, how many miles of root control, how many faults grouted, how many feet relined, etc. If flow sensors have been interfaced with the platform, then flows can be compared from the post-repair timeframe against the pre-repair timeframe, adjusted for comparable rainfall. Overall metrics on sewer overflow reduction can be generated and shown as percentage colors on a virtual map of sewer basins between time points selected by a time slider or other input. This can be further broken down into root or FOG caused overflow reductions. Overall miles of sewer assessed and condition-rated can be generated and shown on a virtual map. For example, each sewer segment may be shown in a color associated with its last measured condition, if measured within the last three years.

In addition, in an embodiment, the disclosed application allows the ability to easily and systematically use cloud-based functionality to:

Systematically use and manage inspections (e.g., CCTV inspections) to assess the current condition of all sewage infrastructure;

Schedule and monitor work orders generated from inspection, e.g., for repairs, cleaning, root removal, or FOG removal;

Prioritize critical defects for immediate repair;

Prioritize and spot visually high risk areas and system components;

Do systemic planning;

Observe and correct capacity deficiencies;

Systematically budget for and carry out rehabilitation and replacement;

Use standardized best practice processes to systematically analyze pipe and joint defects for decisions as to whether to repair, line, or replace the segment, or take no action;

Use collected preliminary condition data along with analysis of age, material, and diameter classes to project system-wide needs for coming years and to set up appropriate budget assumptions; and/or Assess and prioritize sewer basin repair based on SSO analysis for each basin.

The following list comprises some exemplary, non-exhaustive aspects of certain embodiments of the disclosed systems and methods:

(1) Using algorithms and artificial intelligence to automatically analyze CAD tiles and/or shape files to determine what state plane coordinate system or projection they might be in, and automatically re-project them into a geospatial coordinate system (e.g., WGS 84) while simultaneously loading each layer received into a geospatial platform as a new future ground-truth layer. Layers already in WGS 84 format may also be loaded with a corresponding new future ground-truth layer. This may have the commercial advantage of cutting down a municipality's or contractor's labor costs for getting all of the disparate data silos into the first stage of rudimentary geospatially-aligned format.

(2) Using algorithms to receive highly accurate latitude, longitude, and elevation coordinates collected in the field for infrastructure assets (e.g., manholes) and other environmental attributes and, based on those collected coordinates, automatically and continually adjust, on each involved ground truth layer, both the matching infrastructure points (or environmental attributes) and the related infrastructure points, loaded from CAD tiles and/or shape files, to more and more precise alignment with ground-truth physical reality.

(3) Using algorithms to receive highly accurate latitude, longitude, and elevation coordinates collected in the field for infrastructure assets (e.g., manholes) and other environmental attributes and, based on those collected coordinates, automatically and continually adjust points on aerial imagery tiles to more and more precise alignment with physical reality.

(4) The application may maintain four complete dimensions for infrastructure assets and all associated attributes. These four dimensions are latitude, longitude, elevation, and time. Associated attributes may include, without limitation, measured asset condition (deterioration), valuation, measured environmental attributes, expected asset life, repair history, work orders, planned prevention or repair activities, budgets, actual expenditures, deterioration modeling, etc.

(5) Advanced temporal geo-polymorphism functionality can allow four-dimensional queries to act like a four-dimensional "lasso" in time and space to capture all data about assets that share selected attributes in that selected slice of time and space, from all relevant ground-truth layers in use.

(6) During or after the loading of an inspection video (or other form of digital inspection data), if highly accurate geospatial locations have been collected for the manholes at the ends of the inspected sewer segment, the application may automatically derive and assign highly accurate geospatial coordinates to one or more or all of the points of the length of the pipe segment between the two manholes, as well as assigning corresponding geospatial locations to one or more or all of the frames of the inspection video. This enables faults, lateral connections, priority repairs, etc. to all be shown as symbols overlaid on a base mapping layer. Geospatial locations can also be automatically assigned to other forms of sewer inspection, such as electromagnetic or any other kind of electrical or ultrasonic form of continuous pipeline inspection data.

(7) The application may leverage geospatial fault locations and the time dimension against other attribute data in order to support more effective and more efficient sewer pipe management. For example, the ability of the application to automatically assign geospatial extents to CCTV-observed root growth or FOG areas of a sewer pipe allows an automatic virtual overlay of multiple years of observed problems to visually represent those stretches of sewer pipe that consistently need extra attention and cleaning.

(8) The application may have the ability, in addition to loading CAD and/or shape files quickly and easily from a particular source and transforming those files into initial first stage rudimentary WGS 84 geospatial alignment, to concurrently load any associated attribute data from those CAD tiles and/or shape files into a universal attribute system that allows consistent presentation of attribute data on one or more mapping layers as well as comparison of a sewer system's attribute data against that from another sewer system, even if their original formats differed.

(9) The application can receive videos (or other form of digital inspection data) once they are loaded to an FTP site and/or take them directly from an inspection vehicle (e.g., CCTV filming truck), and, using algorithms, take that raw video and automatically prepare it for hosting within the cloud, in what is known as a high-availability content distribution network. Each video may be prepped for viewing at normal speed, as well as at various accelerated speeds. In addition, each video segment, at the video segment identifier level, may be linked geospatially to its corresponding sewer main or sewer lateral segment. Each video segment can also be encoded with security partitions that allow only users with the right security settings (e.g., roles and permissions) to view that particular video for that particular municipality or other region. The automation provided by this functionality can drive down the costs of this whole process, making it more affordable to municipalities.

(10) Using the application, when reviewing video inspections or other condition data gathered about the pipelines, engineers may be able to, with a single click, attach a work order to either a specific fault or to a whole pipeline segment, manhole, lateral, etc. This work order can be linked to preexisting purchase orders for such repair work. Contractors can receive a queue of work orders for action, with each work order shown on a virtual map, provided by the application, as a symbol for purposes of efficient scheduling. Each work order can also have an embedded link that takes the user directly to the correct location (e.g., frame) on the inspection video (or other inspection data set) to view the fault.

(11) Using the application, an engineer or other user may be allowed, if wanting collaboration from another party on reviewing a particular video shot or other inspection data, to click on a button and instantly send an email or other message to that other party with a deep link to that particular frame on one of the sewer inspection videos in order to get the recipient's opinion on a particular fault depicted on the video, or to point out something in that particular video frame.

(12) Using the application, an engineer or other user may be allowed, if wanting to share the results from a particular query within the application with another party, to click on a button and instantly send an email or other message to that other party with a deep link to that particular query and its results list. The locations of all assets and/or faults in the query results window may automatically be shown on the application-provided virtual map.

(13) Using the application, users (e.g., city engineers or contractors) can attach fully fleshed out project plans to any infrastructure asset, such as a pipeline segment, or to any identified fault itself, as revealed by CCTV inspection or other inspection modality. Each project, task, and subtask of the project plan can be linked to separate geospatial locations. Project locations can then be displayed geospatially on an application-provided map, with additional filtering provided by a time slider or other time input.

(14) Future project plans for sewer infrastructure repair or construction can be shared via a module of the application with other city departments and with outside utilities so that future, potentially overlapping work can be coordinated, costs shared, and neighborhood disruption minimized. Because all projects, tasks, and subtasks can have geospatial locations and time periods associated with them, future projects can all be displayed on a virtual map and filtered with a time slider or other time input to a particular slice of time. Conflicts can be visually seen. In addition, the application may comprise temporal geo-polymorphism functionality that has been customized to automatically search within the time and space dimensions of the application and to automatically detect all overlaps between projects, and to automatically send alerts to the project's owners.

(15) The application may comprise functionality that allows users (e.g., city engineers) to manage the awarding of inspection and or maintenance contracts for the sewer infrastructure system. Time-constrained logins can be set up allowing bidders to see the extent of the sewer network to be inspected and to see the inspection videos or other inspection data detailing faults to be repaired. Bid documents, and any other necessary documents concerning the infrastructure can be made available online to potential bidders. A very sophisticated user login security system can be customized to allow and restrict access to only certain geopolitical boundaries, certain information, customized geospatial selections of infrastructure, or certain selected layers of infrastructure.

(16) The application may comprise or interface with a predictive modeling engine that models various maintenance strategies of the involved sewer assets and the various budget scenarios so that they may be visually overlaid on a virtual map of the involved city's sewer mains in order to more clearly show where dollars should be spent, in what time frame, and what the outcomes for such spending will be in terms of condition ratings at a certain point in the future. These visual outputs may be controlled by time sliders or other time inputs. "What if" scenarios can be run under this model. For example, "if the budget is reduced $200,000 this year, what is the impact on sewer main condition 4 years from now?" Color-coded results for each sewer line segment may be displayed on the map, as well as output in one or more results windows. This is extraordinarily powerful technology that may allow city engineers or contractors to quickly assess the strengths and weaknesses of various maintenance strategies, and to match them against various budget scenarios.

(17) The platform can be uniquely used to identify and prioritize which sewer basins of a particular municipality need infiltration and inflow repair first. Historical flow data can be loaded for each sewer main, linked against the historical rainfall data for a particular sewer basin. Flow data can be loaded as time series data into the platform, linked to the collection point on the sewer main for such data. The platform may allow flow sensors, linked to a particular location in the sewer main, to be hooked into the platform. That data can then be used to identify either the quantity increase or the percentage increase in flow during storm events, matched against that sewer basin's rainfall for that event. The application can then visually represent each sewer main's percentage increase by colors overlaid on a virtual map of the sewer mains within the application. This data can then be used to identify the priority sewer basins whose mains and private laterals need inspection and testing.

(18) Taking the sewer basins identified as having severe infiltration and inflow problems, the application can comprise functionality to create master projects specifically designed to automate the whole workflow process necessary for the efficient inspection and repair of each sewer basin. Among other functionality, the special master projects can generate the whole communication campaign: first identifying the involved private property owners whose laterals need inspection, then requesting permission and a time from those owners to come on their property to inspect, and finally coordinating the inspections themselves.

Example Inspection System

As mentioned above, one or more of user systems 130 may comprise inspection equipment, such as video inspection equipment. For instance, in the traditional CCTV inspection process, a truck comprising CCTV video inspection equipment is driven to a sewer infrastructure asset, such as a manhole. The video inspection equipment includes an inspection vehicle, robot, or dolly, generally comprising a mounted camera. The inspection dolly may be tethered to equipment, such as a computing device, recording device, and/or television screen, and remotely controlled by a worker (e.g., through the tether or radio waves). In practice, the inspection dolly is placed into a pipe segment via one manhole and driven or otherwise guided through the pipe segment to another manhole. During the inspection, inspection data (e.g., image or video data) is sent to the equipment controlled by the worker. The worker generally views the data in real time and records observations. The worker may also rotate or otherwise control movement of the camera on the inspection dolly to inspect pipe sections of interest (e.g., suspected faults). The data is also generally recorded. In many cases, the data is video data that is recorded on a Video Home System (VHS) videocassette using a videocassette recorder (VCR). In some cases, the data is recorded onto a DVD or recorded onto a hard drive and subsequently burned onto a DVD. The inspection video may be automatically or manually captioned with data relevant to the inspection (e.g., asset identifier, time traveled, feet traveled, etc.). Typically, the inspection worker will enter data into a computing device (e.g., of the inspection equipment, or at the contractor's office), which may be executing proprietary inspection software, in order to generate a National Association of Sewer Service Companies (NASSCO) standardized report. Examples of such inspection software include PipeTech™, Wincan8™, and Granite™. The VHS or DVD and the NASSCO report are then mailed or otherwise manually delivered to a city engineer for review and quality control.

In an embodiment, the disclosed application supports a more efficient inspection process. The disclosed application may comprise a server application and a client application. The client application may be installed on an existing computing device of standard inspection equipment along with proprietary inspection software, or a separate computing device (e.g., handheld device) which is communicatively coupled with a computing device of the inspection equipment. The client application may be interfaced with the proprietary inspection software (e.g., via one or more APIs) or otherwise receive inspection data from the proprietary inspection software (e.g., via data exports or a data stream). Alternatively, the client application may comprise or be integrated with the inspection software. The computing device may comprise a transmitter or transceiver that can communicate with a wireless network (e.g., cellular radio network, wide area network, or wireless local area network), or an intermediate device, such as a hotspot or other access point, which is able to communicate with the wireless network.

The client application receives inspection data from the inspection software and/or inspection equipment, including the record of the inspection (e.g., video recording), observations (e.g., spoken and/or typed) made by the inspection worker, and any other data collected by the inspection equipment or input by the inspection worker. In an embodiment, the client application or a separate client application may also allow workers to collect GPS data (e.g., longitude, latitude, and elevation coordinates) and associate the GPS data to specific infrastructure assets (e.g., manholes). All of the data may be uploaded by the client application to the server application for storage on server platform 110.

In addition, either the client application or server application may perform processing on the data prior to storage. For example, the client application may provide data normalization, archiving, automatic upload, and/or automatic connection features. Data normalization refers to the process of converting data from a proprietary format (e.g., produced by any one of one or more proprietary inspection software applications) into a standard format. Archiving refers to the process of converting the normalized data into the proper file structure. For example, in an embodiment, all data is converted into a Microsoft Access Database (MDB) format, or some other database format, prior to be uploaded to the server application. Automatic uploading refers to the process of automatically uploading the collected data to server platform 110 (e.g., without the necessity of human intervention). Finally, the automatic connection feature refers to the client application automatically attempting to provide a persistent connection to server platform 110 (e.g., by attempting to connect to server platform 110 when the client application is started and/or after a connection has been lost).

In an embodiment, since the objective of proprietary inspection software is often to produce a final output, rather than an intermediate output, the proprietary format produced by proprietary inspection software may not be easily normalized. Markup output, such as XML output, would be desirable since fields within the output could be easily distinguished and imported. However, the proprietary PipeTech™ inspection software, for instance, produces a PDF output, from which it is not as easy to derive individual fields, as well as a proprietary database file (PTD) and a MPG file comprising the inspection video. Accordingly, the client or server application may comprise an extraction module to normalize this data. The extraction module extracts fields for sewer inspection reports contained within output, such as PDF output, and uses these extracted fields to automatically reorganize (e.g., copy or move) a collection of proprietary inspections (e.g., PTD, PDF, MPG) into a consistently organized archive. For instance, using PipeTech™ as an example, the extraction module may extract a work order number and media identifier from the PDF output, and use the work order number and media identifier to organize the PipeTech™ inspections into a consistent directory structure. As one example, the work order number may be used in the name of a directory for all related inspection data and the media identifier may be used in the name of a subdirectory that stores the corresponding media. In addition, the extraction module may extract sewer pipe inspection information (e.g., a footage counter) from a captioned video (e.g., MPG, FLV, AVI) via optical character recognition (OCR).

In an embodiment, the client application uploads data to server platform 110 using a virtual private network, rsync protocol, and/or FTP. However, it should be understood that additional or alternative protocols may be used. The inspection data may be uploaded in real time, such that inspection data (e.g., inspection video data) is available through server platform 110 in real time as the inspection is taking place. This provides the ability for real-time collaboration during an inspection, for example, between the workers in the field and consulting engineers in their home or office.

However, in some circumstances, the wireless network may not be available or suitable for the data transfer. For example, for an entire video, the upload speeds or costs on a cellular radio network may not be acceptable. Accordingly, in an embodiment, the client application is configured to queue data until a connection with a suitable network (e.g., a local area network) is established. Once a suitable wireless network is in range, the client application may automatically connect with the network and initiate uploading of data in the queue to server platform 110.

In an embodiment, the server application on server platform 110 may comprise an uploaded data importer module which provides one or more user interfaces enabling a user to navigate a repository of uploaded inspection files, select one or more files from the repository for processing and/or importation, and view a history and completion state of importations of inspection data. The server application on server platform 110 can process inspection data received from the client application to integrate it into the existing databases for viewing and reporting. For instance, the server application may process an inspection video into the appropriate format for streaming to a web-based user interface, as well as generate and store additional versions of the inspection video at varying playback speeds. In addition, the server application may automatically process the inspection data to prepare a NASSCO report, which can be automatically sent (e.g., as a PDF or HTML interface) or otherwise notified (e.g., via a link) to a supervising engineer. This avoids the time and cost of the inspection contractor having to manually create and deliver videos and reports to the supervising engineer.

For various reasons, it may be difficult for an inspection contractor or municipality to immediately transition from the conventional inspection process to the disclosed process with automated video delivery and reporting. Accordingly, server platform 110 and/or a provided client application may support an incremental process, whereby a plurality of contractors and/or municipalities may utilize the system in differing stages of automation. For instance, in a first stage, the client application may provide structured data archiving to reduce manual effort. In a second stage, the client application may provide inspection data uploading for faster delivery. In a third stage, the client application may provide automated archiving and uploading from an inspection truck to reduce manual effort. In a fourth stage, the client and/or server application may allow exportation of a database file (e.g., MDB file) so that contractors may more easily meet specification requirements. In a fifth stage, server platform 110 may perform automatic work-order processing to provide faster payment processing. In a sixth stage, server platform 110 may provide contractor analytics. In a seventh stage, the contractor or municipality can abandon hard copies of videos and inspection reports altogether. In an eighth stage, server platform 110 may provide third-party application and services integration. Finally, in a ninth stage, the municipality may transition to complete automated management of the inspection workflow through server platform 110, including the selection and assignment of inspection sites, automatic collection and integration of inspection data, and the identification, development, and review of inspection reports (e.g., NASSCO reports).

Example User Interfaces

Server platform 110 may be cloud-based, and provides instant online access anytime and anywhere to a sewer infrastructure management application that stores, and provides access to and analysis for, sewer management projects, such as sewer inspection projects. Example user interfaces provided by a web application on server platform 110 will now be described with reference to FIGS. 7-15C.

Figure 7:
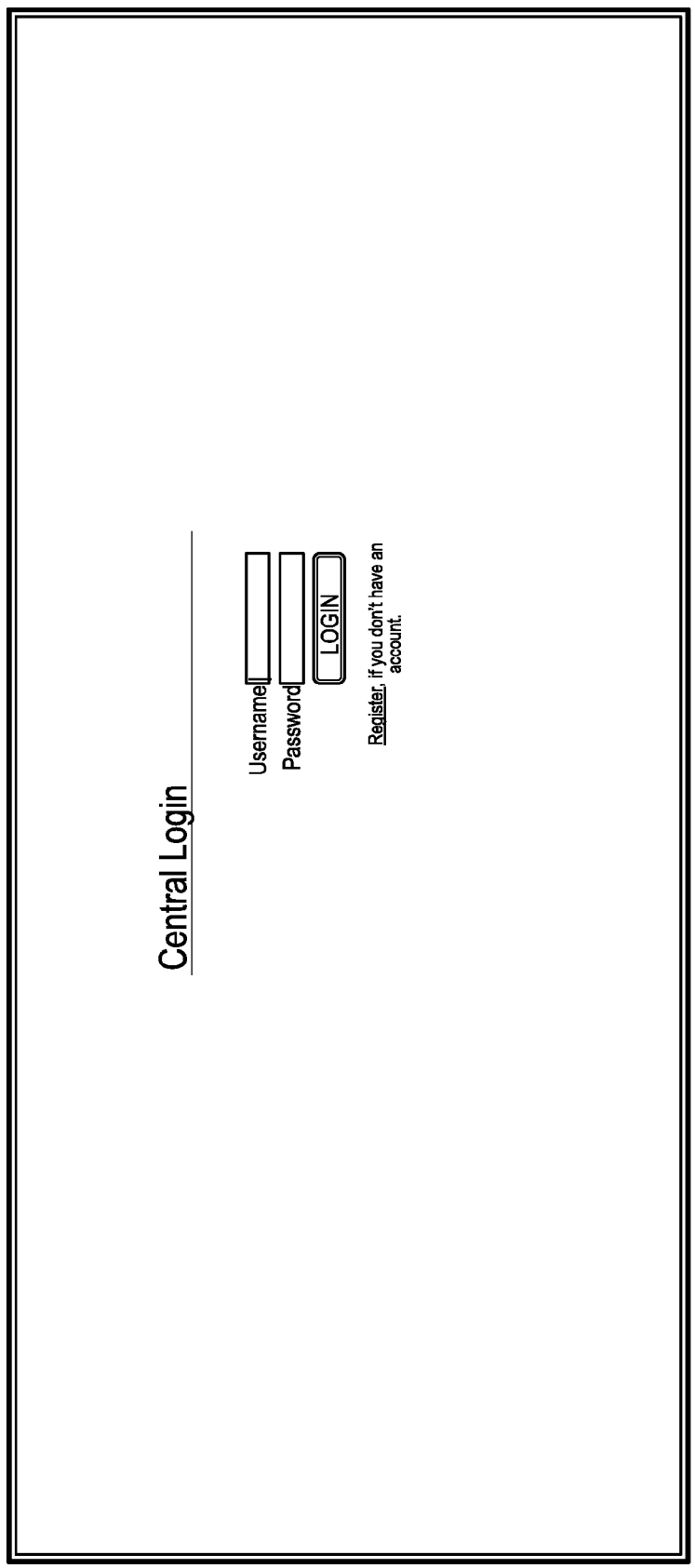
FIG. 7 illustrates an authentication user interface, according to an embodiment.

FIG. 7 illustrates an embodiment of an authentication user interface. A user may register with web application to establish an account. The user account may be associated with credentials, such as a username or email and a password. The user account may also be associated with security settings (e.g., roles and/or permissions), which govern the data and/or resources which the user may access. These security settings may be established and/or modified by an administrator and/or automatically established and/or modified by the system (e.g., in response to a selected or default account type). For example, security settings may include, without limitation, an access restriction to infrastructure data in one or more layers of infrastructure (e.g., access to sewer infrastructure, but not electrical distribution infrastructure), an access restriction to infrastructure data in one or more geographical regions (e.g., user-defined or system-defined geographical regions), an access restriction to a particular selection of one or more infrastructure assets (e.g., user-defined or system-defined selection), etc. Accordingly, a user may log in using the illustrated authentication user interface by supplying his or her credentials in the inputs provided. An authentication module of the web application receives the supplied credentials, and compares the supplied credentials against stored credentials to authenticate the user. If authentication is successful, the user may be provided the level of access to data and/or resources of server platform 110 that is permitted by his or her associated security settings (e.g., roles and permissions).

Figure 8:
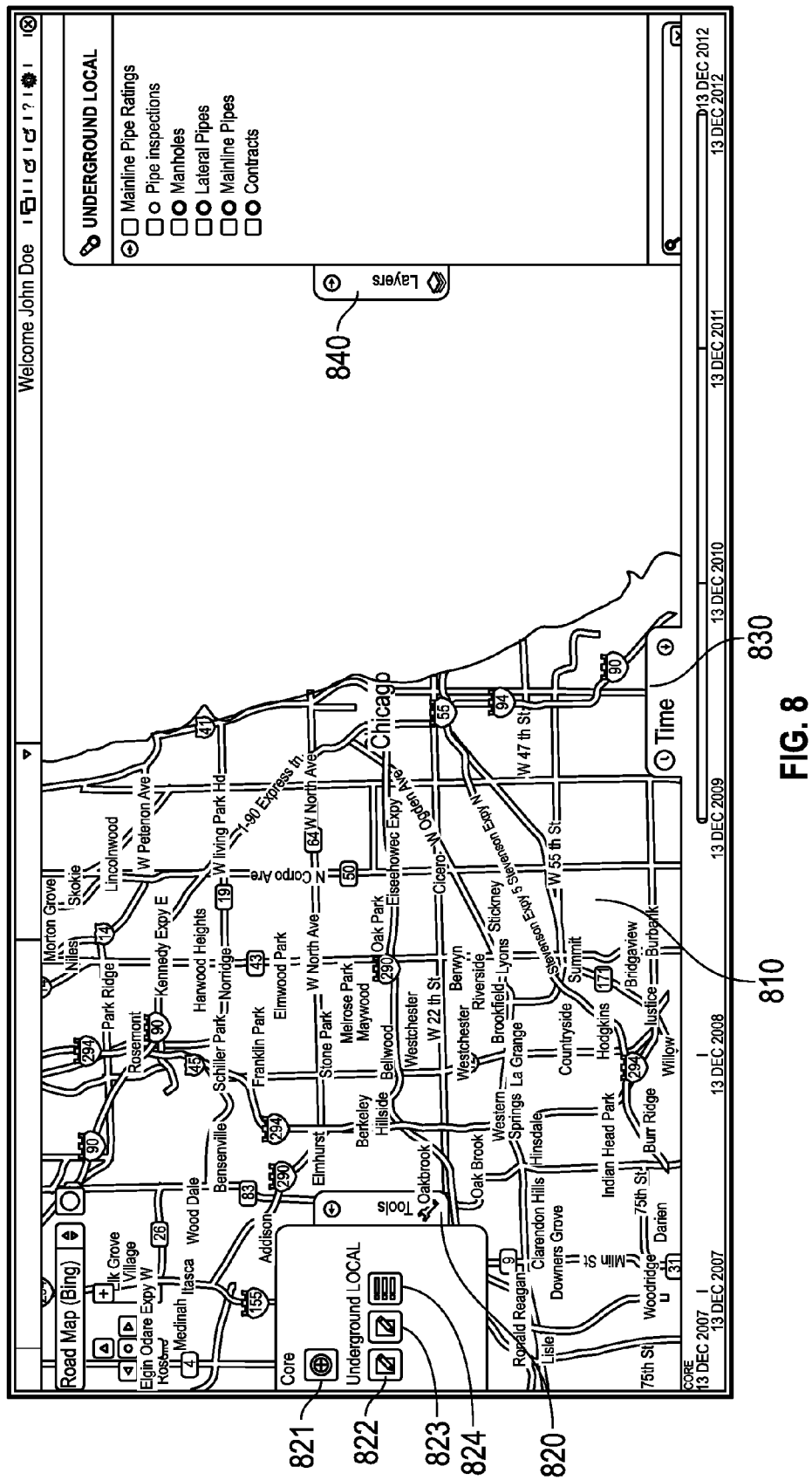
FIG. 8 illustrates a user interface for a web application, according to an embodiment.

FIG. 8 illustrates an embodiment of a virtual map user interface. In this embodiment, an interactive virtual map 810 may be displayed in all or a portion of the user interface. As discussed elsewhere, the virtual map may be derived from third-party map applications, and/or may be stored/cached, processed, and/or augmented on a map server 114 of server platform 110. In the illustrated embodiment, three collapsible tabs, frames, or windows are also provided. Specifically, these tabs comprise a tools tab 820, a time tab 830, and a layers tab 840. Tools tab 820 may comprise a number of clickable tool icons, each of which provides access to a different tool. These tool icons may include, without limitation, a search tool icon 821, a contract list tool icon 822, a contract wizard tool icon 823, and an inspection list tool icon 824.

Figure 9:
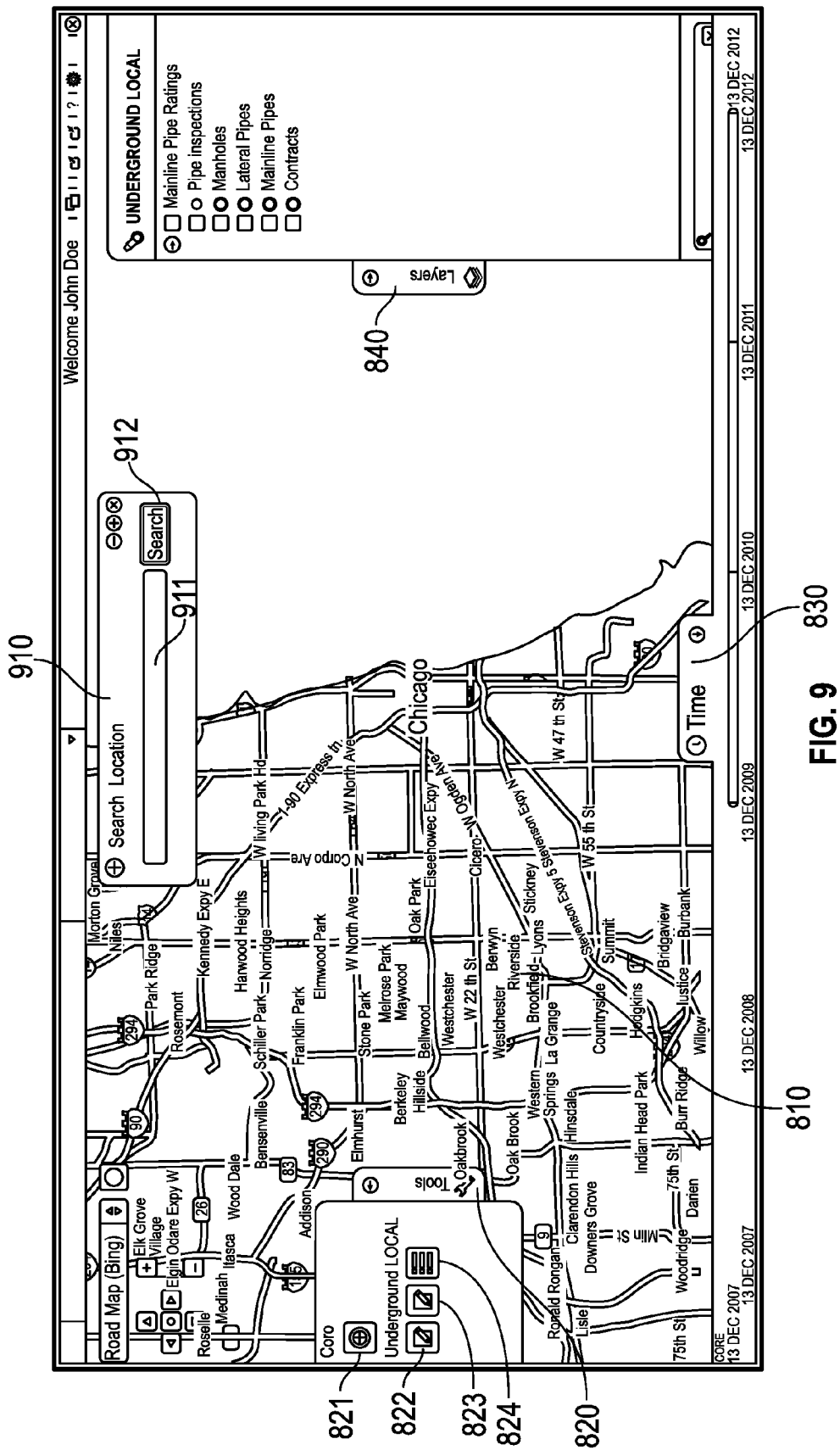
FIGS. 9-12B illustrate user interfaces for various tools of a web application, according to an embodiment.

FIG. 9 illustrates an embodiment of a search tool 910 which may be accessed by clicking on search tool icon 821. Search tool 910 comprises a search location query input 911 and a search activation input 912 (e.g., button, icon, etc.). A user may enter a location (e.g., address, cross streets, city, zip code, etc.) into input 911 and then click input 912 to initiate a location search. The web application will identify the location with respect to virtual map 810 and reposition the view of virtual map 810 to, for example, be centered on the identified location.

Figure 10A:
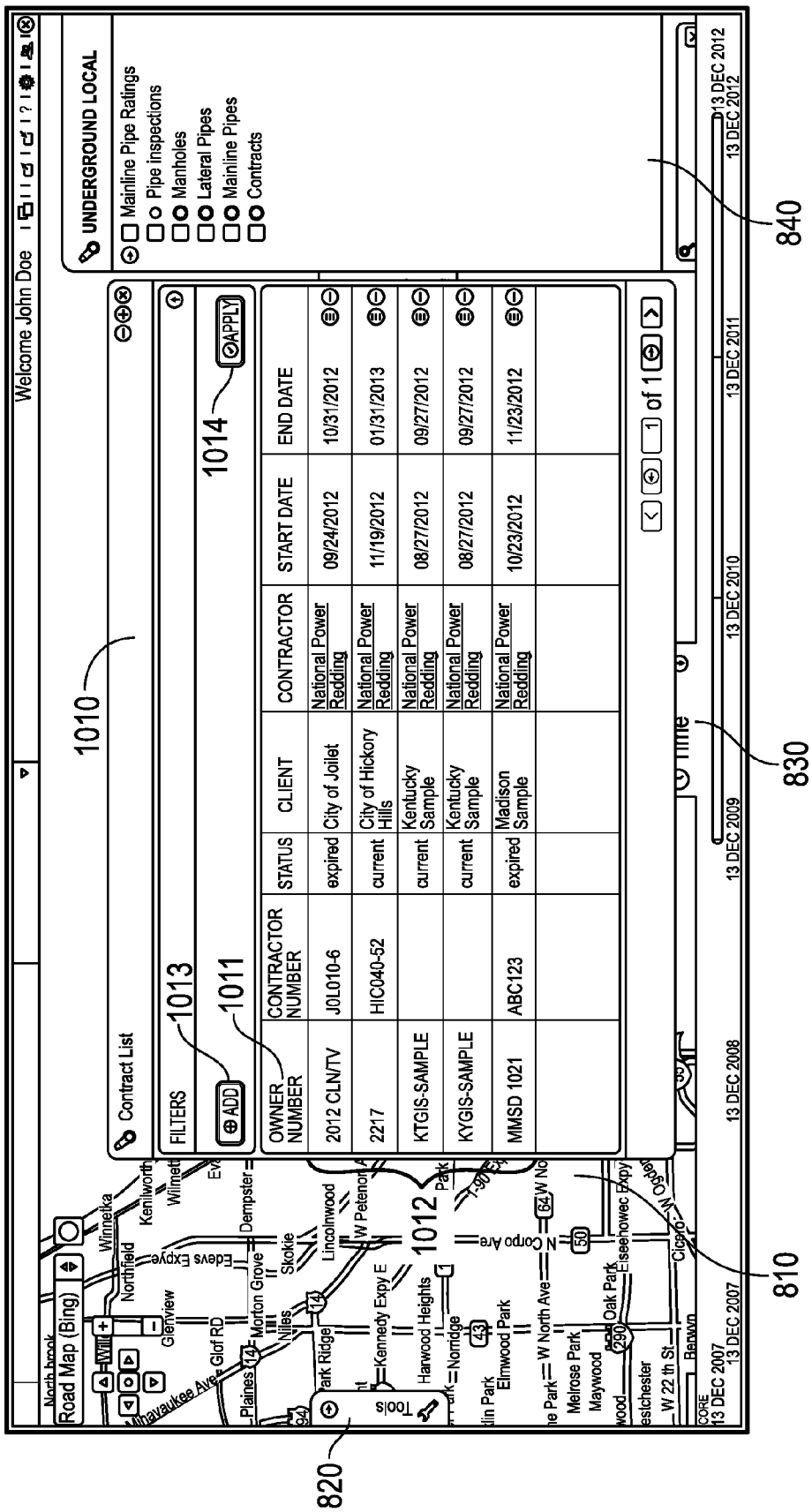
Figure 10B:
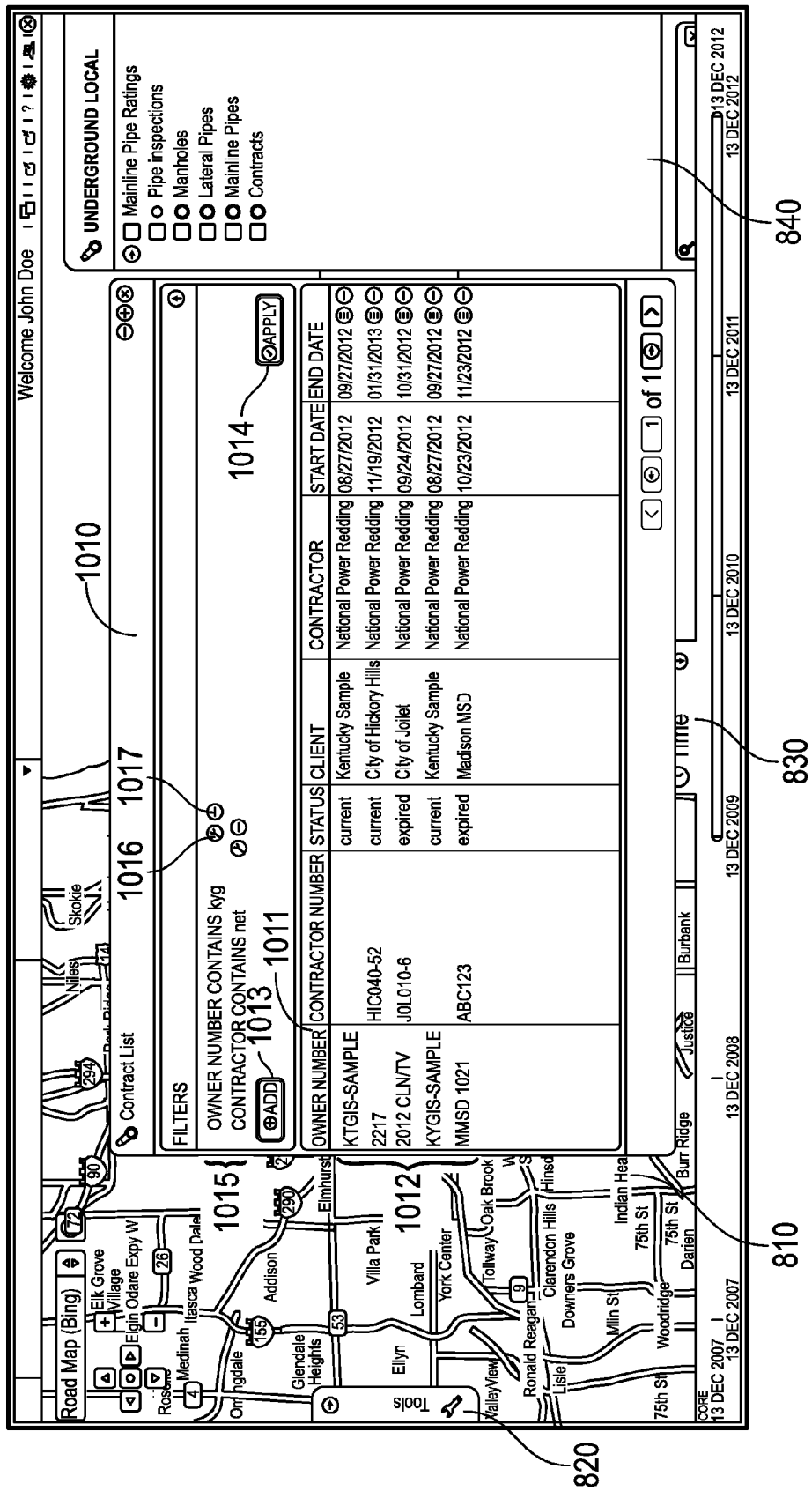

FIG. 10A illustrates an embodiment of a contract list tool 1010 which may be accessed by clicking on contract list tool icon 822. Contract list tool 1010 displays a list of contracts that are available under the user's security settings. In the illustrated embodiment, the contracts are displayed as rows 1012 in a list format. Each row may comprise information that includes, without limitation, an owner identifier, contract or work order identifier, status, client identifier, contractor identifier, start date, end date, etc. The list can be sorted based on columns in either ascending or descending order by clicking a column header 1011. For example, clicking on the "start date" column header will sort rows 1012 in ascending order of start date, and clicking on the "start date" column header again will sort rows 1012 in descending order of start date. Contract list tool 1010 also allows a user to set and apply one or more filters which filter the list of contracts according to defined criteria. For example, a user may add a filter by clicking on input 1013 and apply an added filter by clicking on input 1014. If the user clicks on input 1013, a drop-down menu of filterable indexes (e.g., owner identifier, contract identifier, status, client identifier, contractor identifier, start date, end date, etc.) may be provided. The user may select an index from the drop-down menu and provide one or more values for the index (e.g., character strings, numeric values), including, in some instances, a range of values. FIG. 10B shows contract list tool 1010 with two filters 1015 added. The filters limit the displayed rows 1012 to only those contracts that meet the criteria of filters 1015. In this case, the only contracts listed are those in which the associated owner identifier and contractor identifier contain certain user-defined strings, as specified by filters 1015. The user may be provided inputs 1016 and 1017 which allow the user to modify and delete a filter, respectively.

Figure 11A:
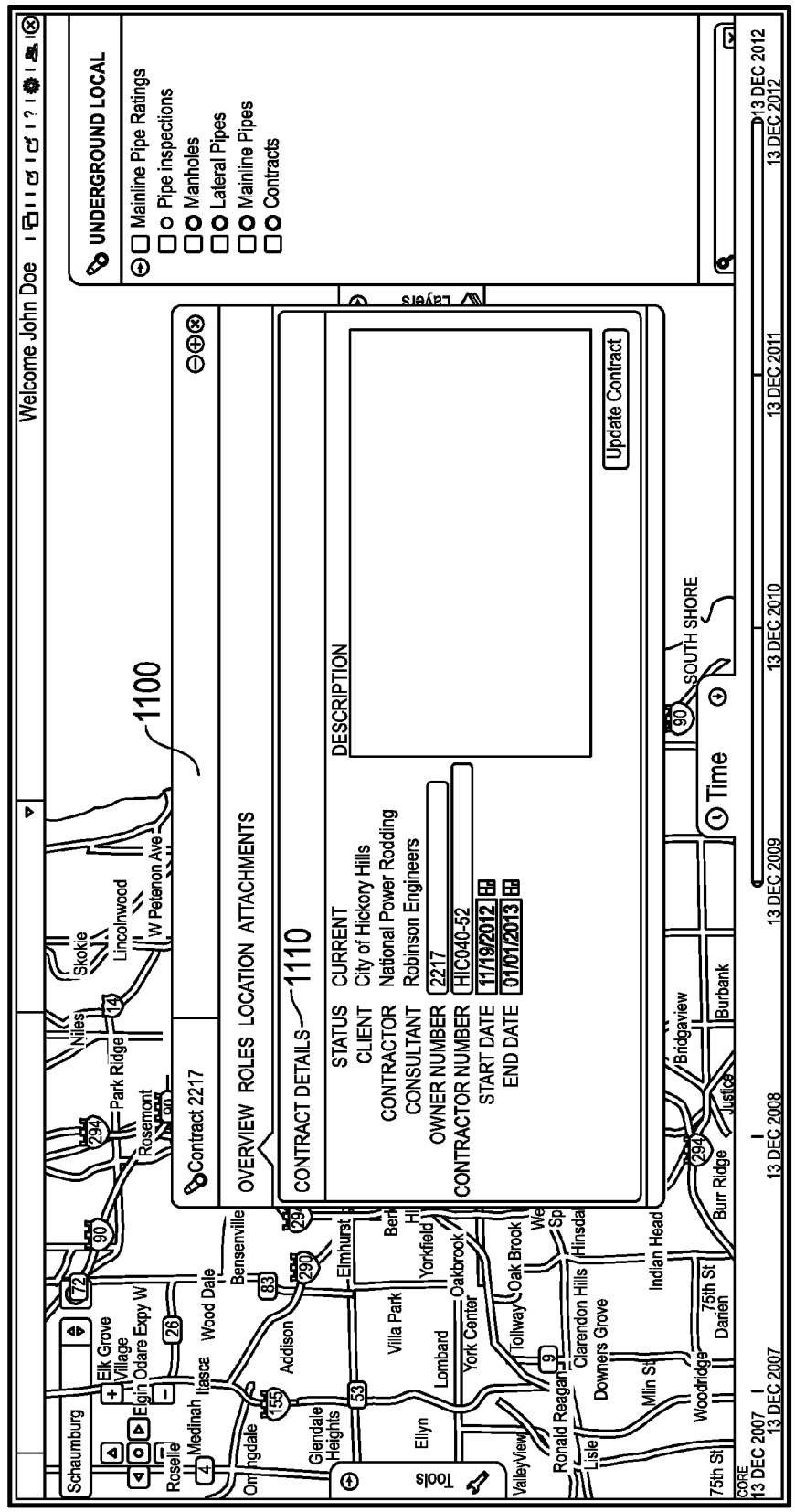
Figure 11B:
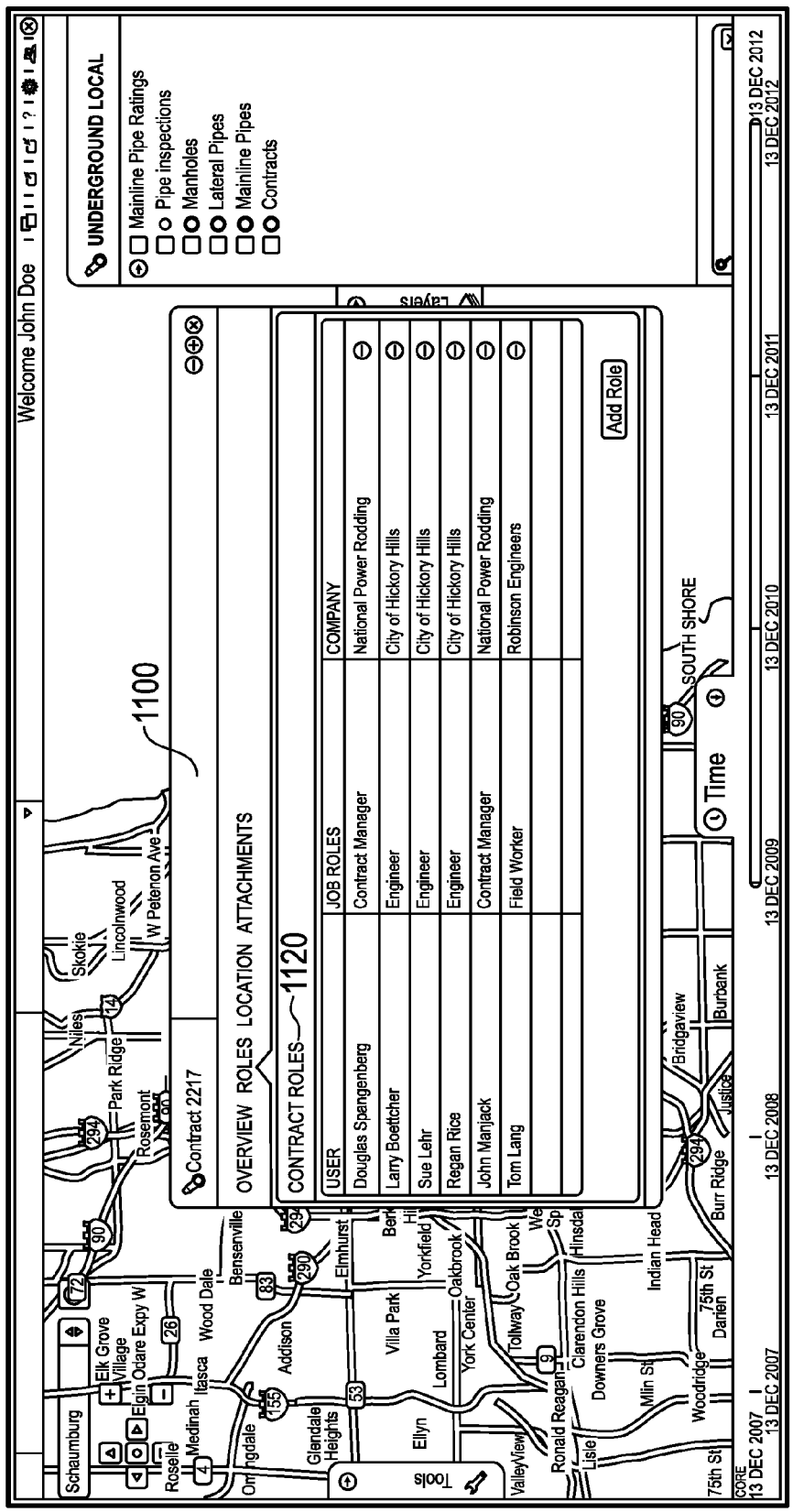

A user may click on one of rows 1012 or an input (e.g., icon) associated with one of rows 1012 to view detailed information about the contract corresponding to that row. A user may also add a contract using a contract wizard tool by clicking on contract wizard tool icon 823. The contract detail view and contract wizard tool may be similar in function and design. FIGS. 11A-11E illustrate embodiments of a contract detail window and/or wizard 1100, which may comprise one or more tabs. In the illustrated embodiment, contract detail window 1100 comprises an overview tab 1110, a roles tab 1120, a location tab 1130, and an attachments tab 1140. FIG. 11A illustrates an embodiment of overview tab 1110 of contract detail window 1100. Overview tab 1110 provides the status of the contract, identifies the client, identifies the contractor, and provides the start and end dates, as well as an optional description. One or more of these fields may be editable. FIG. 11B illustrates an embodiment of roles tab 1120 which provides information on active users associated with the contract, and their roles and/or level of activity within the particular contract.

Figure 11C:
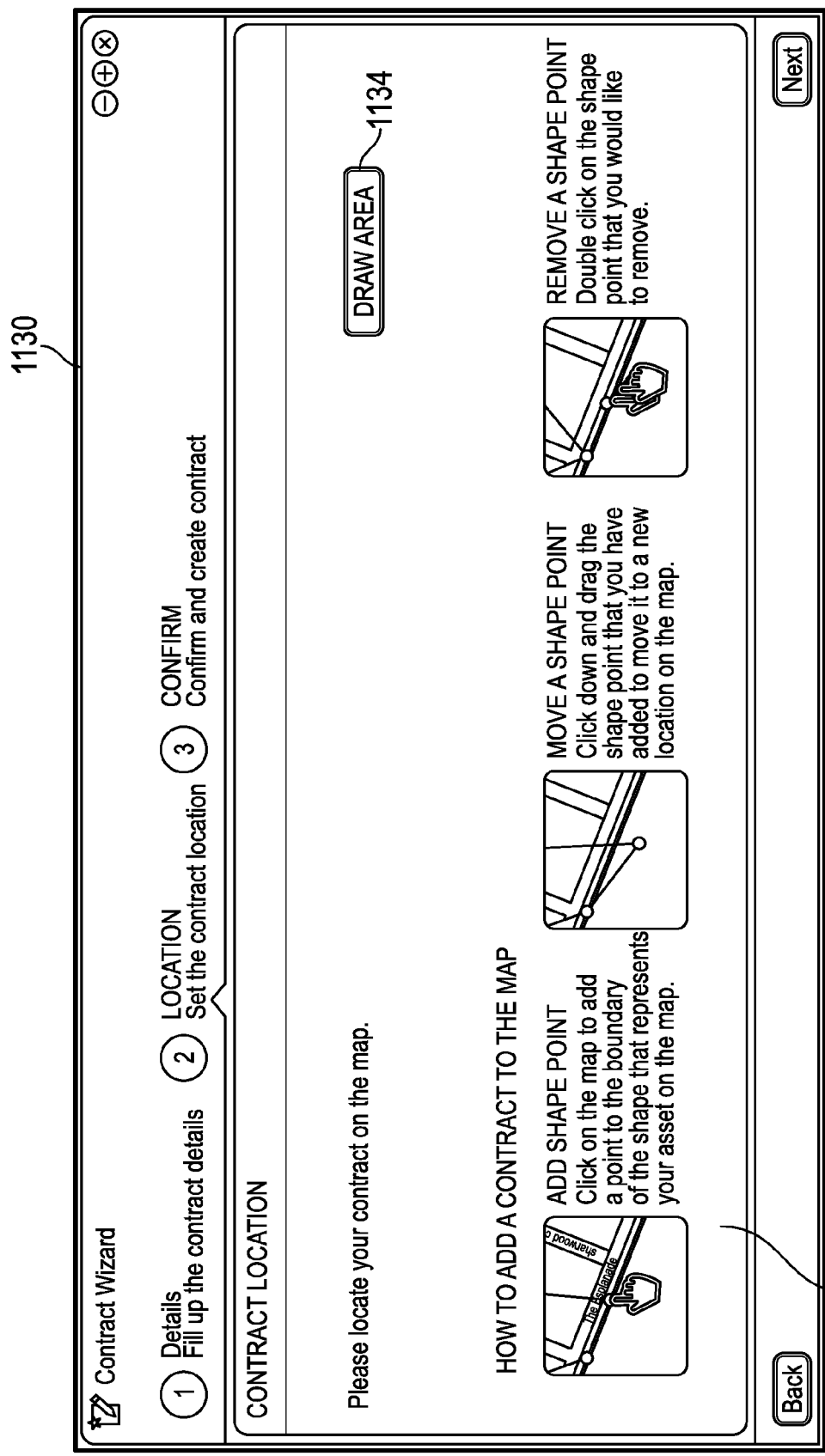
Figure 11D:
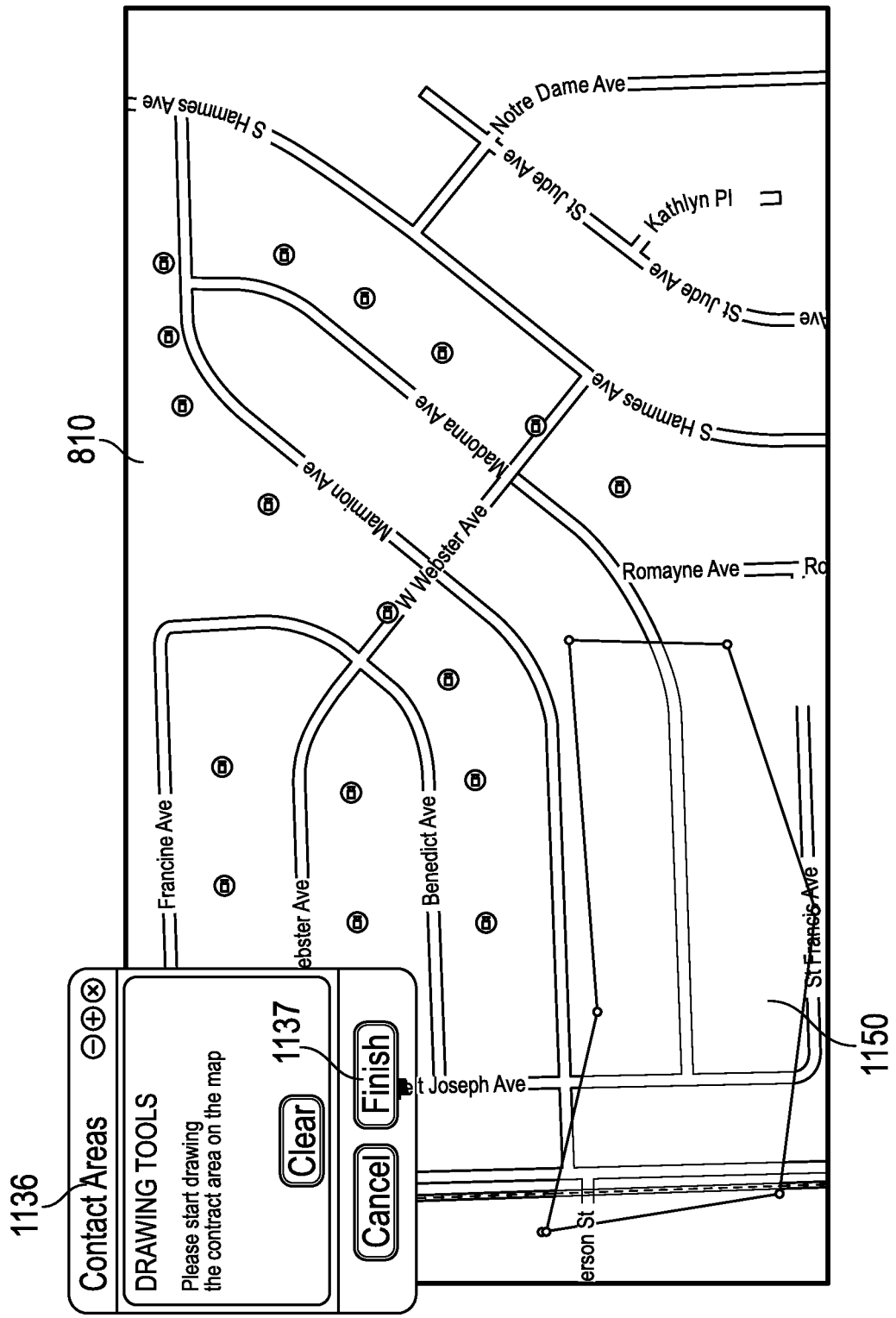

According to an embodiment, location tab 1130 may comprise a drawing wizard, as illustrated in FIG. 11C. Location tab 1130 comprises instructions 1132 for designating a location associated with the contract, such as a geographical region comprising infrastructure assets that are to be maintained or repaired under the contract. Each contract can have a location or area defined for it. Location tab 1130 also comprises an input 1134 (e.g., icon) which allows the user to initiate selection of the location. When a user initiates selection of the contract location or area, the user may be returned to a view of interactive virtual map 810, as shown in FIG. 11D. A drawing tool 1136 may also be provided. In an embodiment, drawing tool 1136 is operated by adding a single click or touch (e.g., from an input device such as a mouse or touch-screen interface) to add a new point to a polygon 1150 overlaid on virtual map 810, and a double click or touch to "close" the polygon 1150 when complete. Once a polygon has been selected, a user may select a finish input 1137 to return to location tab 1130 of contract detail window or wizard 1100. The selected polygon may be converted into a set of geospatial coordinate points and stored in association with the contract. The geospatial coordinates of one or more infrastructure assets can be compared to the geospatial coordinates of the polygon to determine whether the infrastructure assets are within the boundaries of the polygon, and therefore subject to the contract.

Figure 11E:
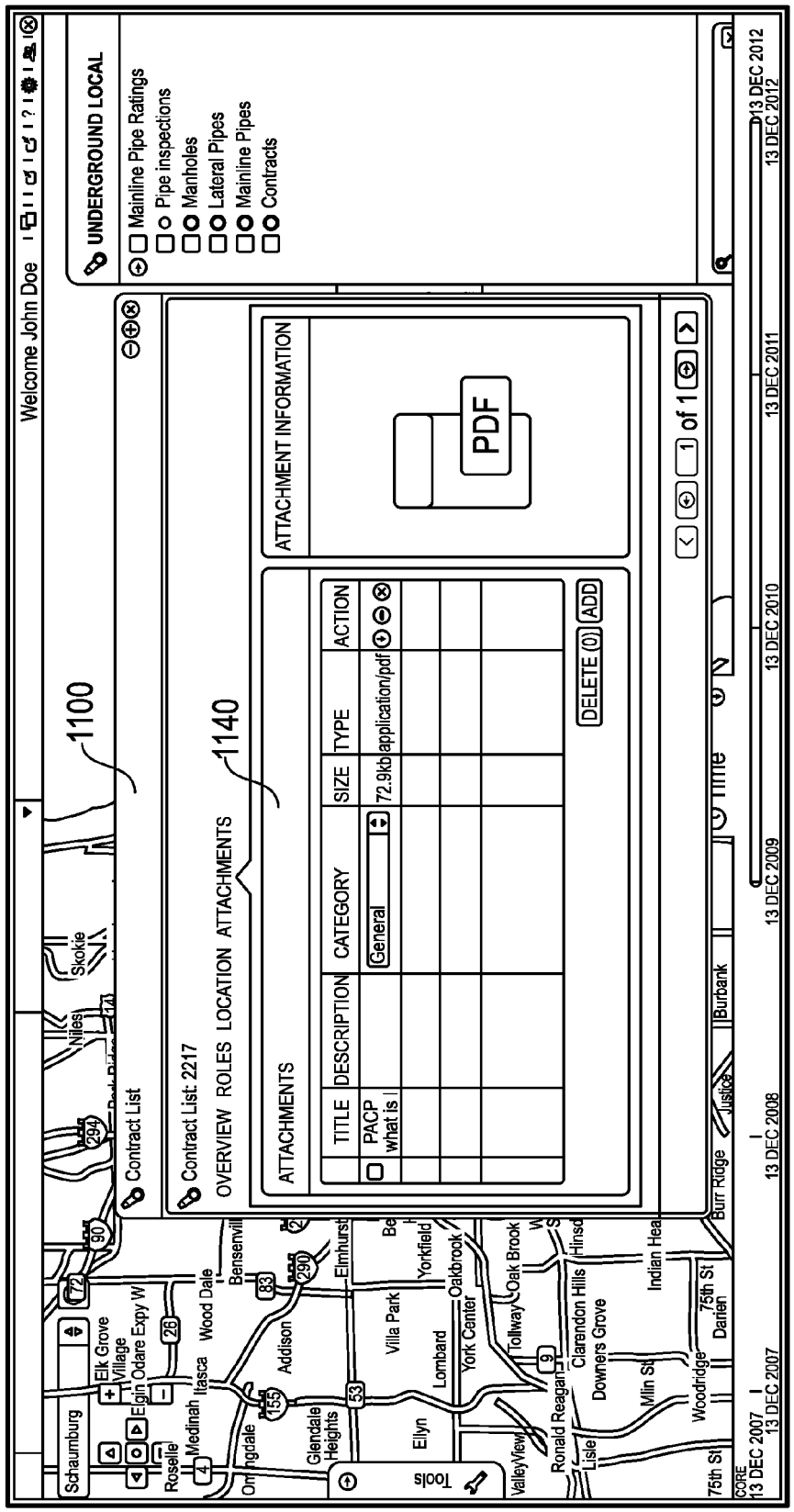

FIG. 11E illustrates an embodiment of attachment tab 1140 of contract detail window 1100. Attachments tab 1140 provides inputs that allow a user to upload documents, which are stored in association with the particular contract. These documents may comprise, for example, contract books, change orders, specifications, maps, work orders, invoices, etc. In an embodiment, all attached documents are available for viewing and downloading in accordance with any associated security settings.

Figure 12A:
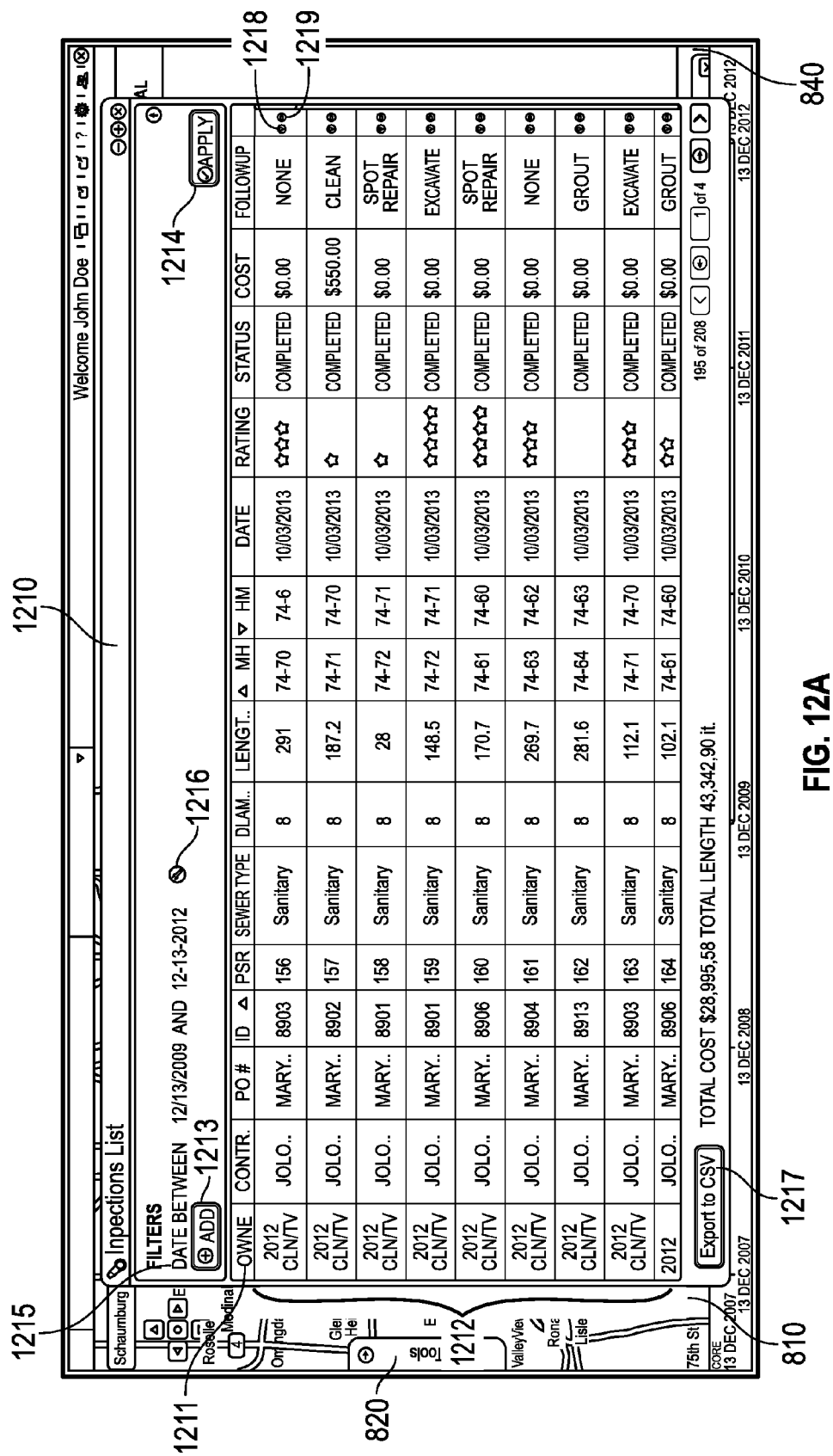

FIG. 12A illustrates an embodiment of an inspection list tool 1210 which may be accessed by clicking on inspection list tool icon 824. The inspection list tool 1210 displays a list of available inspections that are available for review under the user's security settings. In the illustrated embodiment, the inspections are displayed as rows 1212 in a list format. Each row may comprise information that includes, without limitation, an owner identifier, contract or work order identifier, purchase order identifier, PSR, asset identifier, sewer type, pipe diameter, first manhole asset identifier, second manhole asset identifier, date, rating (e.g., PACP rating), status, cost, follow-up, etc. The list can be sorted based on columns in either ascending or descending order by clicking a column header 1211. For example, clicking on the "rating" column header will sort rows 1212 in ascending order of rating, and clicking on the "rating" column header again will sort rows 1212 in descending order of rating. Inspection list tool 1210 also allows a user to set and apply one or more filters which filter the list of inspections according to defined criteria. For example, a user may add a filter by clicking on input 1213 and apply an added filter by clicking on input 1214. If the user clicks on input 1213, a drop-down menu of filterable indexes (e.g., owner identifier, contract or work order identifier, purchase order identifier, asset identifier, sewer type, pipe diameter, first manhole asset identifier, second manhole asset identifier, date, rating, status, cost, etc.) may be provided. The user may select an index from the drop-down menu and provide one or more values for the index (e.g., character strings, numeric values, etc.), including, in some instances, a range of values. Inspection list tool 1210 is illustrated with one filter 1215 added. The filters limit the displayed rows 1212 to only those inspections that meet the criteria of filter 1215. In this case, the only inspections listed are those in which the associated date is within a range defined by a beginning date and ending date, as specified by filters 1015. The user may be provided input 1216 which allows the user to modify a filter, and/or input 1217 which allows a user to export data (e.g., as a comma-delimited (CSV) file).

Figure 12B:
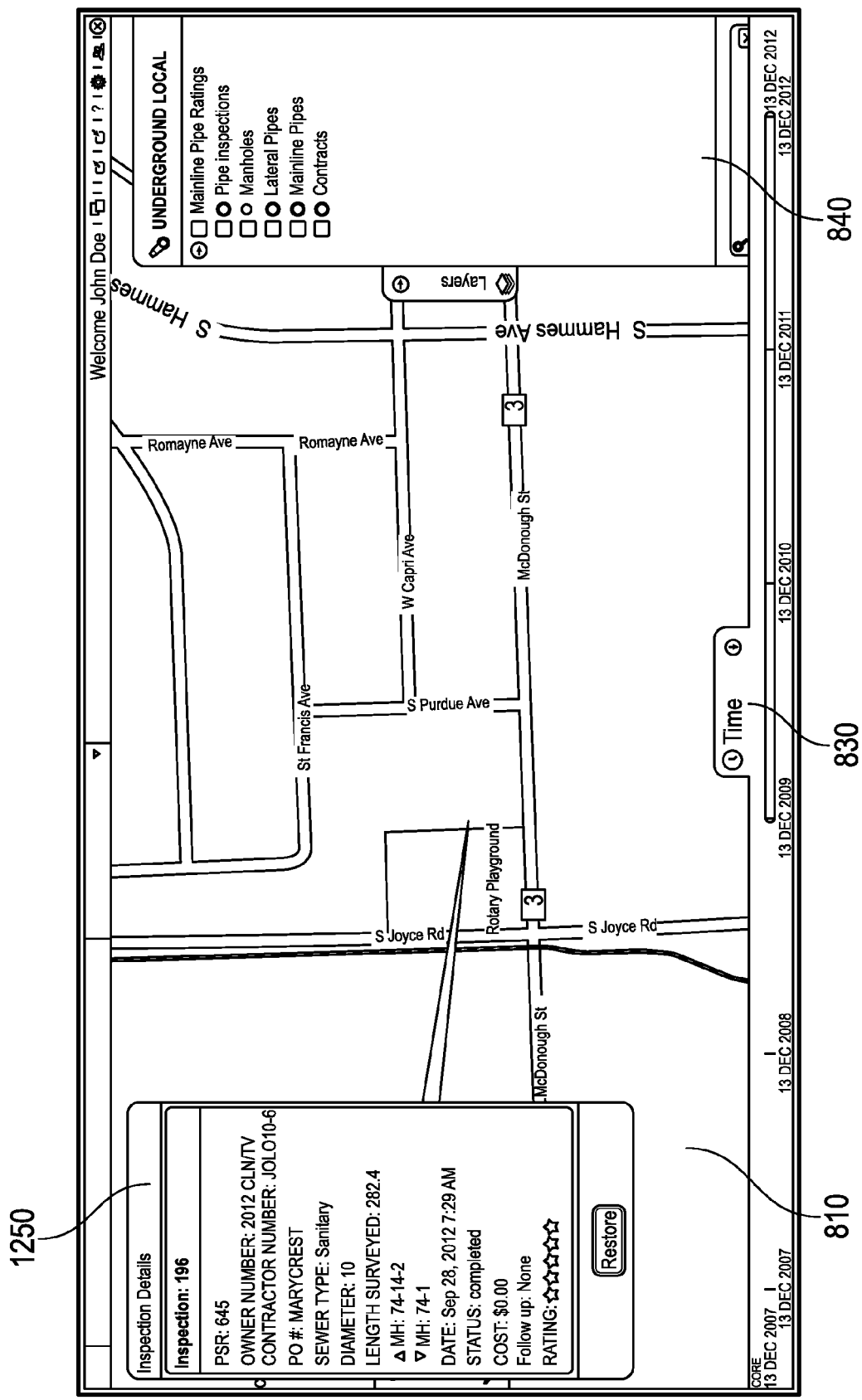

In addition, each row 1212 in inspection list tool 1210 may comprise a locate input 1218 and an inspection review input 1219. If a user clicks on locate input 1218, the location of the inspection associated with the row will be identified on interactive virtual map 810. As illustrated in FIG. 12B, inspection details window 1250 can be shown with a pointer to the location of the relevant asset on virtual map 810. Inspection details window 1250 can comprise inspection data, such as PSR number, pipe size, rating, etc.

Figure 13A:
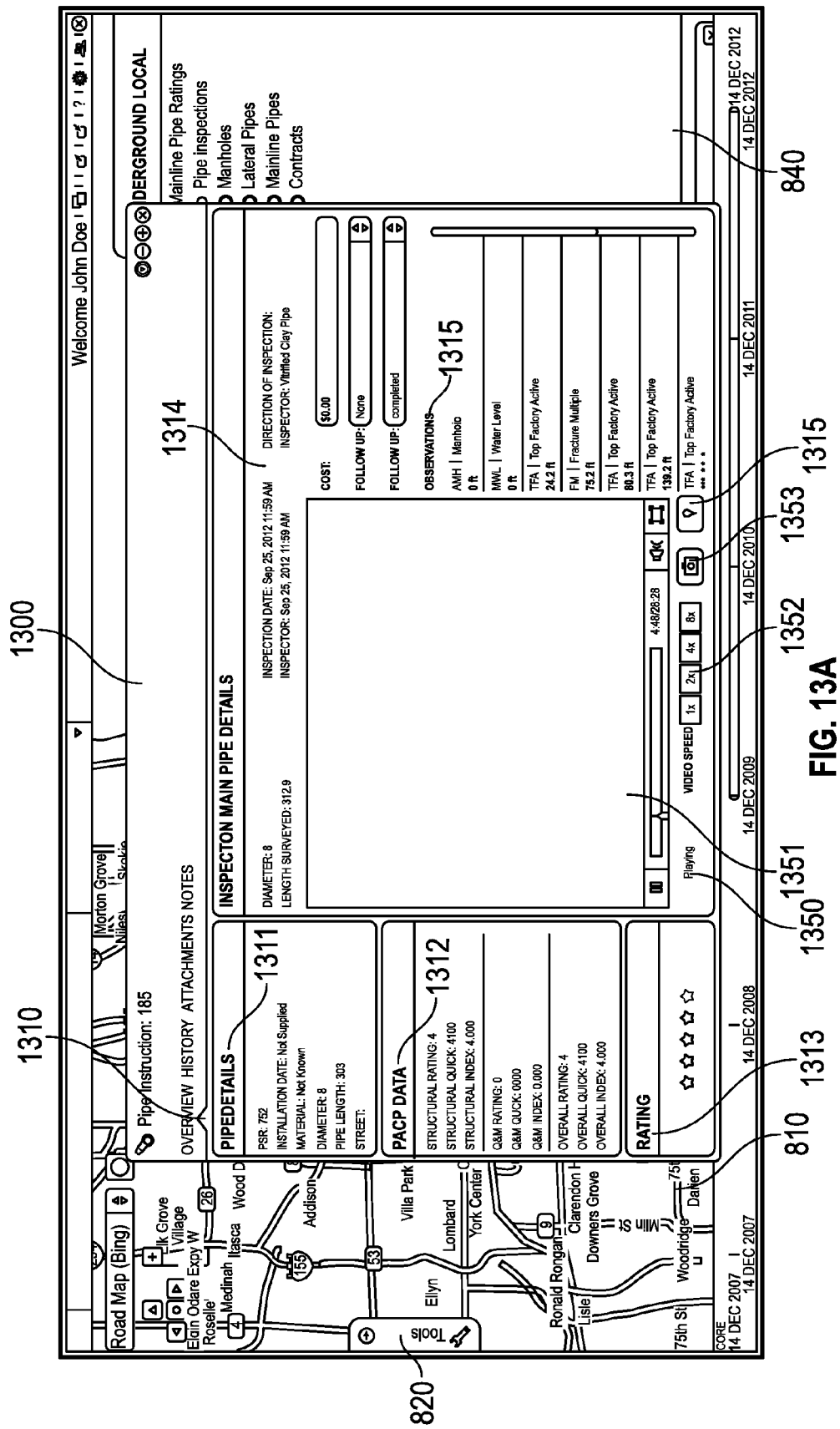
FIGS. 13A-13D illustrate user interfaces for reviewing an inspection in a web application, according to an embodiment.

If a user clicks on inspection review input 1219, an inspection review window may be displayed. FIG. 13A illustrates an embodiment of an inspection review window 1300. Inspection review window 1300 may have one or more tabs. For example, inspection review window 1300 may comprise an overview tab 1310, a history tab 1320, an attachments tab 1330, and a notes tab 1340. Overview tab 1310 may comprise one or more information areas. In this example, overview tab 1310 comprises a pipe details pane 1311, a PACP data pane 1312, a ratings pane 1313, an inspection details pane 1314, an observations pane 1315, and a media player 1350. Pipe details pane 1311 comprises pipe information, such as PSR number, installation date, material, pipe length, street name, etc. Pipe information may be imported from shape files, as described above. PACP data pane 1312 comprises PACP information, such as structural ratings, operations and maintenance ratings, and overall ratings. PACP-certified inspections allow for software to issue these ratings on the inspected pipe sections. Ratings pane 1313 comprises a star rating, which may be initially based on the overall index shown in PACP data pane 1312. In an embodiment, a user may change the rating by clicking on a star of their choosing in ratings pane 1313. Inspection details pane 1314 comprises inspection information, such as inspection date, length of pipe surveyed, direction of inspection, cost, follow-up, status, etc. These inspection details may have been acquired, for example, from inspection data uploaded by an inspection worker in the field (e.g., using the client application disclosed above). In addition, observations pane 1315 may comprise observations made by the inspection worker. An observation may comprise any observation about the pipe, including faults, and may be associated with a distance value (e.g., in feet). The distance value represents the distance from the beginning of the pipe segment being inspected at which the observation was made.

Media player 1350 comprises a media viewing area 1351, two or more speed options 1352, an image capture input 1353, and a locate input 1354. Viewing area 1351 displays the media playback, as well as standard playback controls (e.g., play, stop, time slider, volume/mute, full-screen view, etc.). Speed options 1352 allow the user to playback the video at different speeds (e.g., 1×, 2×, 4×, 8×, etc.). The default speed may be 1×, or may be a user setting or preference. Image capture input 1353 allows a user to capture a snapshot of the video being played. Specifically, if a user clicks image capture input 1353, whichever video frame is being displayed at the time of the user's click will be extracted. The user may save the extracted frame to his or her computing device and/or send the frame to a recipient or otherwise share the frame with another user. Locate input 1354 is similar to locate input 1218, described above, which identifies the location on a virtual map at which the media was collected (e.g., as shown in FIG. 12B). In an embodiment, an interaction (e.g., click) with locate input 1354 will result in the user being shown the location of the particular segment of pipe corresponding to the current frame of the media being shown in media viewing area 1351 (i.e., the location corresponding to geospatial coordinates associated with the segment of pipe at the foot measurement being shown in media viewing area 1351).

Figure 13B:
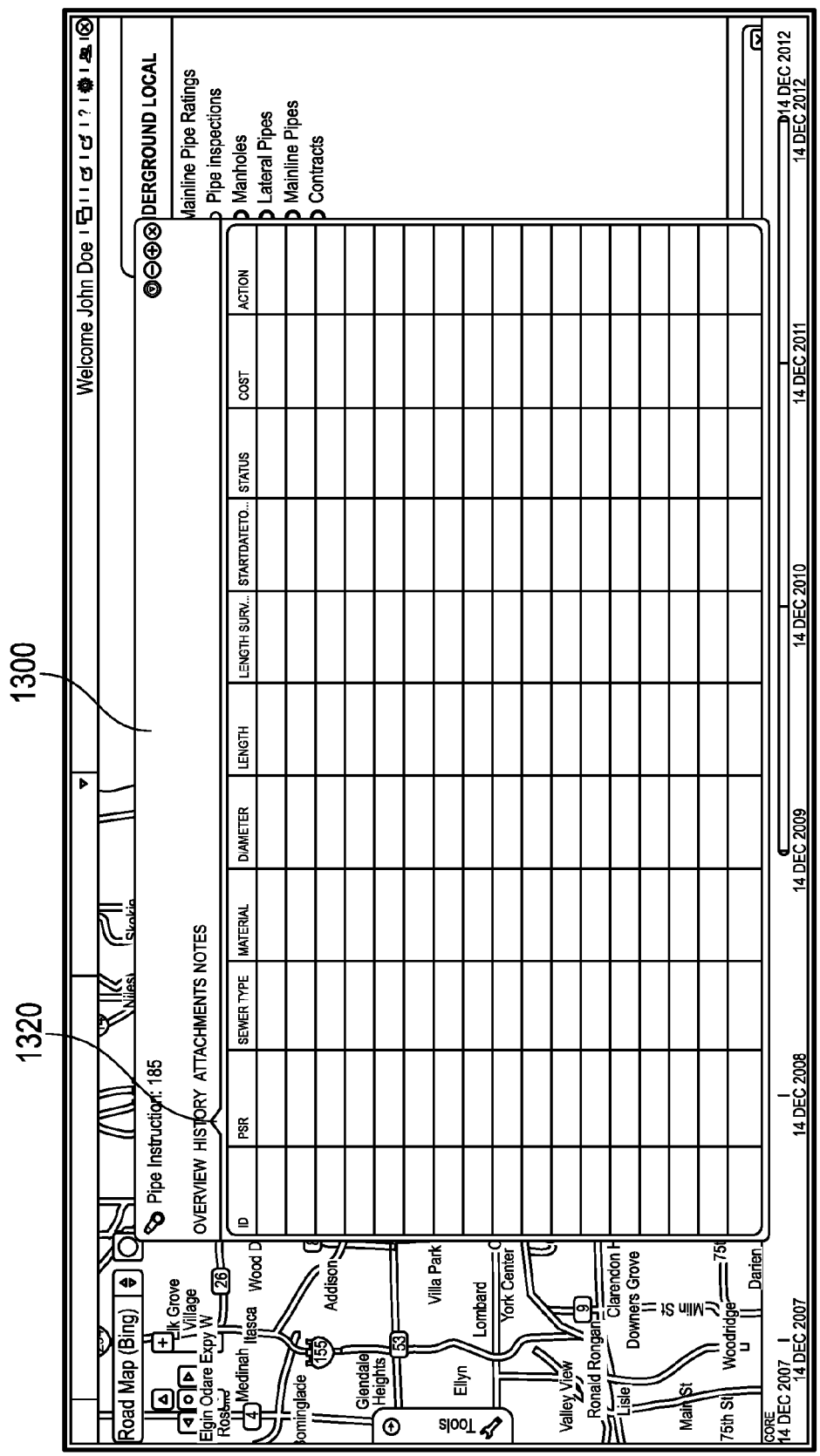

FIG. 13B illustrates an embodiment of a history tab 1320 of inspection review window 1300, which may list historical activity in rows and columns.

Figure 13C:
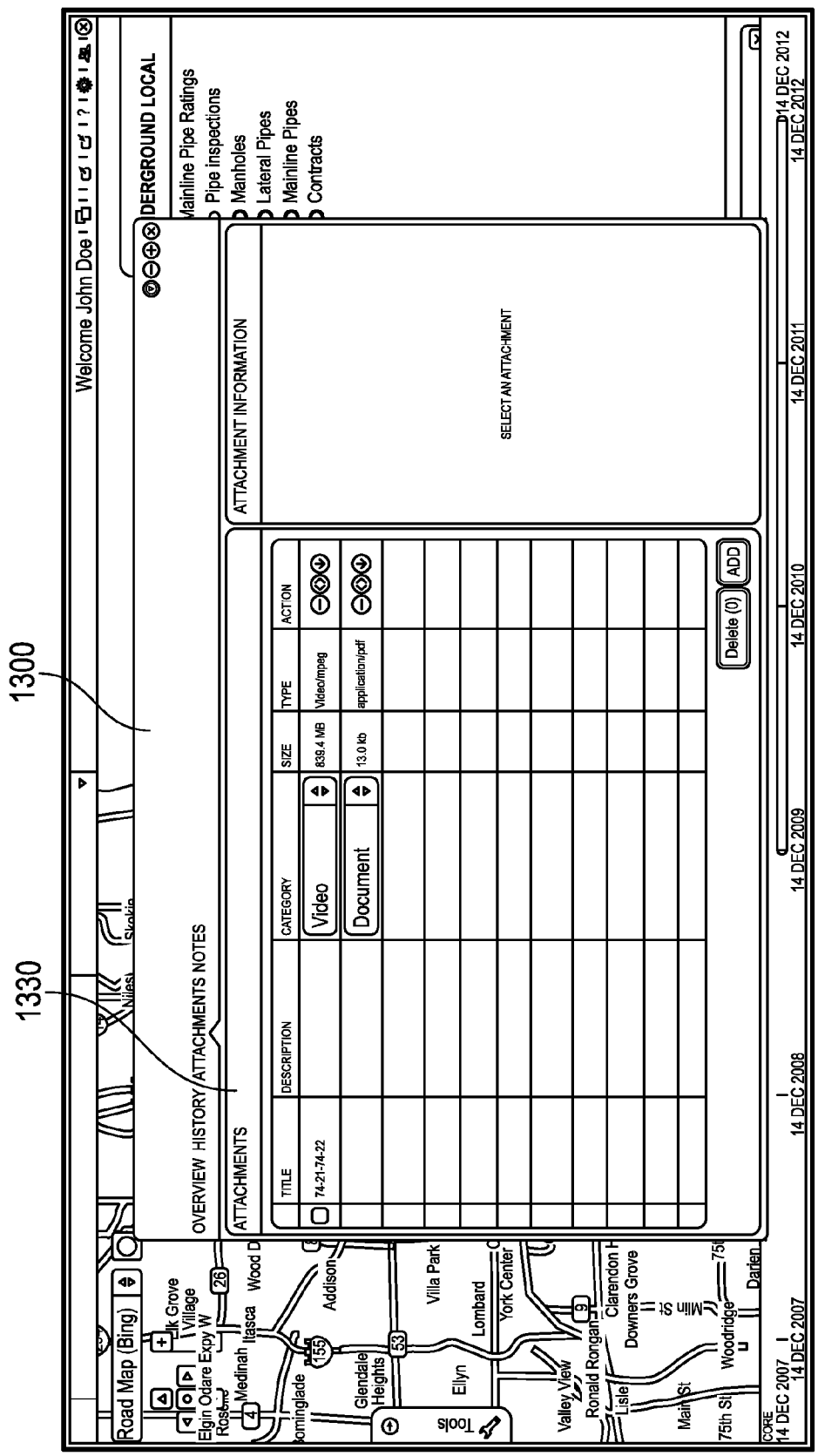

FIG. 13C illustrates an embodiment of an attachments tab 1330 of inspection review window 1300. Attachments tab 1330 allows a user to upload one or more files to be associated with the inspection. These files may comprise any type of file, including, without limitation, videos, images, and documents. The documents may be displayed in a row format, with each row comprising information about a particular file, including, without limitation, a filename, description, category (e.g., video, document, image, etc.), size, file type (e.g., MPG, PDF, etc.). Each row may also be associated with one or more actions, such as "view" (which allows the user to view the file) and "download" (which allows the user to download the file to his or her computing device).

Figure 13D:
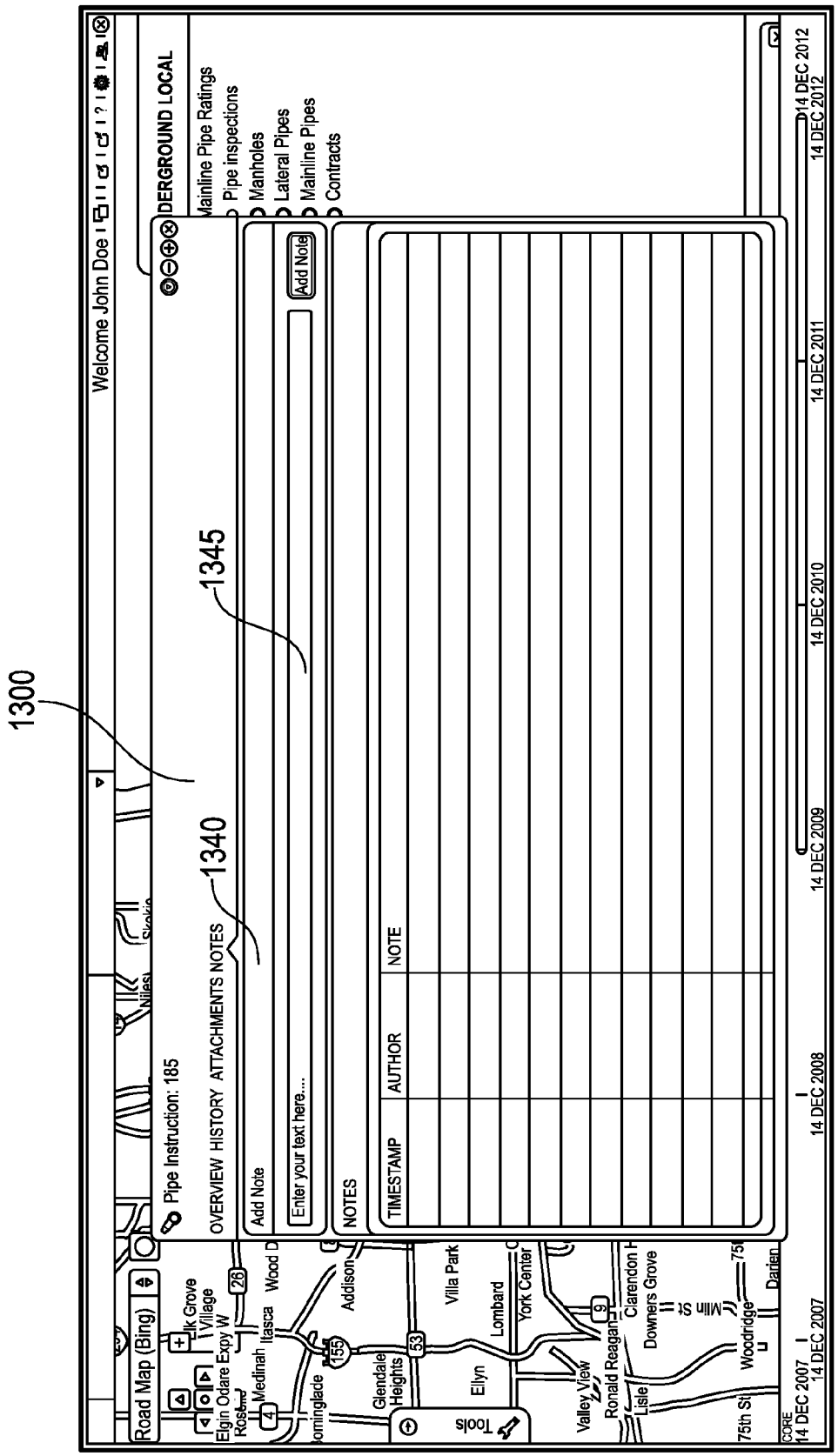

FIG. 13D illustrates an embodiment of a notes tab 1340 of inspection review window 1300. Notes tab 1340 allows a user to attach a note to the inspection. Notes may be entered, for example, using textbox input 1345. Each entered note will be time-stamped to indicate the time that the note was entered and associated with an author, i.e., the user who entered the note. This information may be displayed in notes tab 1340 in row format, with each row comprising a note, the timestamp associated with the note, and the author of the note. Notes tab 1340 may allow users to export this note data (e.g., in CSV format).

Referring again to FIG. 8, layers tab 840 allows users to select which layer or layers they would like to view. Each layer may be listed with an associated checkbox, radio button, or other input, which allows a user to toggle each layer on (visible) or off (hidden or not visible). The layers available to a user may depend on the user's security settings, as well as the scale of virtual map 810. For example, if the virtual map is currently displaying a large geographical area, certain layers (e.g., a layer identifying all pipe segments) may comprise too much data to display on map 810. Layers which are not available may be grayed out or not listed until they are made available (e.g., by the user being granted permissions, or by a user zooming into an area until the corresponding data in the layer has been reduced to an extent that it can be displayed).

As an illustrative, non-limiting example, the layers may comprise a layer for mainline pipe rating, a layer for pipe inspections, a layer for manholes, a layer for lateral pipes, a layer for mainline pipes, and/or a layer for contracts. However, it should be understood that more or fewer layers may be provided, and that different layers may be provided. Initially, layers may be sourced from the CAD or shape files during importation. In an embodiment, a user may define one or more new, arbitrary layers that will be stored and made available to the user and/or made available or shared with other users. For example, a user may define a layer by specifying one or more filter criteria, such as owner identifier, contract identifier, contractor identifier, status, date or dates installed, inspected, or repaired, or any other common asset or inspection attribute. Accordingly, the definition of new layers may be viewed as an extension of the filter functionality disclosed above. For example, when saving a filter, the user may be given the option to save the filter as layer, which would then appear in layers tab 840.

Figure 14:
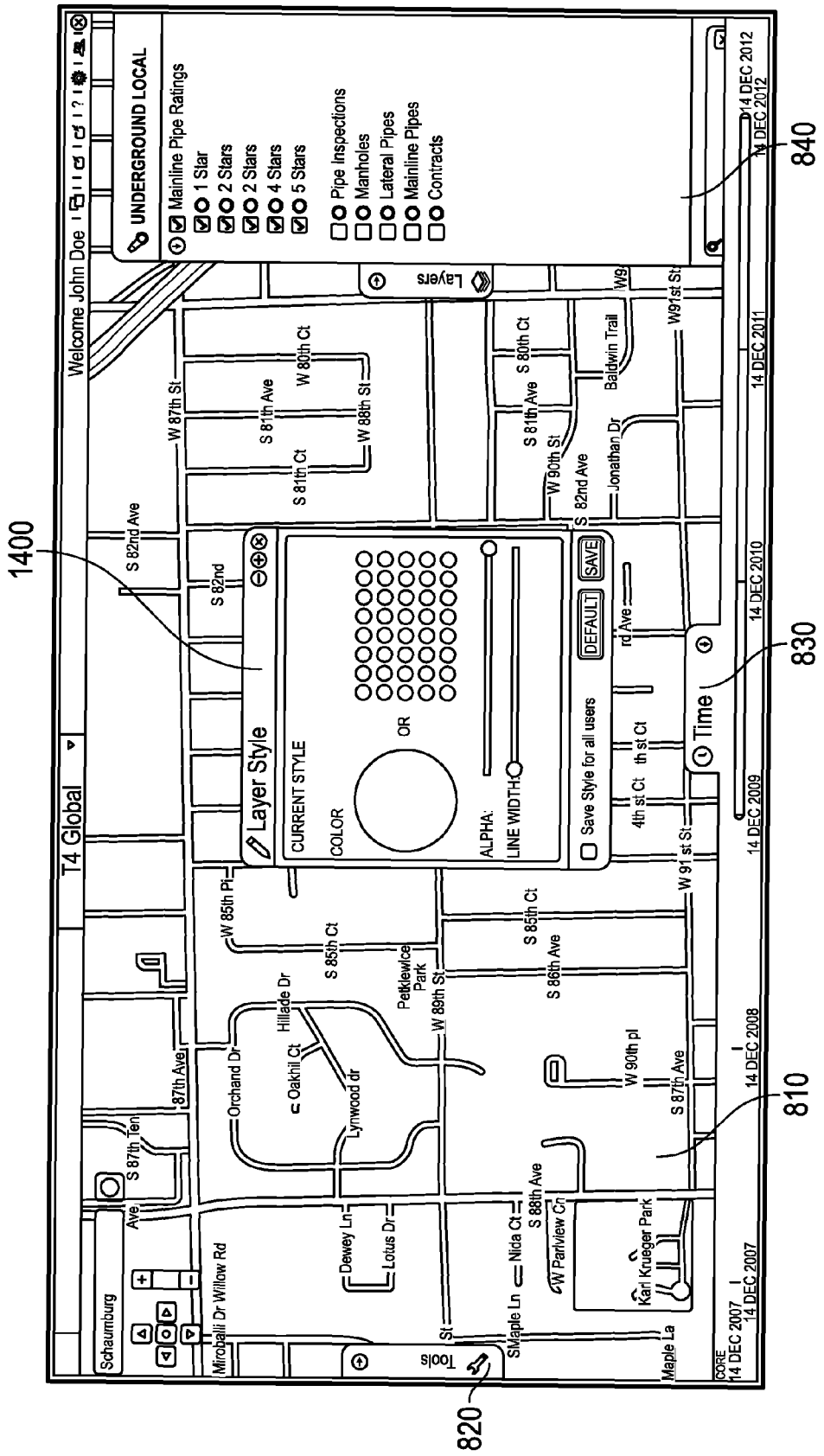
FIG. 14 illustrates a tool for adjusting the style of a data layer, according to an embodiment.

In an embodiment, layers may be arranged hierarchically. For instance, if a user turns on the mainline pipe ratings layer, the layer listing may be expanded to provide separate child or sub-layers for each rating (e.g., one star, two star, three star, four star, and five star). Each of these sub-layers is an individual layer that may also be toggled on and off, for example, using an associated checkbox, radio button, or other input. A layer may also comprise color-coding. For instance, each rating layer under the mainline pipe ratings layer may be associated with a different color. For instance, a one star rating may be associated with green, two star with yellow, three star with orange, four start with dark orange, and five star with red. Then each pipe segment in the layer that is overlaid over virtual map 810 may be represented in the color of its associated rating. For example, a representation of a pipe segment that has a five star rating may be displayed over virtual map 810 in red, a representation of a pipe segment that has a one star rating may be displayed in green, and so on. In an embodiment, each user of the web application may specify different styles for each layer. In an embodiment, a user may edit and save the style of each layer according to the user's own preference. FIG. 14 illustrates an embodiment of a layer style window 1400 which may be utilized to change the colors and adjust the line width used for a particular layer, such as the ratings layers discussed above.

Figure 15A:
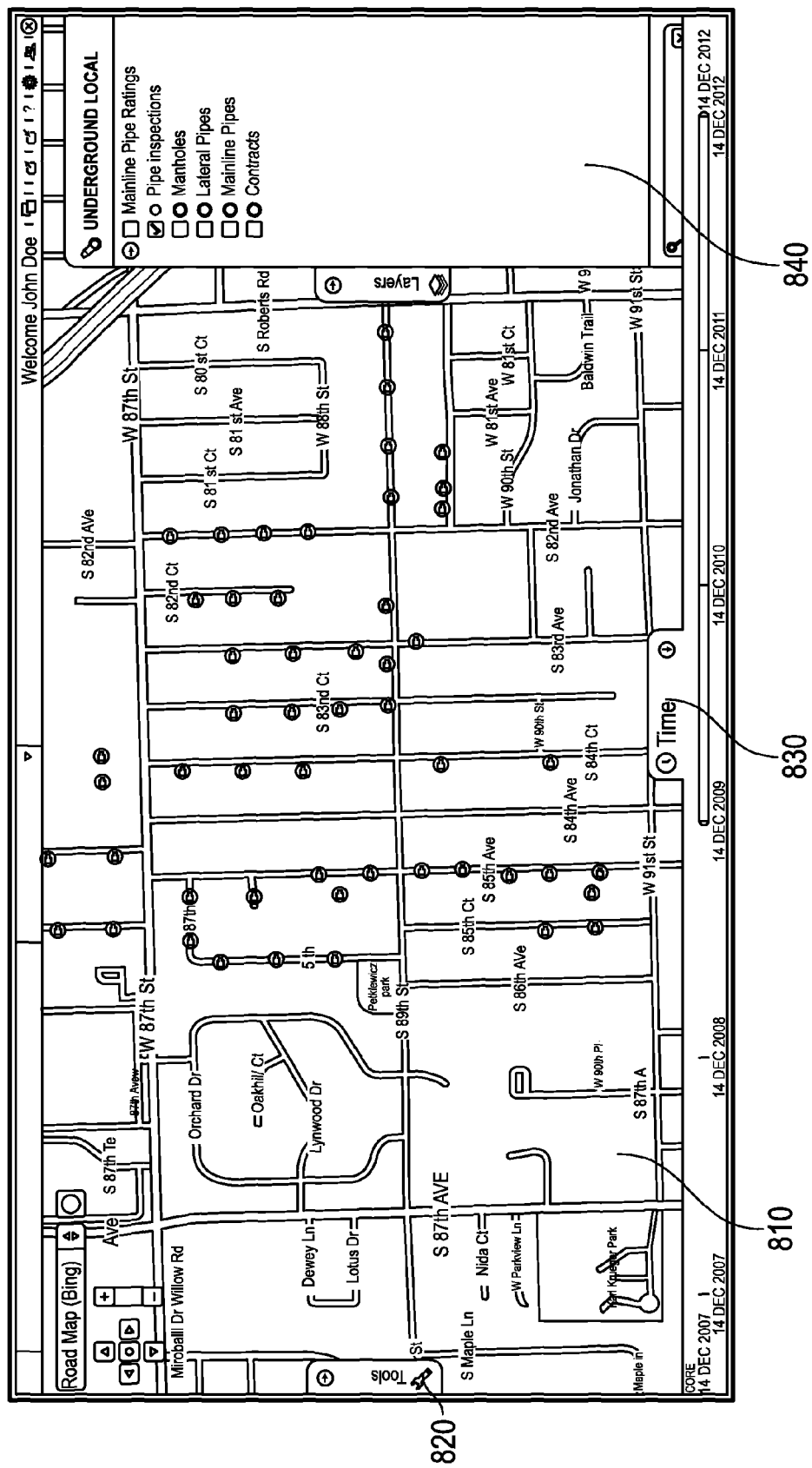
FIGS. 15A-15C illustrates various examples of layers, according to an embodiment.
Figure 15B:
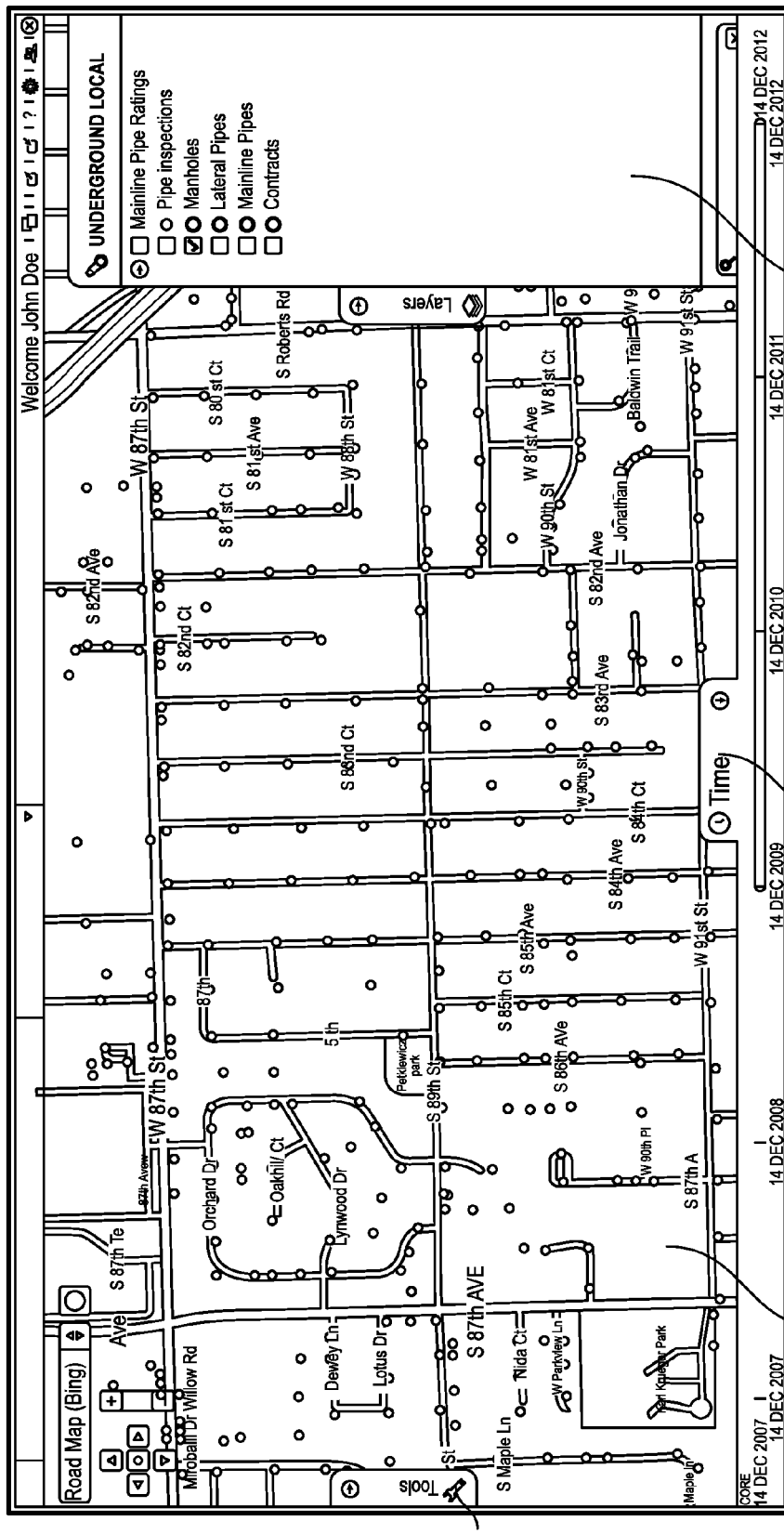
Figure 15C:
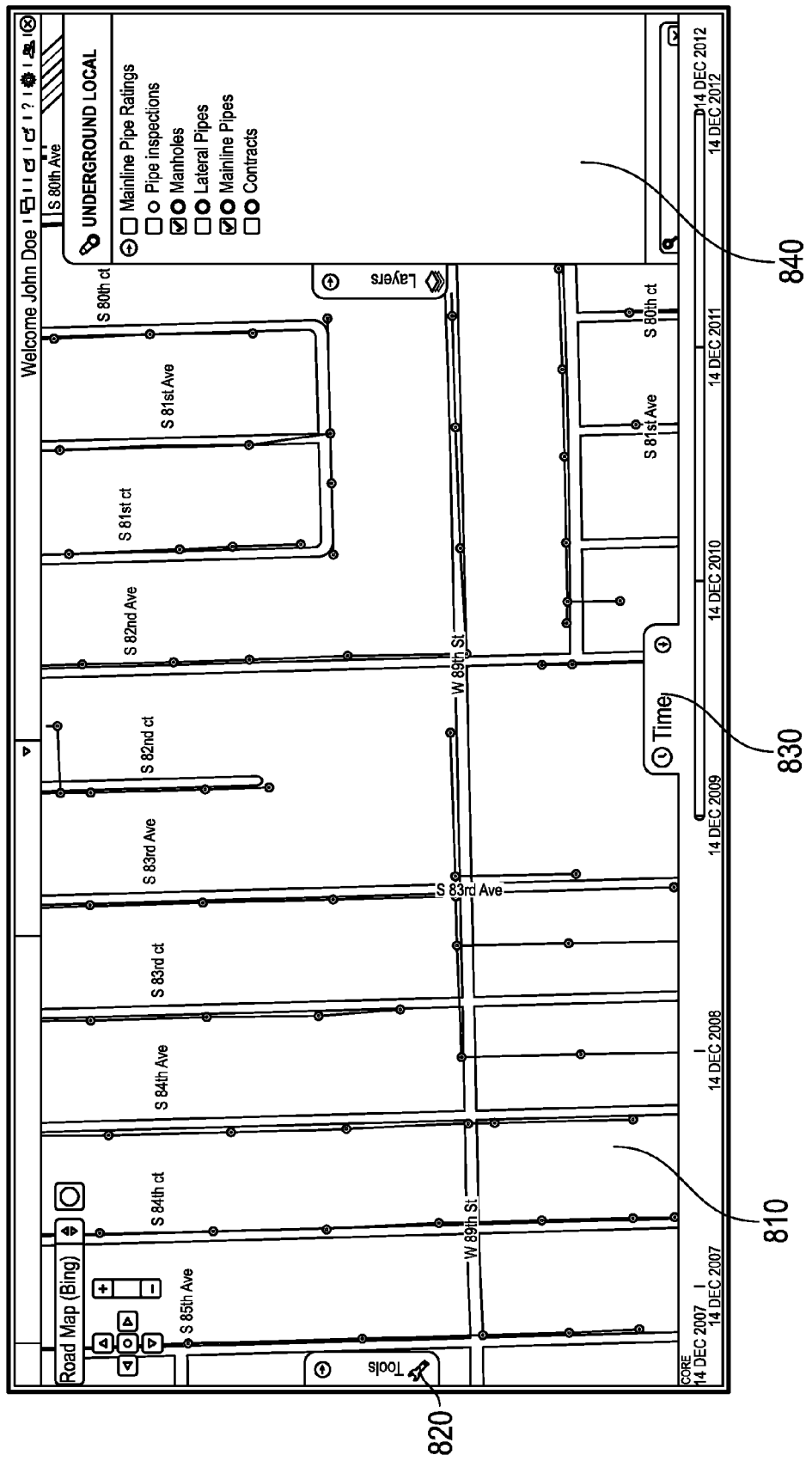

FIGS. 15A-15C illustrate the overlays for various layers, according to an embodiment. FIG. 15A illustrates virtual map 810 with only the pipe inspections layer turned on. The illustrated pipe inspections layer comprises an icon placed at every location on virtual map 810 for which there is a manhole asset with associated inspection data (e.g., as determined by geospatial coordinates of the manhole assets). FIG. 15B illustrates virtual map 810 with only the manholes layer turned on. The illustrated manholes layer comprises an icon placed at every location on virtual map 810 which is associated with a manhole asset. FIG. 15C illustrates virtual map 810 with both the manholes layer and mainline pipes layer turned on. The illustrated combination of these two layers comprises an icon placed at every location on virtual map 810 which is associated with a manhole asset and lines, representing each pipe segment, placed on virtual map 810 according to geospatial information stored for the pipe segments and/or manholes.

Referring again to FIG. 8, time slider tab 830 allows a user to filter data by a selecting a beginning date and ending date, which together define a time range. For example, a user may click on the displayed timeline to set beginning and ending dates, as well as slide a range defined by two dates by clicking and dragging the defined range left or right along the displayed timeline. The time slider may act just like any other filter criteria, and a particular time range defined by the time slider may be saved as a layer. When the time slider is utilized, only data in the selected one or more layers that meet the defined time range will be displayed on virtual map 810.

Example Security Model

As mentioned above, server platform 110 may provide security for restricting access to certain data, modules, and/or functions. In an embodiment, server platform 110 implements three security tiers: access control, authorization, and permissions. A user is given access to platform 110, and is authorized to see certain data and use certain modules, and has one or more permissions to use certain functions. Server platform 110 may employ a central repository for user account information which is managed from an administration application. A central authentication system (CAS) server uses the central repository to authenticate users centrally to all the application environments supported by server platform 110.

When a user attempts to log in to an environment, the application negotiates a login with the CAS server and grants access to the user to one or more of the environments. During the authentication process, the application may also derive or retrieve other information about the user, such as full name, basic contact details, employer, and/or global security groups and roles. The global security groups and roles are used to authorize a user to the application. Once a user is in the application, the groups and roles are used again to authorize a user for certain application modules. Once in a certain application module, the user is mapped to application-specific roles and permissions. A "permission" refers to a fine-grained security control that represents a permission to perform a certain function or functions (e.g., a permission may be "can save work orders"). In an embodiment, each data object returned from spatial database 116 may be associated with a per-object bit string (or other data representation) representing the permissions required for access to that data object.

In one embodiment of a security model, as a general rule, access to data by a user is denied by default for any data that the user does not own. Authorization may be determined by groups, roles, and permissions, as well as participation, relationship, and jurisdiction constraints (e.g., a user's ownership of data, a user's relationship to another party, a user's participation with an entity, a user's relationship to another party that participates in an entity, a user's jurisdiction, a user's relationship with another party with a jurisdiction, etc.).

Groups, roles, and permissions refer to structures that are used to define authorization at various levels of granularity. A group is a collection of roles, and a role is a collection of permissions. Groups, roles, and permissions are collected into sets by security contexts. A security context comprises all the groups, roles, and permissions for a particular application, module, or domain. For example, a work orders context contains all the groups, roles, and permissions for a work orders module. Roles and permissions are used for authorization, whereas groups are just means for collecting roles and assigning them quickly to a user. When a user is mapped to a group, the user gets all the roles granted to that group, along with the permissions granted for those roles. A user can be assigned a group, role, or permission directly, or indirectly via a collection (e.g., a user can gain a permission by being granted a role that has that permission).

Data access may be governed by a combination of groups, roles, and permissions and participation, relationship, and jurisdiction constraints. Participation, relationship, and jurisdiction constraints refer to access granted to data by virtue of ownership of the data, a relationship with the owner or jurisdiction of the data, or participation in an activity or jurisdiction represented or managed by the data. "Jurisdiction" refers to a spatial area in which a party has the authority to operate or delegate authority to operate in to other parties. A user has direct access to data that it owns. However, only a small number of users may own data directly. Most users may access data via the user's participation in data (e.g., a contract or relationship with another user). Example data authorization schemes may include, without limitation: a user's ownership of data (e.g., by default, users can see data owned by their employer), a user's relationship to another user (e.g., approved subcontractors for a contractor can see projects that the contractor owns), a user's participation with an entity (e.g., a user working on a contract as contract manager can see those contracts), a user's relationship to another user that participates in an entity (e.g., employee-users of an employer-user can see the contracts that are being worked on by other employee-users), a user's jurisdiction (e.g., a user can view data within a particular municipality's boundary), a user's relationship with another user within a jurisdiction (e.g., a user can view data in a municipality's boundary if the user is an approved contractor), etc. Authorization can be granted to users for data entities (e.g., contracts, work orders, etc.), second class assets (i.e., an asset that is data only, such as contracts, work orders, etc.), first class assets (i.e., an asset that is fully managed under the asset management life cycle), and/or asset catalogues.

In an embodiment, security settings (e.g., one or more groups, roles, and permissions, and/or participation, relationship, and jurisdiction constraints) may be associated with one or more layers described above. For example, a user (e.g., asset owner, inspection contractor manager) could open up access to additional users by granting them access to the record contained within a saved filter or layer. This could be used to create temporary access to a range of inspections, for instance, to support a bid package.

Additional Features

In an embodiment, server platform 110 is a platform for more than the disclosed application. For example, the disclosed application may simply be one of a plurality of application modules that are served by server platform 110. All of these application modules may interface with and utilize spatial database 116 and/or map server 114 to provide functionality based on the geospatial-based infrastructure data stored in spatial database 116.

Server platform 110 may provide runtime configuration, an administrative console, multi-level logging, error reporting, and/or state dumps. Runtime configuration refers to a mechanism whereby an application module can be configured at startup to specific environment configurations. For example, applications in production access production services on servers that are different than those supporting development or test services. The administrative console provides the ability to execute code in the runtime application. Multi-level logging refers to the ability to log information at different levels of interest (e.g., debug, error, etc.) and display that information inside the application, or push it back to the server, at runtime. Error reporting refers to a part of the logging framework that is always on. If severe errors occur in the client and/or the server, they can be logged centrally with stack traces and context information.

In addition, server platform 110 may provide user interface modules, which are separate from the application modules. A user interface module provides a specific, modular view (e.g., street view), whereas an application module provides application-specific views and functions and may use a number of user interface modules.

While embodiments herein have primarily been disclosed with reference to video inspections, it should be understood that other types of inspections may be supported as well. Newer technologies, such as laser scanning and 360° panoramic imagery, may also be supported by the disclosed application. For instance, media player 1350 may be configured to play or otherwise present image data collected by laser scanning and panoramic imaging.

In an embodiment, users may be provided the ability to create generic records and notes about individual points on virtual map 810. These records or notes would not have to be stored in a specific asset or inspection layer, but could be recorded against a point, line, or polygon, and broadly categorized. This allows field workers to systematize a lot of their knowledge of the applicable infrastructure (e.g., sewer infrastructure), thereby making it available to other users.

Currently, there are hundreds of different PACP observation codes, but no categorizations, rankings, or prioritizations of these codes. In an embodiment, PACP observation codes could be categorized, rated, or prioritized to create filters and layers. These filters or layers can be used to identify critical types of faults, and filter data by groups of PACP codes, without users having to remember every PACP code to include in a filter every time they need to view such data.

In an embodiment, server platform 110 may be compliant, not only with PACP, but also with the metadata requirements for inspections under the Lateral Assessment and Certification Program (LACP) and Manhole Assessment and Certification Program (MACP).

As discussed above, the disclosed application may allow automated NASSCO reporting. In addition, the disclosed application may also automate other reporting requirements. For example, currently, water utility operators in California are required to submit SSO reports electronically into a statewide database. Typically, operators retain no more than a paper copy of such submissions. The disclosed application can be used to automate these mandatory reporting requirements and digitalize operators' record-keeping.

In an embodiment, server platform 110 may comprise one or more public APIs, which allow third-party systems (e.g., third-party system 140) to link to data within server platform 110 from within their own platforms. Server platform 110 may also utilize one or more APIs to access data (e.g., asset data, work order data, etc.) from third-party systems (data sources 142, 144, 146, and 148). Such third-party data may be displayed as one or more overlays on virtual map 810 within the disclosed application.

In an embodiment, server platform 110 provides a bid management module that leverages the disclosed contract management functions to manage a process whereby multiple contractors can bid on a potential contract (e.g., for one or more inspections or other sewage management functions). In this embodiment, an inspection could be linked to both a contract record and a bid record.

Although the disclosed embodiments have been primarily described with respect to a sewer infrastructure, it should be understood that data for other infrastructures may be imported into spatial database 116 and displayed as one or more layers on virtual map 810, as well as integrated into the other disclosed functions and applications of server platform 110. Examples of such infrastructure include, without limitation, roads, sidewalks, water distribution lines, gas distribution lines, electrical distribution lines, and the like. In addition, other non-infrastructure data may also be imported into spatial database 116 and integrated into the disclosed functions and applications of server platform 110, such as property records and boundaries, easements, and the like.

Example Processing Device

Figure 16:
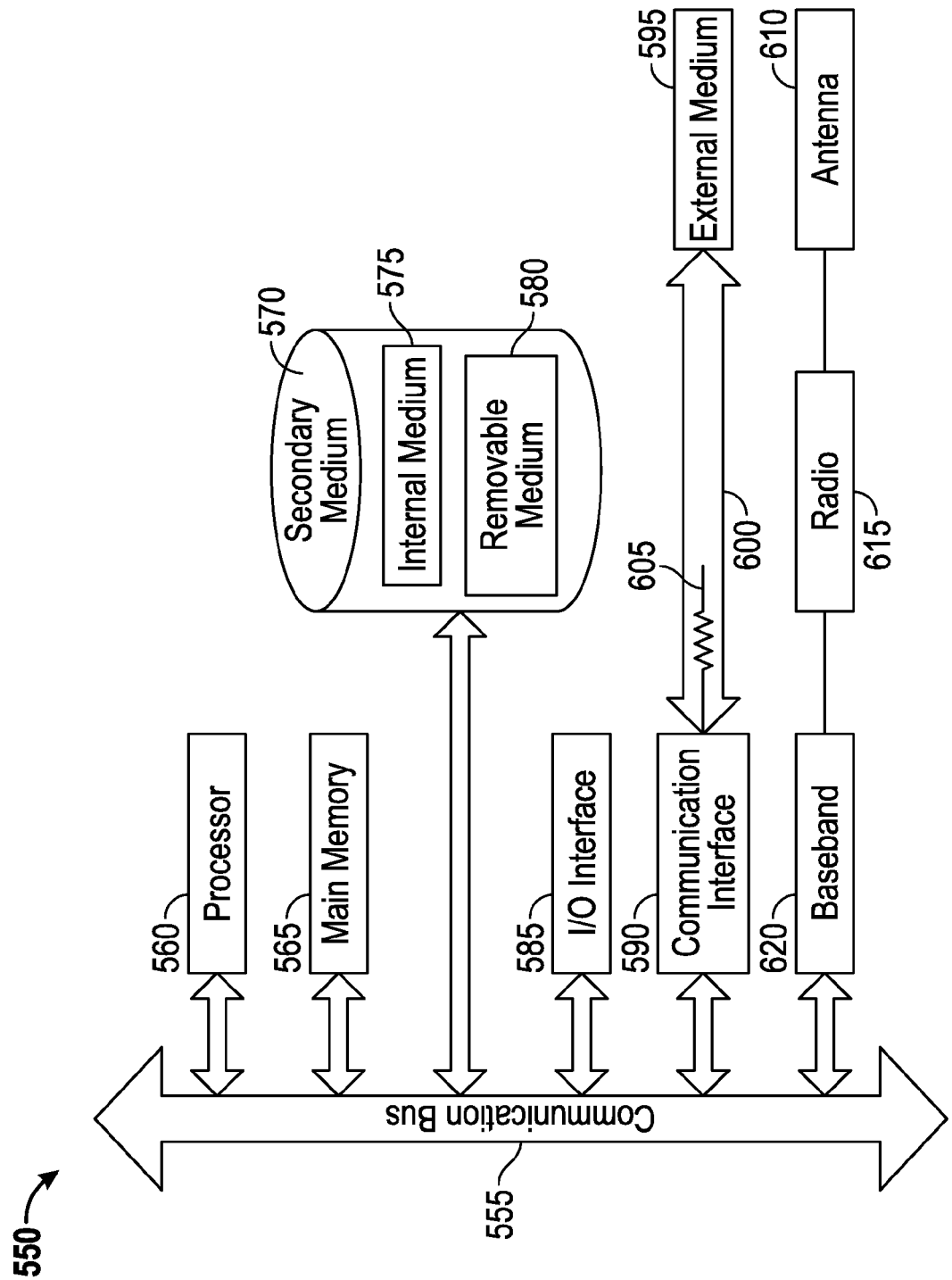
FIG. 16 illustrates a processing system on which one or more of the processes described herein may be executed, according to an embodiment.

FIG. 16 is a block diagram illustrating an example wired or wireless system 550 that may be used in connection with various embodiments described herein. For example, system 550 may be used as or in conjunction with one or more of the mechanisms or processes described above, and may represent components of server platform 110, user system(s) 130, third-party system 140, data sources 142, 144, 146, 148, and/or other devices described herein. The system 550 can be a server or any conventional personal computer, or any other processor-enabled device that is capable of wired or wireless data communication. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560. Examples of processors which may be used with system 550 include, without limitation, the Pentium® processor, Core i7® processor, and Xeon® processor, all of which are available from Intel Corporation of Santa Clara, Calif.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

System 550 preferably includes a main memory 565 and may also include a secondary memory 570. The main memory 565 provides storage of instructions and data for programs executing on the processor 560, such as one or more of the functions and/or modules discussed above. It should be understood that programs stored in the memory and executed by processor 560 may be written and/or compiled according to any suitable language, including without limitation C/C++, Java, JavaScript, Perl, Visual Basic, .NET, and the like. The main memory 565 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

The secondary memory 570 may optionally include an internal memory 575 and/or a removable medium 580, for example a floppy disk drive, a magnetic tape drive, a compact disc (CD) drive, a digital versatile disc (DVD) drive, other optical drive, a flash memory drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer-readable medium having stored thereon computer executable code (i.e., software) and/or data. The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 590. Examples of external storage medium 595 may include an external hard disk drive or an external optical drive, or and external magneto-optical drive.

Other examples of secondary memory 570 may include semiconductor-based memory such as programmable read-only memory (PROM), erasable programmable read-only memory (EPROM), electrically erasable read-only memory (EEPROM), or flash memory (block oriented memory similar to EEPROM). Also included are any other removable storage media 580 and communication interface 590, which allow software and data to be transferred from an external medium 595 to the system 550.

System 550 may include a communication interface 590. The communication interface 590 allows software and data to be transferred between system 550 and external devices (e.g. printers), networks, or information sources. For example, computer software or executable code may be transferred to system 550 from a network server via communication interface 590. Examples of communication interface 590 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 550 with a network or another computing device.

Communication interface 590 preferably implements industry promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

In an embodiment, I/O interface 585 provides an interface between one or more components of system 550 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), and the like.

The system 550 also includes optional wireless communication components that facilitate wireless communication over a voice and over a data network. The wireless communication components comprise an antenna system 610, a radio system 615 and a baseband system 620. In the system 550, radio frequency (RF) signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the present invention as previously described. For example, data storage areas 565 may include various software modules (not shown).

Various embodiments may also be implemented primarily in hardware using, for example, components such as application specific integrated circuits (ASICs), or field programmable gate arrays (FPGAs). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, functions, and methods described in connection with the embodiments disclosed herein can be implemented or performed with a general purpose processor, a digital signal processor (DSP), an ASIC, FPGA, or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

Any of the software components described herein may take a variety of forms. For example, a component may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, as a web-enabled software application, and/or as a mobile application.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A method for managing a sanitary sewer infrastructure, the method comprising, by at least one hardware processor:

re-projecting a plurality of representations of infrastructure assets from a plane coordinate system into a geospatial coordinate system, such that each of the re-projected plurality of representations of infrastructure assets is associated with at least one geospatial coordinate, wherein the re-projected plurality of representations of infrastructure assets comprise a representation of a pipe segment that is associated with one or more geospatial coordinates;

storing each of the re-projected plurality of representations of infrastructure assets and its associated geospatial coordinate in one or more databases;

receiving geospatial coordinates, collected in the field, from one or more user devices, wherein each received geospatial coordinate corresponds to a geospatial location of an infrastructure asset;

adjusting a stored geospatial coordinate associated with one or more of the stored re-projected plurality of representations of infrastructure assets based on the received geospatial coordinates;

receiving an inspection data stream for the pipe segment; and automatically, identifying one or more faults in the inspection data stream, wherein each of the one or more faults corresponds to at least one of a plurality of frames in the inspection data stream and a linear measurement from a starting point of the inspection data stream, and for each of the one or more identified faults, calculating a geospatial coordinate for the fault based on the linear measurement corresponding to the fault and a geospatial coordinate associated with the starting point of the inspection data stream, and associating the calculated geospatial coordinate with the at least one frame in the inspection data stream that corresponds to the fault.

2. The method of claim 1, further comprising receiving an asset identifier for each of the received geospatial coordinates, wherein the plurality of representations of infrastructure assets from the plane coordinate system comprise one or more computer-aided design (CAD) tiles, and wherein adjusting a geospatial coordinate associated with one or more of the re-projected plurality of representations of infrastructure assets based on the received geospatial coordinates comprises, for each of one or more of the received asset identifiers and its associated received geospatial coordinate:
   identifying one of the stored re-projected plurality of representations of infrastructure assets that is associated with the received asset identifier;
   adjusting the stored geospatial coordinate associated with the identified representation of an infrastructure asset based on the associated received geospatial coordinate;
   identifying a subset of the stored re-projected plurality of representations of infrastructure assets that were re-projected from a same one of the one or more CAD tiles as the identified representation of an infrastructure asset; and,
   for each of one or more of the identified subset of representations of infrastructure assets, adjusting its stored geospatial coordinate based on its relationship in the CAD tile to the identified representation of an infrastructure asset.

3. The method of claim 1, comprising continually receiving geospatial coordinates, collected in the field, from one or more user devices, and continually and automatically adjusting stored geospatial coordinates associated with one or more of the stored re-projected plurality of representations of infrastructure assets based on the continually received geospatial coordinates.

4. The method of claim 1, wherein each geospatial coordinate comprises a latitude value, a longitude value, and an elevation value.

5. The method of claim 4, wherein each of the re-projected plurality of representations of infrastructure assets is further associated with a time attribute, and wherein the method further comprises storing the associated time attribute of each of the re-projected plurality of representations of infrastructure assets in the one or more databases.

6. The method of claim 1, wherein the re-projected plurality of representations of infrastructure assets comprise a representation of a first manhole and a representation of a second manhole, wherein the pipe segment is located between the first manhole and the second manhole, and wherein the method further comprises, by the at least one hardware processor:
   identifying a first geospatial coordinate associated with the representation of the first manhole;
   identifying a second geospatial coordinate associated with the representation of the second manhole; and
   automatically assigning one or more geospatial coordinates to the representation of the pipe segment based on the first geospatial coordinate and the second geospatial coordinate.

7. The method of claim 6, wherein the first geospatial coordinate associated with the representation of the first manhole is used as geospatial coordinate associated with the starting point of the inspection data stream.

8. The method of claim 1, further comprising:
   receiving one or more inspection videos;
   storing the one or more inspection videos; and
   associating each of the one or more inspection videos with one of the re-projected plurality of infrastructure assets.

9. The method of claim 8, further comprising, for each of the one or more inspection videos, generating one or more accelerated versions of the inspection video.

10. A system for managing a sanitary sewer infrastructure, the system comprising:
   at least one hardware processor; and
   at least one executable software module that, when executed by the at least one hardware processor,
      re-projects a plurality of representations of infrastructure assets from a plane coordinate system into a geospatial coordinate system, such that each of the re-projected plurality of representations of infrastructure assets is associated with at least one geospatial coordinate, wherein the re-projected plurality of representations of infrastructure asserts comprise a representation of a pipe segment that is associated with one or more geospatial coordinates,
      stores each of the re-projected plurality of representations of infrastructure assets and its associated geospatial coordinate in one or more databases,
      receives geospatial coordinates, collected in the field, from one or more user devices, wherein each received geospatial coordinate corresponds to a geospatial location of an infrastructure asset,
      adjusts a stored geospatial coordinate associated with one or more of the stored re-projected plurality of representations of infrastructure assets based on the received geospatial coordinates,
      receives an inspection data stream for the pipe segment, and
      automatically,
         identifies one or more faults in the inspection data stream, wherein each of the one or more faults corresponds to at least one of a plurality of frames in the inspection data stream and a linear measurement from a starting point of the inspection data stream, and,
         for each of the one or more identified faults, calculates a geospatial coordinate for the fault based on the linear measurement corresponding to the fault and a geospatial coordinate associated with the starting point of the inspection data stream, and associates the calculated geospatial coordinate with the at least one frame in the inspection data stream that corresponds to the fault.

11. The system of claim 10, wherein the at least one executable software module further receives an asset identifier for each of the received geospatial coordinates, wherein the plurality of representations of infrastructure assets from the plane coordinate system comprise one or more computer-aided design (CAD) tiles, and wherein adjusting a geospatial coordinate associated with one or more of the re-projected plurality of representations of infrastructure assets based on the received geospatial coordinates comprises, for each of one or more of the received asset identifiers and its associated received geospatial coordinate:
   identifying one of the stored re-projected plurality of representations of infrastructure assets that is associated with the received asset identifier;
   adjusting the stored geospatial coordinate associated with the identified representation of an infrastructure asset based on the associated received geospatial coordinate;
   identifying a subset of the stored re-projected plurality of representations of infrastructure assets that were re-projected from a same one of the one or more CAD tiles as the identified representation of an infrastructure asset; and, for each of one or more of the identified subset of representations of infrastructure assets, adjusting its stored geospatial coordinate based on its relationship in the CAD tile to the identified representation of an infrastructure asset.

12. The system of claim 10, wherein the at least one executable software module further continually receives geospatial coordinates, collected in the field, from one or more user devices, and continually and automatically adjusts stored geospatial coordinates associated with one or more of the stored re-projected plurality of representations of infrastructure assets based on the continually received geospatial coordinates.

13. The system of claim 10, wherein each geospatial coordinate comprises a latitude value, a longitude value, and an elevation value.

14. The system of claim 13, wherein each of the re-projected plurality of representations of infrastructure assets is further associated with a time attribute, and wherein the at least one executable software module further stores the associated time attribute of each of the re-projected plurality of representations of infrastructure assets in the one or more databases.

15. The system of claim 10, wherein the re-projected plurality of representations of infrastructure assets comprise a representation of a first manhole and a representation of a second manhole, wherein the pipe segment is located between the first manhole and the second manhole, and wherein the at least one executable software module further:
 identifies a first geospatial coordinate associated with the representation of the first manhole;
 identifies a second geospatial coordinate associated with the representation of the second manhole; and
 automatically assigns one or more geospatial coordinates to the representation of the pipe segment based on the first geospatial coordinate and the second geospatial coordinate.

16. The system of claim 15, wherein the first geospatial coordinate associated with the representation of the first manhole is used as the geospatial coordinate associated with the starting point of the inspection data stream.

17. The system of claim 10, wherein the at least one executable software module further:
 receives one or more inspection videos;
 stores the one or more inspection videos; and
 associates each of the one or more inspection videos with one of the re-projected plurality of infrastructure assets.

18. The system of claim 17, wherein the at least one executable software module further, for each of the one or more inspection videos, generates one or more accelerated versions of the inspection video.

* * * * *